(12) United States Patent
Borkiewicz et al.

(10) Patent No.: US 7,464,806 B2
(45) Date of Patent: Dec. 16, 2008

(54) SUSPENSION DEVICE FOR LINKED PRODUCTS

(75) Inventors: Zbigniew S. Borkiewicz, Sun Prairie, WI (US); Timothy J. Drebing, Middleton, WI (US); Kris K. Hulett, Rocheport, MO (US); Tatsuo Nakamura, Setagaya-Ku (JP); Minoru Kasai, Ebina (JP)

(73) Assignee: Kraft Foods Global Brands LLC, Northfield, IL (US)

( * ) Notice: Subject to any disclaimer, the term of this patent is extended or adjusted under 35 U.S.C. 154(b) by 156 days.

(21) Appl. No.: 11/101,811

(22) Filed: Apr. 7, 2005

(65) Prior Publication Data
US 2005/0263371 A1    Dec. 1, 2005

Related U.S. Application Data

(63) Continuation-in-part of application No. 10/903,259, filed on Jul. 29, 2004, now abandoned, which is a continuation-in-part of application No. 10/286,386, filed on Nov. 1, 2002, now Pat. No. 6,786,321.

(51) Int. Cl.
B65G 29/00 (2006.01)
(52) U.S. Cl. .................................. 198/465.4; 99/443 C
(58) Field of Classification Search ............... 198/419.3, 198/676.1, 678.1, 465.4; 99/443 C, 386, 99/477; 452/51, 182, 183, 187
See application file for complete search history.

(56) References Cited

U.S. PATENT DOCUMENTS

| | | | |
|---|---|---|---|
| 0,233,698 A | 10/1880 | Rankin | |
| 1,778,484 A | 10/1930 | Da Costa | |
| 1,780,224 A | 11/1930 | Da Costa | |
| 1,973,196 A | 9/1934 | Baker | |
| 2,212,348 A | 8/1940 | Ludington | |
| 2,551,080 A | 5/1951 | Allen et al. | |
| 2,609,083 A | 9/1952 | Leach | |
| 2,725,970 A | 12/1955 | Wullschleger | |
| 3,032,172 A | 5/1962 | Jensen | |
| 3,132,373 A | 5/1964 | Altenpohl | |
| 3,115,668 A | 6/1965 | Townsend | |
| 3,191,222 A | 6/1965 | Townsend | |
| 3,204,844 A | 9/1965 | Wallace | |
| 3,264,679 A | 8/1966 | Moekle | |

(Continued)

FOREIGN PATENT DOCUMENTS

JP    06-007073 A    1/1994

*Primary Examiner*—James R Bidwell
(74) *Attorney, Agent, or Firm*—Fitch, Even, Tabin & Flannery

(57) ABSTRACT

Provided herein are various suspension devices and associated methods and apparatus to open loops (or form opened loops) in a chain of linked products suspended from one or more suspension devices in a conveyor system. In one implementation, a suspension device for a chain of linked products includes a link support portion pivotally coupled to a conveyor, the link support portion configured to suspend a portion of the chain of linked products therefrom and comprising a lower portion downwardly extending from the link support portion. The lower portion is configured to engage a portion of a respective link of the chain upon a pivoting motion of the link support portion about a pivot axis in order to open a respective loop suspended from the link support portion to an unloading orientation for unloading.

36 Claims, 33 Drawing Sheets

U.S. PATENT DOCUMENTS

| | | |
|---|---|---|
| 3,296,657 A | 1/1967 | Moekle |
| 3,430,831 A | 3/1969 | Burton et al. |
| 3,494,277 A | 2/1970 | Olson |
| 3,511,370 A | 5/1970 | Taylor |
| 3,533,495 A | 10/1970 | Wallace |
| 3,593,368 A | 7/1971 | Cox |
| 3,790,685 A | 2/1974 | Criss et al. |
| 3,850,566 A | 11/1974 | Moore |
| 4,218,003 A | 8/1980 | Plewa et al. |
| 4,317,258 A | 3/1982 | Altenpohl et al. |
| 4,498,578 A | 2/1985 | Altenpohl |
| 4,547,931 A | 10/1985 | Staudenrausch et al. |
| 4,761,854 A | 8/1988 | Schnell et al. |
| 4,880,105 A | 11/1989 | Kasai et al. |
| 5,049,108 A | 9/1991 | Staudenrausch |
| 5,073,142 A | 12/1991 | Kasai et al. |
| 5,085,612 A | 2/1992 | Muller et al. |
| 5,163,864 A | 11/1992 | Burger et al. |
| 5,174,428 A | 12/1992 | Durst |
| 5,183,433 A | 2/1993 | Townsend et al. |
| 5,197,915 A | 3/1993 | Nakamura et al. |
| 5,232,080 A | 8/1993 | van Essen et al. |
| 5,244,683 A | 9/1993 | Schreiber et al. |
| 5,354,229 A | 10/1994 | Markwardt et al. |
| 5,354,230 A | 10/1994 | McFarlane et al. |
| 5,480,346 A | 1/1996 | Kasai et al. |
| 5,672,099 A | 9/1997 | Takamagari et al. |
| 5,730,649 A | 3/1998 | Schliesser et al. |
| 5,896,809 A | 4/1999 | Miller |
| 5,971,842 A | 10/1999 | Simpson et al. |
| 5,993,307 A | 11/1999 | Hamblin |
| 6,019,213 A | 2/2000 | Schubert |
| 6,056,636 A | 5/2000 | Cody et al. |
| 6,071,186 A | 6/2000 | Shibata et al. |
| 6,083,093 A | 7/2000 | Williams |
| 6,086,469 A | 7/2000 | Cody et al. |
| 6,125,991 A | 10/2000 | Veldkemp et al. |
| 6,213,368 B1 | 4/2001 | Vermeer et al. |
| 6,277,018 B1 | 8/2001 | Cody et al. |
| 6,290,591 B1 | 9/2001 | Hergott et al. |
| 6,523,462 B1 * | 2/2003 | Johnson et al. ............ 99/443 C |
| 6,572,465 B2 | 6/2003 | Kimura |
| 6,592,452 B1 | 7/2003 | Myers |
| 6,786,321 B2 | 9/2004 | Borkiewicz et al. |

\* cited by examiner

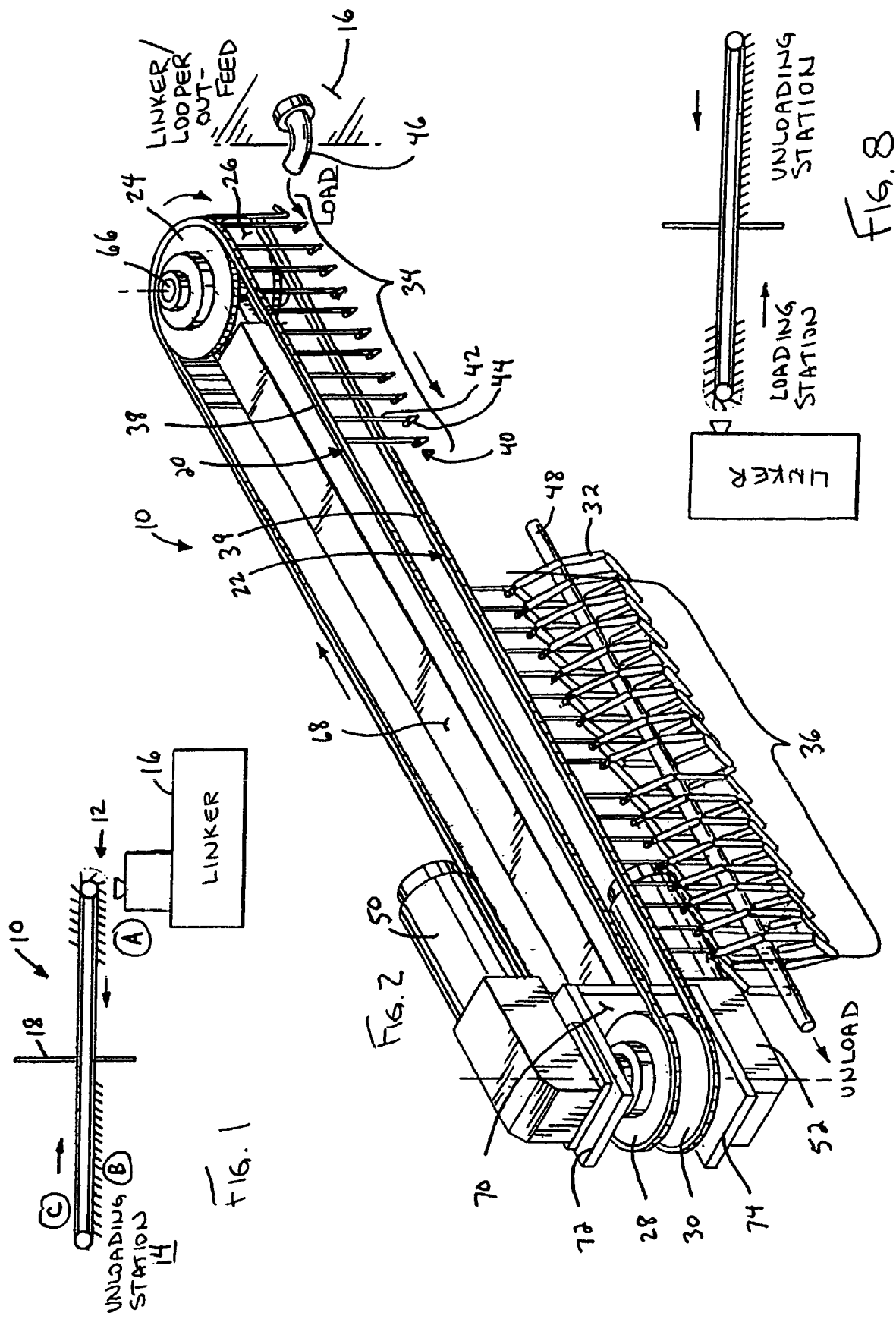

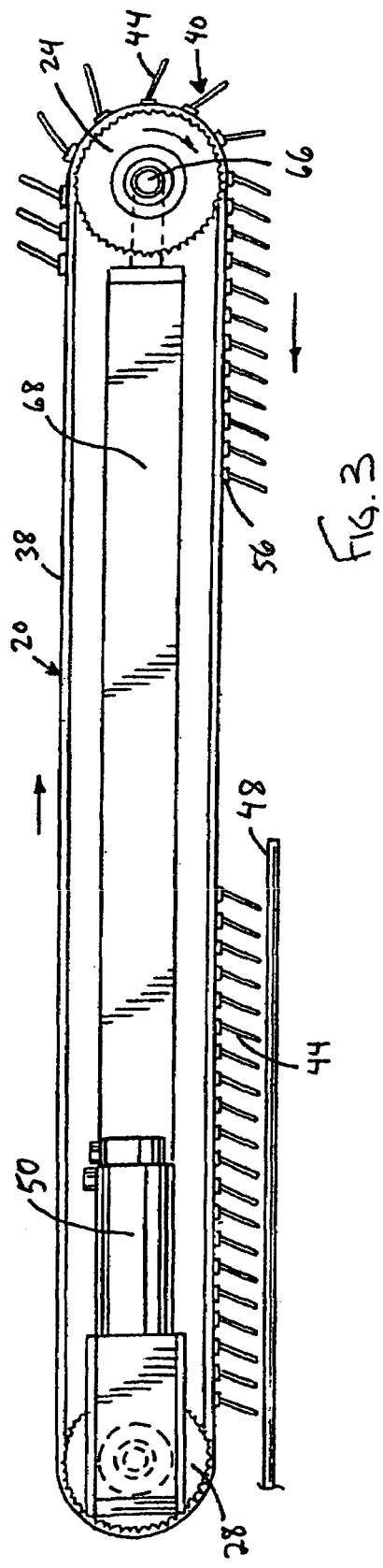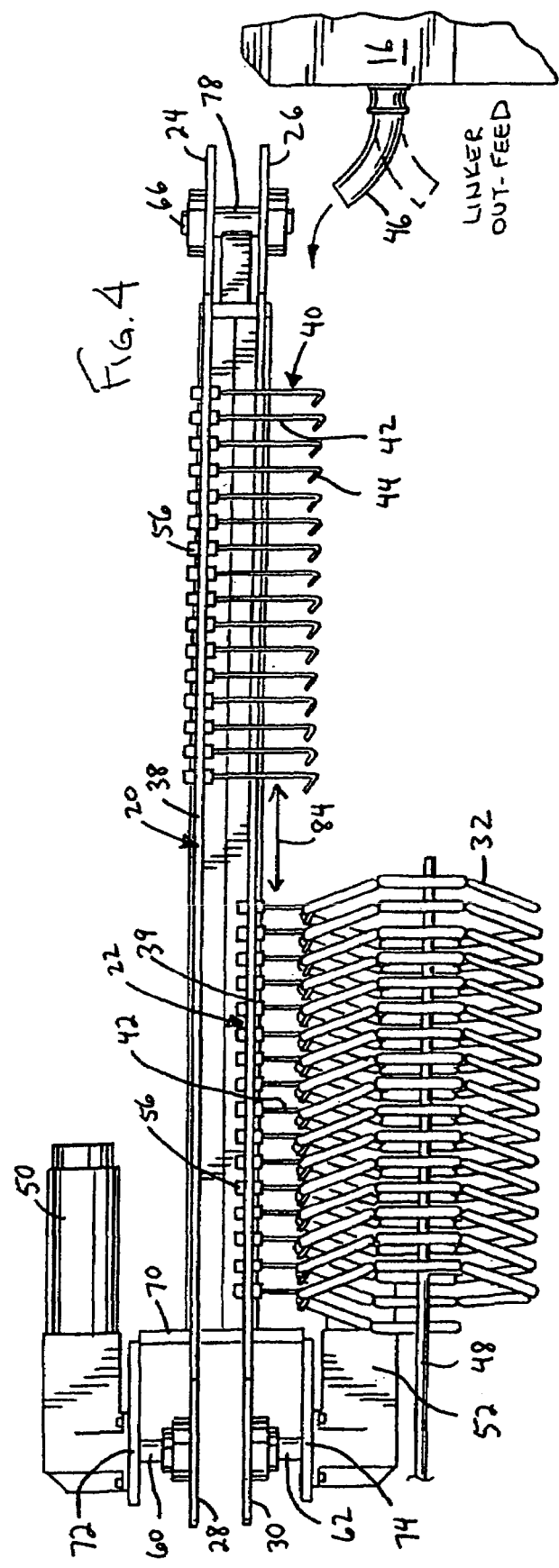

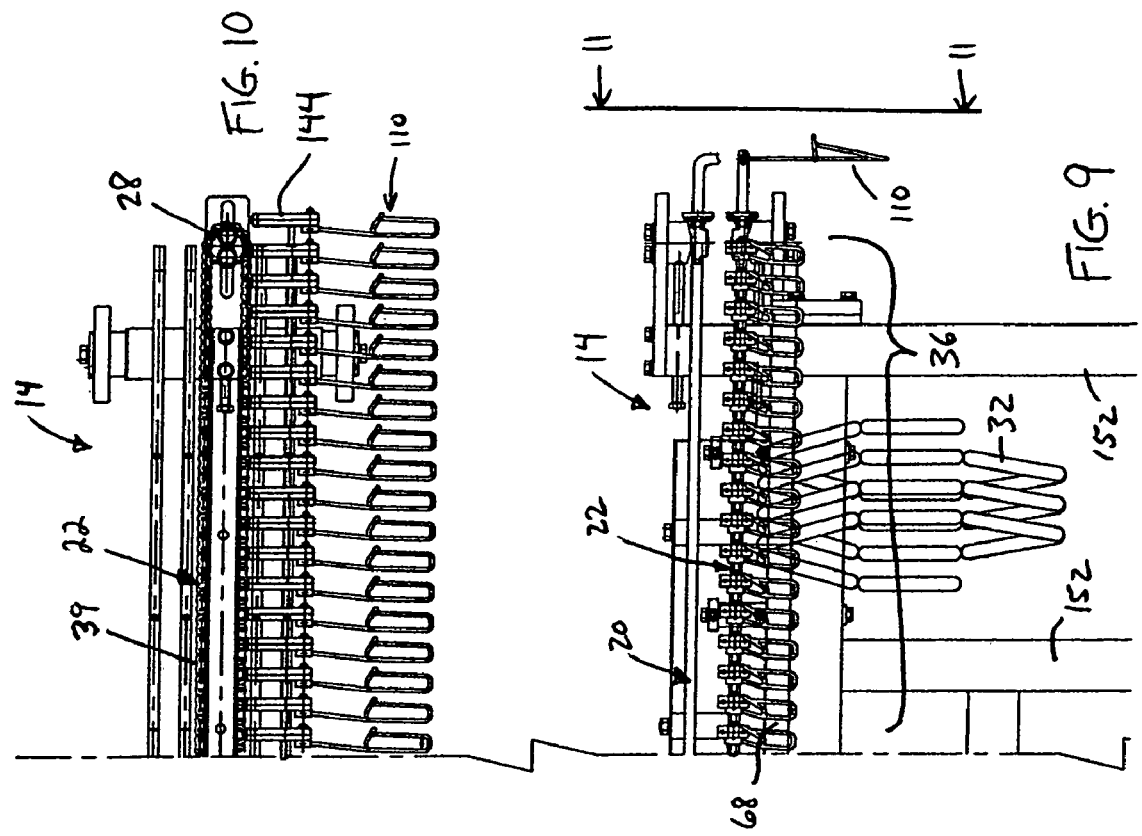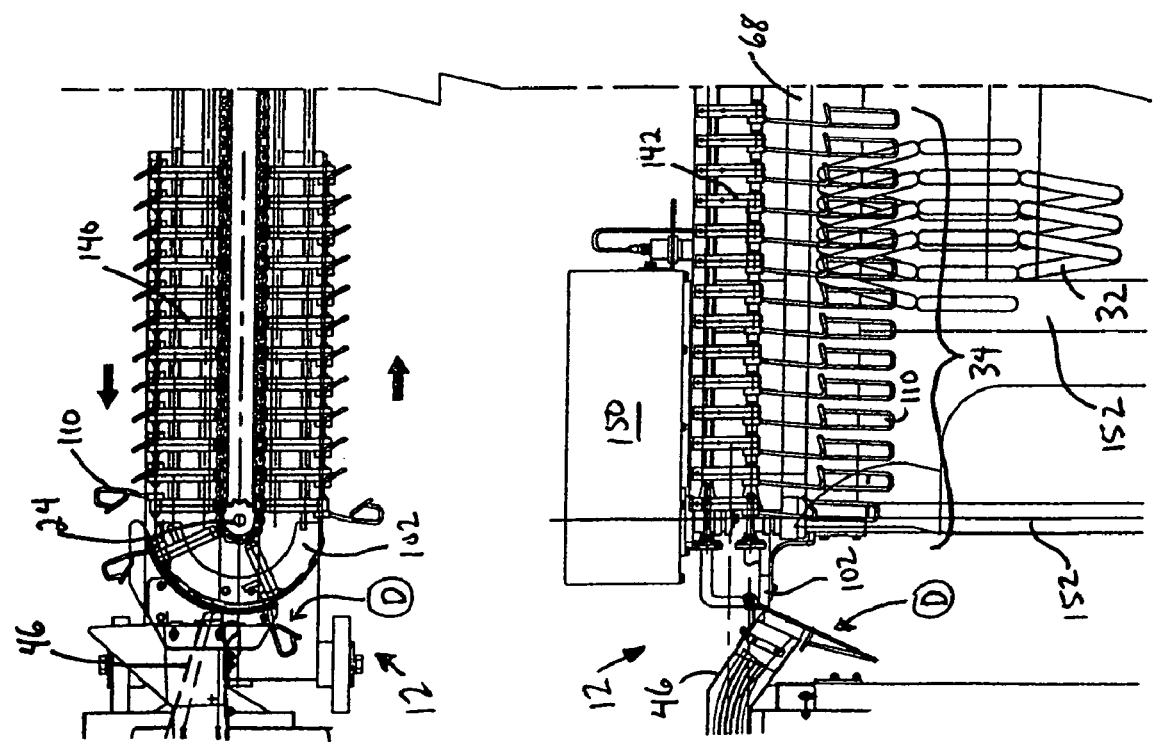

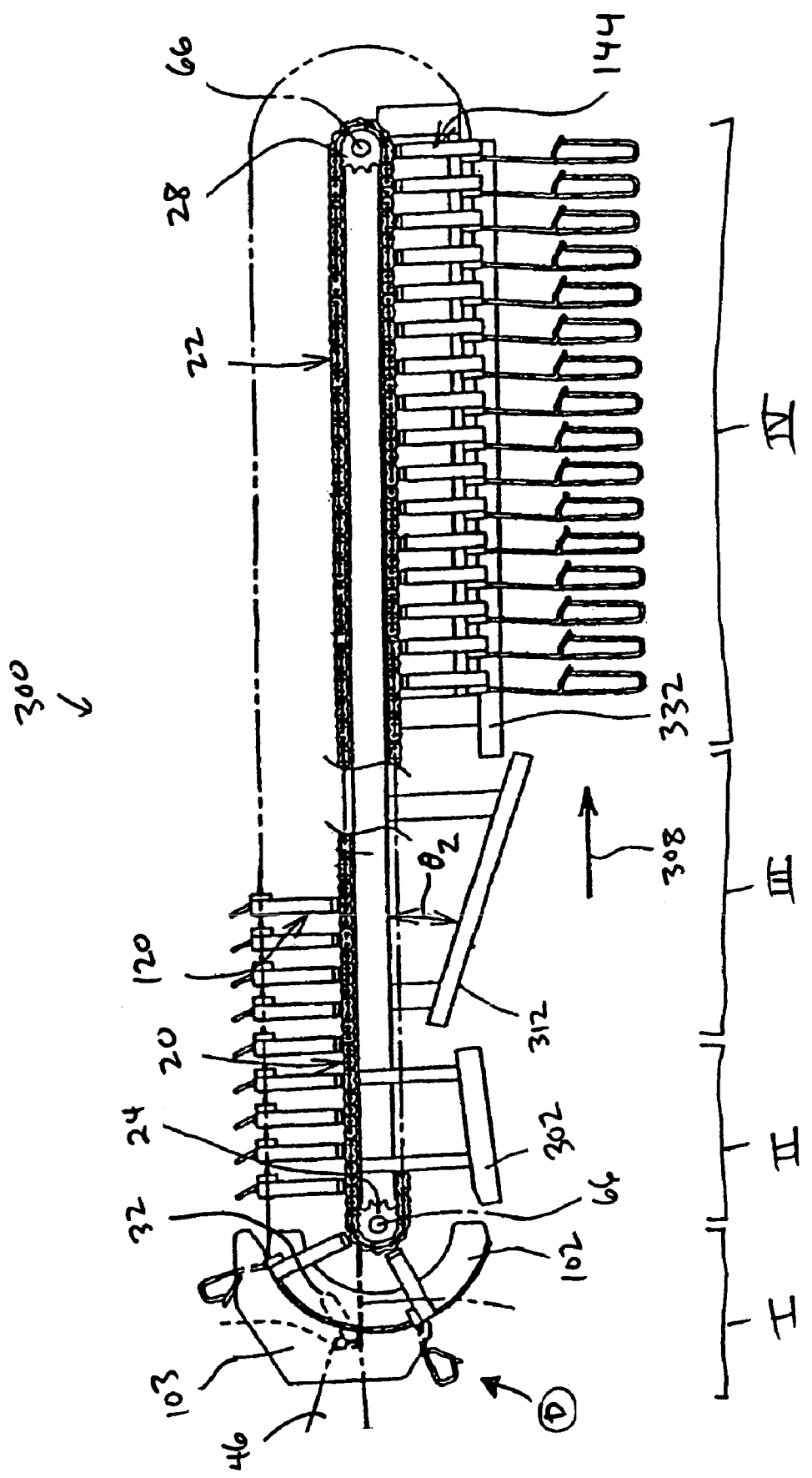

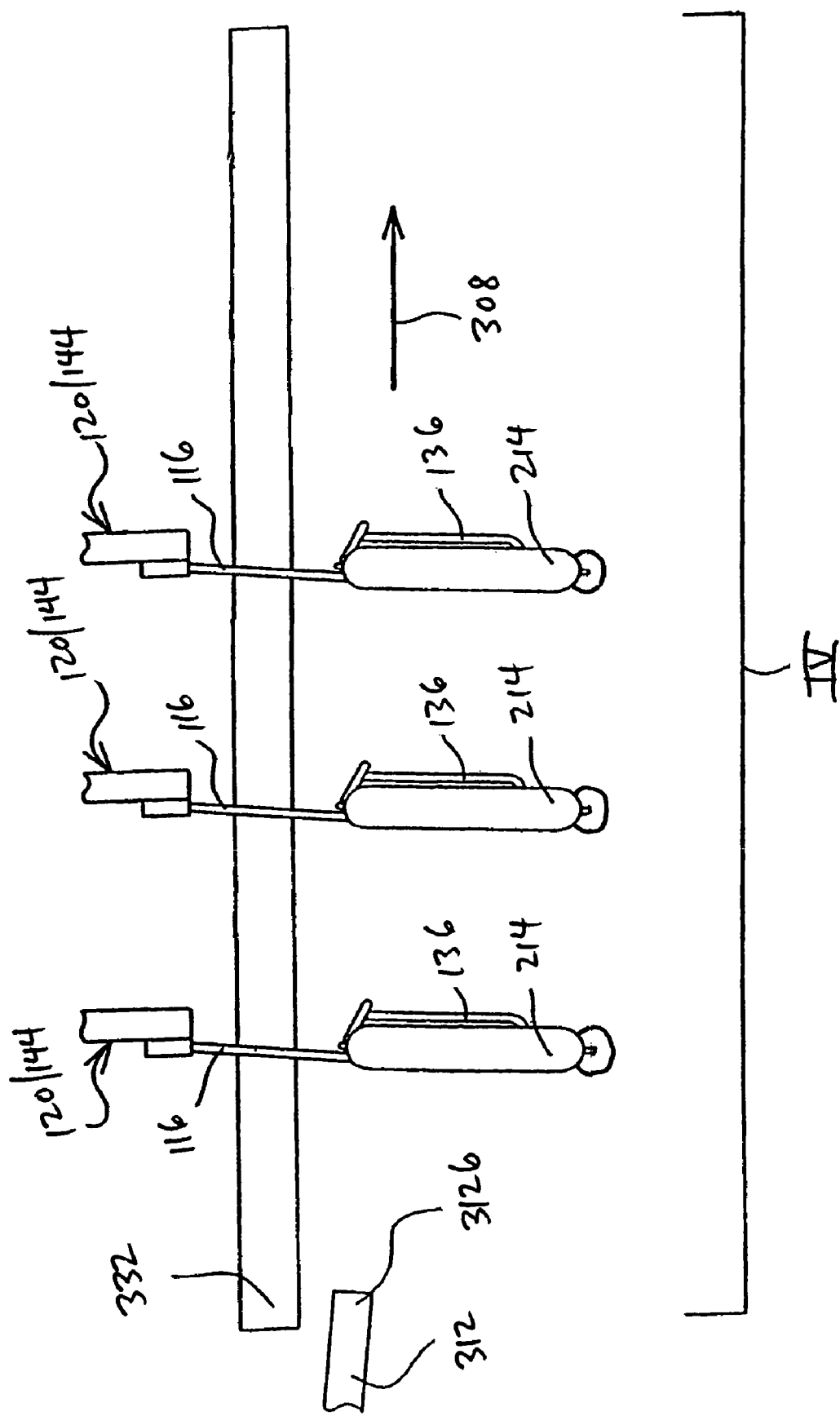

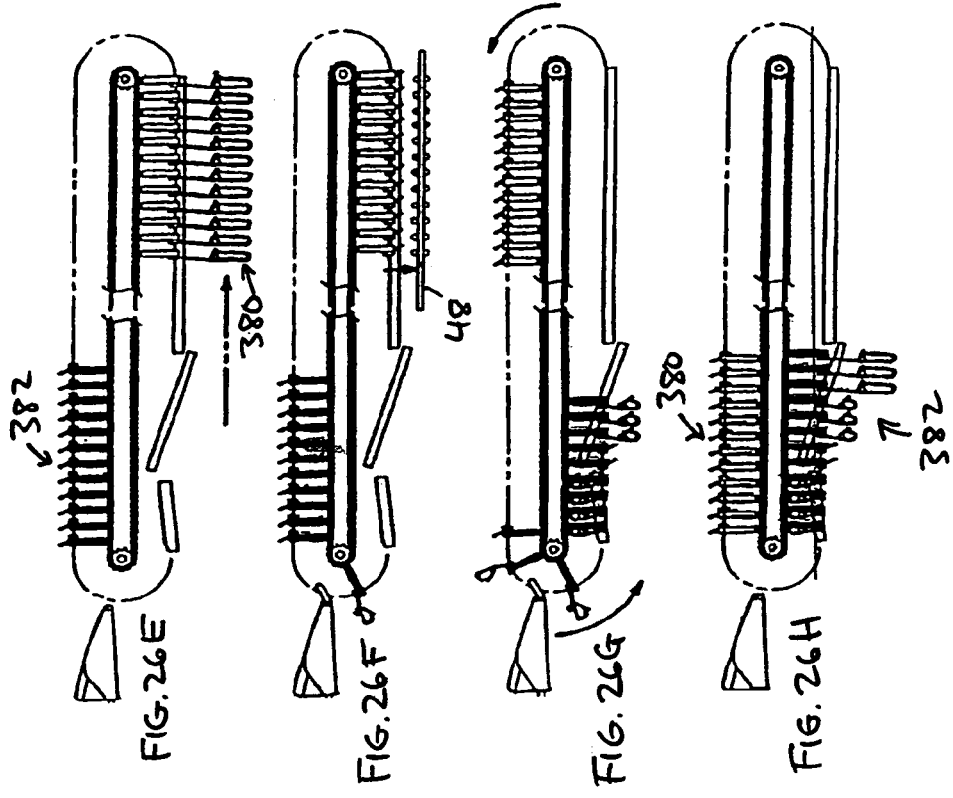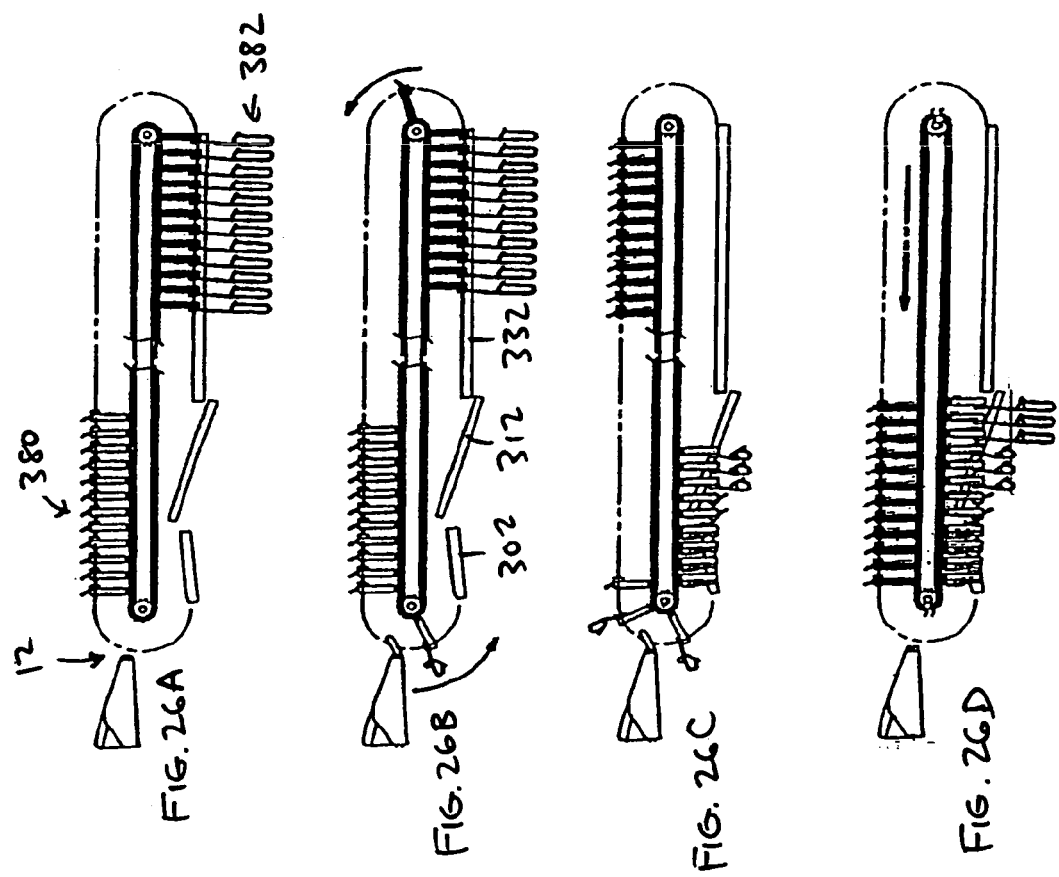

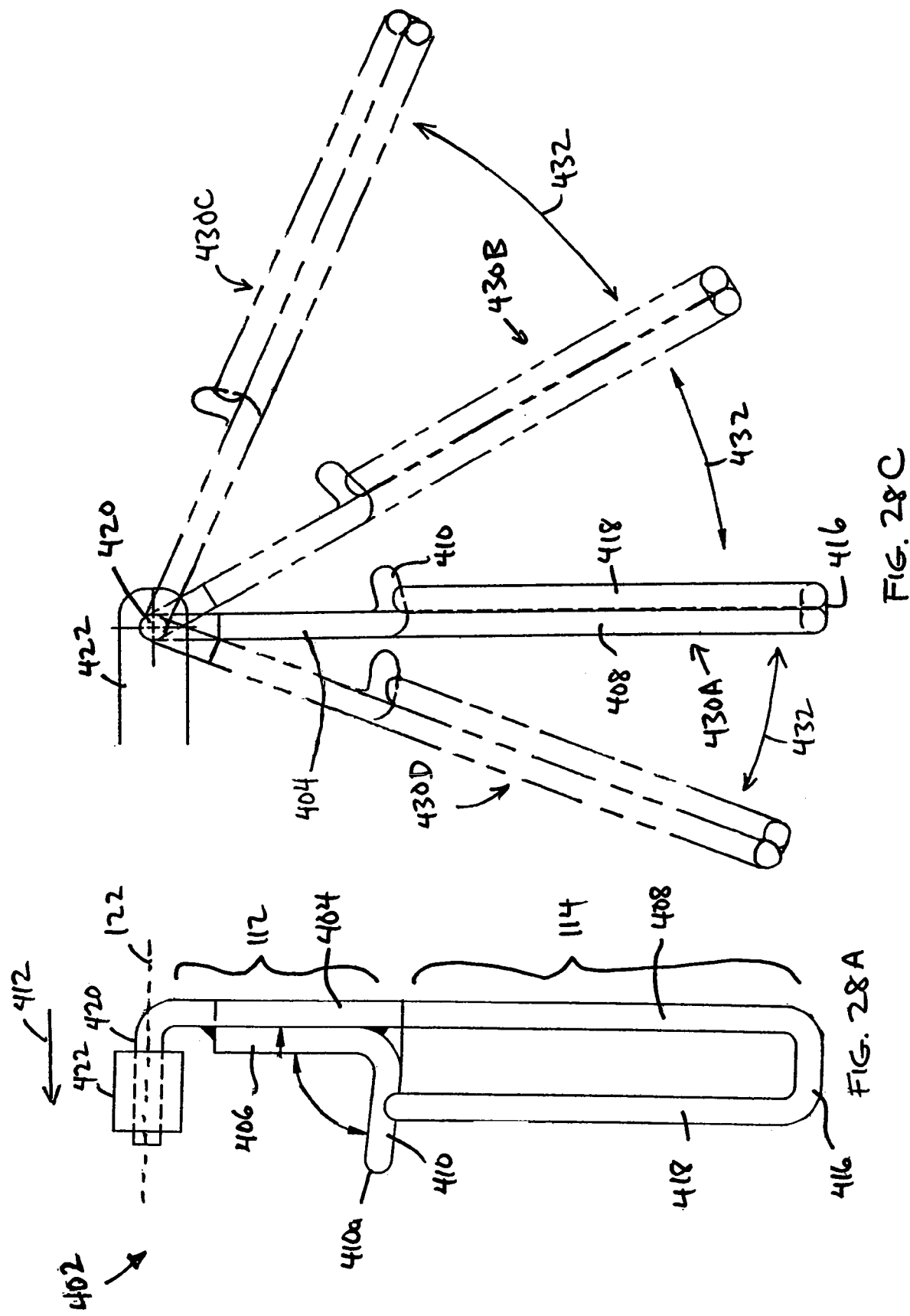

SUSPENSION DEVICE FOR LINKED PRODUCTS

This application is a continuation-in-part of U.S. application Ser. No. 10/903,259, filed Jul. 29, 2004, which is a continuation-in-part of U.S. application Ser. No. 10/286,386, filed Nov. 1, 2002, now U.S. Pat. No. 6,786,321, both of which are incorporated herein by reference.

BACKGROUND OF THE INVENTION

1. Field of the Invention

The present invention relates generally to the production of linked food products, and more specifically to conveyor equipment for conveying linked food products, such as hot dogs or sausages, output from a linker that makes the linked food product.

2. Discussion of the Related Art

In the production of linked food products, such as hot dogs or sausages, it is well known to utilize conveyors to convey the food product to different points in the production process. Typically, a conventional sausage making machine or "linker" makes linked sausage or hot dog chains. For example, the linker pumps a filling comprising, e.g., meat or other proteinaceous food products, along with flavorings and other ingredients into an elongated casing, which is pinched and/or twisted at regular intervals to form individual links and then delivered through a horn.

At a loading station, hooks suspended from a moving conveyor chain are positioned to receive the links output from the horn. Once loaded, the links are carried by the conveyor to another location. The links are removed from the conveyor at an unloading station. In a typical conveyor, any conveyor stoppages at the unloading station to unload a given sausage chain also stops the conveyor at the loading station. Thus, the operation of the linker is stopped. For example, the linker would have to stop outputting a sausage chain temporarily or produce a sausage chain during periods of continuous conveyor movement. Even though delays resulting from conveyor stoppages at the unloading station are short, they result in a great inefficiency at the linker over time. Therefore, it is desired to minimize stoppage times at the unloading station.

Additionally, at the conventional linker, once a particular elongated casing is filled and output to the conveyor, the loaded chain is "tied off" at its ends to prevent filling from leaking out of the end of the casing. Movement of the conveyor is typically stopped to tie off the casing, which may take an operator several seconds. During interruption of the conveyor movement, the loaded sausage chain is delayed from being conveyed to other portions of the production cycle. With sausage making machines that can fill a 140-foot casing in about 25 seconds, this stoppage occurs frequently and results in inefficiency in the conveyor output.

Accordingly, there is a need for a conveyor system that will more efficiently load, convey and unload linked food products.

SUMMARY OF THE INVENTION

Provided herein are various suspension devices and associated methods and apparatus to open loops (or form opened loops) in a chain of linked products suspended from one or more suspension devices in a conveyor system.

In one embodiment, the invention can be characterized as a suspension device for a chain of linked products comprising a link support portion pivotally coupled to a conveyor, the link support portion configured to suspend a portion of the chain of linked products therefrom and comprising a lower portion downwardly extending from the link support portion. The lower portion is configured to engage a portion of a respective link of the chain upon a pivoting motion of the link support portion about a pivot axis in order to open a respective loop suspended from the link support portion to an unloading orientation for unloading.

In another embodiment, the invention can be characterized as an apparatus for forming loops in a chain of linked products comprising a conveyor and a set of suspension devices coupled to the conveyor. Each suspension device includes a link support portion pivotally coupled to a conveyor, the link support portion being pivotal about a pivot axis, the link support portion configured to suspend therefrom a portion of the chain of linked products, wherein the chain is suspended from the set of suspension devices and conveyed by the conveyor; and a lower portion downwardly extending from the link support portion. Also, a member is coupled to a conveyor support structure and configured to engage and laterally pivot the set of suspension devices about the pivot axis into an unloading orientation. The lower portion of each suspension device is configured to engage a portion of a respective link of the chain upon the pivoting motion of the suspension device about the pivot axis in order to open a respective loop suspended from the link support portion for unloading.

In a further embodiment, the invention may be characterized as a method for forming loops in a chain of linked products, and a means for accomplishing the method, the method comprising the steps of: suspending a portion of the chain of linked product from a link support portion of a suspension device pivotally coupled to a conveyor, the suspension device having a lower portion downwardly extending from the link support portion; and pivoting the link support portion about a pivot axis such that the lower portion engages a portion of a respective link of the chain to open a respective loop in the chain to an unloading orientation for unloading.

BRIEF DESCRIPTION OF THE DRAWINGS

The above and other aspects, features and advantages of the present invention will be more apparent from the following more particular description thereof, presented in conjunction with the following drawings.

FIG. 1 is a schematic plan view of a conveyor system having a loading station for loading linked food products output from a linker and conveying the linked food product to an unloading station for removal in accordance with the present invention.

FIG. 2 is a perspective view of a conveyor system including two independently driven but coordinated conveyors for transporting linked food products from the linker to the unloading station in accordance with the present invention.

FIG. 3 is a plan view of the conveyor system of FIG. 2 illustrating an upper conveyor and link support members (also referred to generically as suspension devices) of both the upper conveyor and a lower conveyor.

FIG. 4 is a side elevational view of the conveyor system of FIG. 2 illustrating the upper and lower conveyors and corresponding link support members.

FIG. 8 is a schematic plan view of another conveyor system in accordance with the present invention.

FIG. 9 is a side elevational view of the conveyor system of FIG. 8 illustrating preferred link support members (or suspension devices) and the orientation thereof during the loading and unloading of the linked food product chain.

FIG. 10 is a plan view of the conveyor system of FIG. 9 illustrating the orientation of the link support members during the loading and unloading of the linked food product chain.

FIG. 18 is a plan view of the conveyor system of FIG. 17, the link support members illustrated in a pivoted orientation at the unloading station.

FIG. 21 is a top view of the link support members held in an unloading position during the unloading stage by a member according to one embodiment.

FIGS. 26A-26H are several simplified plan views of the conveyor system of FIGS. 17-24F illustrating the loading, conveying and unloading stages according to one embodiment of the invention.

FIGS. 28A and 28B are a side view and a top view, respectively, of a link support member according to the embodiment of FIG. 27.

FIG. 28C is an end view of the link support member of FIGS. 27-28B in both a normal vertically disposed position and pivoted position for unloading.

Corresponding reference characters indicate corresponding components throughout the several views of the drawings.

DETAILED DESCRIPTION

Figure 5:
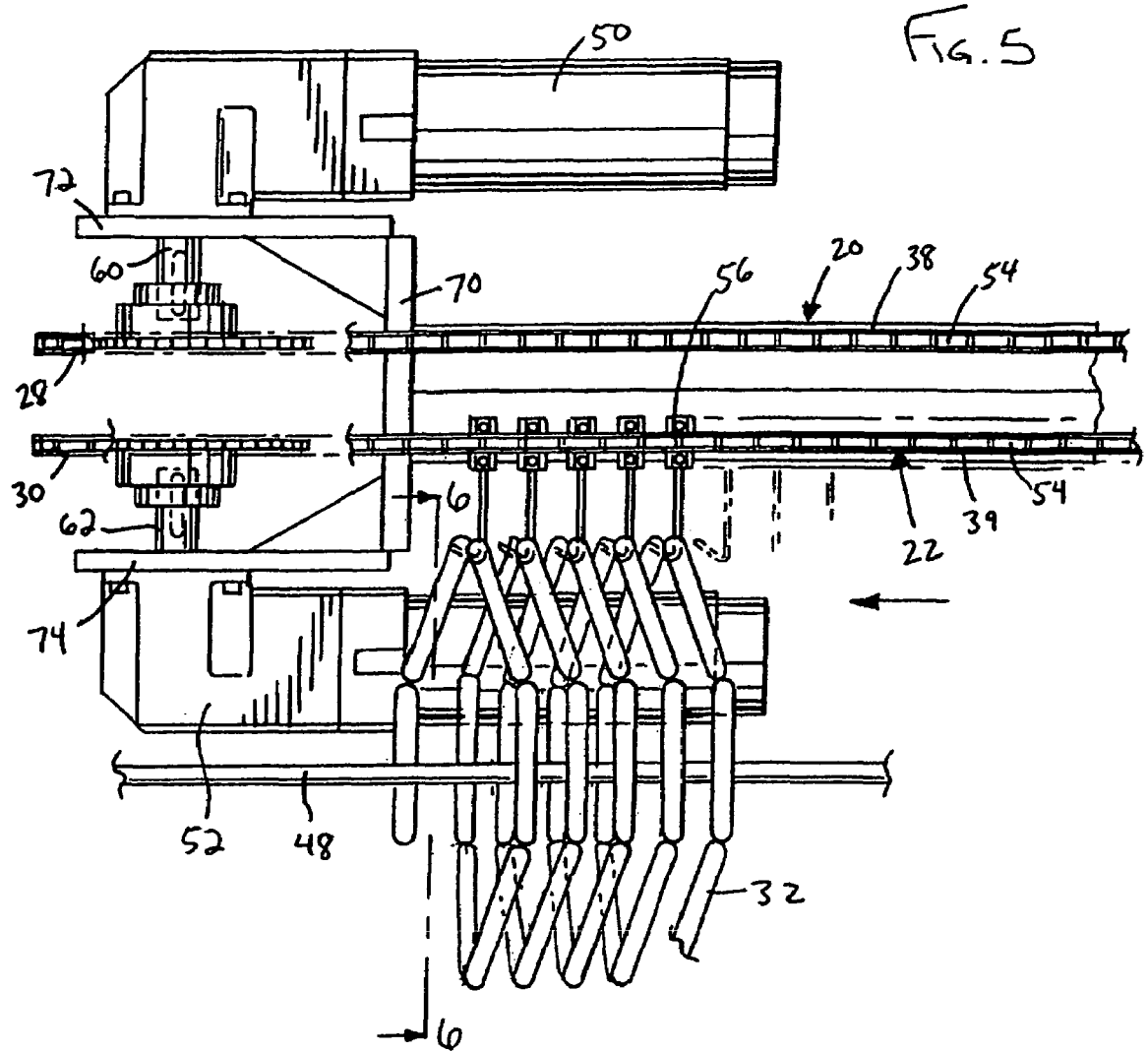
FIG. 5 is an enlarged side elevational view of an unloading end of the conveyor system of FIG. 2.
Figure 6:
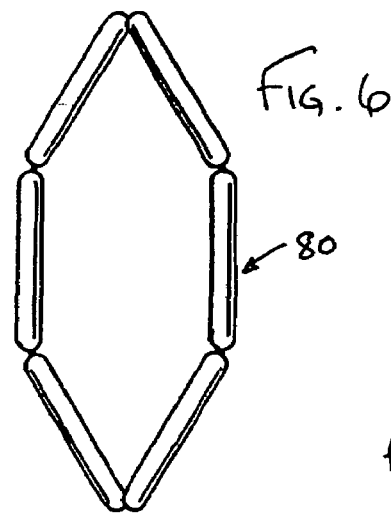
FIG. 6 is a view taken along line 6-6 of FIG. 5 illustrating a loop of linked food product held by a single link support member having six links.
Figure 7:
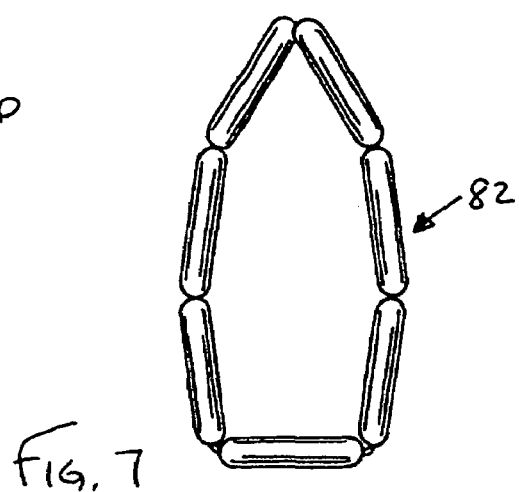
FIG. 7 is a view of an alternative loop of linked food product in which a single link support member holds seven links.

The following description is not to be taken in a limiting sense, but is made merely for the purpose of describing the general principles of preferred embodiments. The scope of the invention should be determined with reference to the claims.

Several embodiments are generally directed to conveyor systems for efficiently transporting or conveying an elongated chain of linked food product, such as hot dogs or sausages, through at least a portion of a production line. For example, while generally referring to FIGS. 1 and 2, a chain of linked food product (also referred to as a linked chain 32) is received onto a set of link support members (also generically referred to as suspension devices) of a conveyor at a loading station 12 as the linked chain is output from a conventional linker machine 16. The linked chain 32 is then transported a distance to an unloading station 14 where it is unloaded from the set of link support members and further processed before final delivery to the consumer. In preferred form, the invention provides a conveyor system 10 having two or more independently driven conveyors, each configured to load linked chains 32 of food product from the linker 16 at a shared loading station and transport the linked chains to a shared unloading station to be removed. The two conveyors 20, 22 are independently driven but coordinated such that preferably while one conveyor 20 is loading a linked chain of food product, the other conveyor 22 transports a previously loaded linked chain to the unloading station 14 and/or unloads a previously loaded and conveyed linked chain of food product and/or is transported into position to load the next linked chain.

The preferred independent conveyors 20, 22 allow for independent operation of the loading and unloading processes at the loading station 12 and the unloading station 14. For example, while one linked chain is being loaded onto a given conveyor at the loading station 12, another previously loaded chain on another conveyor is being transported to the unloading station 14 and/or is waiting on the other conveyor in a stationary position for unloading at the unloading station 14 and/or is unloaded from the unloading station 14 and/or the unloaded set of link support members is being transported back to the loading station. Thus, in a broad sense, the loading operation of a given conveyor is not limited or affected by interruptions in movement of the other conveyor, e.g., interruptions in conveyor movement during unloading. Similarly, the unloading operation of a given conveyor is not limited or affected by interruptions in movement of the other conveyor, e.g., interruptions in conveyor movement during loading.

In preferred embodiments, since the linker can load the next linked chain on the other conveyor while a given linked chain is being conveyed and/or unloaded (i.e., the linker does not have to wait during the unloading process), the operation of the linker is more continuous. Near-continuous operation of linker is desired such that more linked chains of food product may be produced during a given time frame. Thus, the more continuously operating the linker is, the linker is more efficient.

Since the linker 16 can load the next chain on the other conveyor during conveying the given chain to the unloading station and/or during unloading of the given chain at the unloading station (i.e., the linker does not have to wait during conveyor interruptions at the unloading process and does not have to wait for the loaded chain to be unloaded and then return back to the loading station), the operation of the linker is made more continuous, and thus, more efficient.

Furthermore, since the linker does not have to wait for the unloading process, in some embodiments, the allowable time for the unloading process is increased without an increase in the production cycle time. In other words, this eliminates the time of chain unloading from the production cycle, increasing the linker machine efficiency. Thus, the time to unload a given linked chain from a given conveyor can be made up to approximately equal to the time to load a given chain onto another conveyor. Since the allowable time for unloading is increased, the unloading process can be automated, as in preferred embodiments. It is also understood that even though the unloading time may be increased, in many embodiments, the unloading time is still minimized for further increases in linker efficiency. In preferred embodiments, by allowing the linker to operate more continuously and by eliminating the unloading time from the production cycle, approximately a 10-35% increase in production output of the conveyor system 10 may be realized without an increase in labor costs in comparison to a single conveyor system.

Additionally, the independently driven conveyors are coordinated such that the sets 34, 36 of link support members of the conveyors 20, 22 are separated by a desired gap 84 in order to ensure that the sets of link support members do not collide with each other in their paths of movement from the loading station 12 to the unloading station 14 and back. In one embodiment, such a gap or separation is provided such that while one conveyor is loading, another conveyor is unloading. However, in some embodiments, it is desired to minimize the gap 84 between sets 34, 36 of link support members, particularly, the gap between the end of a set of link support members being loaded and the beginning of the next set of link support members ready for loading. This allows for the linker 16 to operate more continuously since it does not have to wait for a previously loaded linked chain to be conveyed to an unloading station, e.g., the linker may create and load the next linked chain 32 shortly after the previously loaded linked chain has left the loading station 12.

In preferred embodiments, the gap at the loading station is minimized, such that the time duration of loading a given linked chain 32 onto a given set of link support members is at least as long as the time duration to convey a given linked chain 32 to the unloading station 14, unload the linked chain and then convey the set of link support members back into position to receive the next linked chain 32 at the loading station 12. This will ensure that a set of link support members is in position to receive the next linked chain from the linker 16 as soon as the linker 16 is able to produce another linked chain; therefore, providing near continuous linker operation.

The shared loading station 12 at position A and the shared unloading station 14 at position B are schematically illustrated in FIG. 1 at opposite ends of the conveyor system 10. A conventional hot dog or sausage making machine or linker 16 is located proximate to the loading station 12. It is noted that although the unloading station 14 is illustrated at position B in FIG. 1, (i.e., on the same side of the conveyor system 10, but at an opposite end), the unloading station 14 may be alternatively located at the position C (i.e., on an opposite side of the conveyor at the opposite end). Similarly, the loading station 12, which is illustrated near one end of the conveyor system 10, may be located at other positions about the conveyor path. In preferred form, barrier 18 separates portions of the conveyor system accessible to an operator. For example, an operator works at the loading station 12, but the barrier 18, for safety reasons, prevents the operator from working at the unloading station 14, wherein the unloading operation is automated. However, it is understood that the activities at both the loading station 12 and the unloading station 14 may be performed by an operator or be automated depending on the exact implementation, i.e., barrier 18 is not present in several embodiments. For example, preferably in automated unloading implementations, the barrier 18 is provided.

One specific configuration of a conveyor system 10 in accordance with the invention is illustrated in FIGS. 2-7 and described below. The conveyor system 10 includes two conveyors 20, 22 (also referred to as an upper conveyor 20 and a lower conveyor 22) whose movement is independent of each other and coordinated. Each respective conveyor 20, 22 includes a respective conveyor chain 38, 39 that travels about a respective sprocket 24, 26 at the loading station end of the conveyor system 10 and about a respective sprocket 28, 30 at an end of the conveyor near the unloading station 14. Conveyor frame 68 separates and extends between the loading end and the unloading end of the conveyor system 10. At the unloading end, the mounting bracket 70 rigidly attaches to one end of the conveyor frame 68. Drive motor 50, which operates the upper conveyor 20, is coupled to the sprocket 28 and rigidly held in position by an upper section 72 of the mounting bracket 70. Drive motor 52, which operates the lower conveyor 22, is coupled to the sprocket 30 and rigidly held in position by a lower section 74 of the mounting bracket 70. Drive shafts 60, 62 are coupled drive motors 50, 52, respectively, and rotate sprockets 28, 30, respectively, which causes motion of the conveyor chains 38, 39. Sprockets 24, 26 rotate about spindle 66. At the loading end, bracket 78 is rigidly attached to an opposite end of the frame 68 and retains spindle 66. Each conveyor chain 38, 39 is made up of connected chain links 54 (see FIG. 5).

Each conveyor 20, 22 is horizontally disposed and travels a similar fixed path from the loading station 12 to the unloading station 14 and back. However, the conveyors 20, 22 are vertically displaced at different elevations relative to each other. As illustrated, the upper conveyor 20 includes a conveyor chain 38 that travels about sprockets 24 and 28, while the lower conveyor 22 includes conveyor chain 39 that travels about sprockets 26 and 30. The path of movement of each conveyor is best illustrated in the plan view of FIG. 3. It should be understood that the exact path of the conveyor travel may be altered and remain in accordance with the invention. For example, the conveyor path may bend about another sprocket. Thus, the conveyor path may vary depending on the implementation.

Each conveyor 20, 22 further includes a respective set 34, 36 of link support members 40 (or suspension devices 40), although it is noted that more than one set of link support members may be coupled to each conveyor. Each set is used to carry (e.g., suspend therefrom) or convey a respective linked chain 32 of food product from the loading station 12 a specified distance to the unloading station 14. For example, upper conveyor 20 includes set 34 of link support members 40, while lower conveyor 22 includes set 36 of link support members 40. In preferred form, each set 34, 36 of link support members occupies less than half of the length of the conveyor 20, 22. The exact number of link support members 40 included in a given set 34, 36 and the exact length of a given conveyor chain occupied by the set 34, 36 varies depending on the number of links to be held by each link support member 40 and the overall length of the linked chain 32 to be conveyed. Each link support member 40 is configured to hang or carry at least two links of the linked chain 32 in a loop-like fashion, preferably, six links in loop 80 (see FIG. 6) or seven links in loop 82 (see FIG. 7). It is understood that the number of links in a loop that are carried or supported by each link support member 40 varies depending on the implementation, for example, there may be more than 6 or 7 links in a given loop.

The link support members 40 are attached to or coupled to a respective conveyor chain 38, 39. The link support members 40 function to receive the linked chain to be suspended therefrom and to be carried to an unloading position. For example, a bracket 56 (see FIG. 5) couples the link support members 40 to the chain links 54 of the conveyor chain 38, 39. In the illustrated embodiment, each link support member 40 includes a downwardly extending section 42 and a holding portion 44 (also referred to as a holding section) that extends upward, outward and forward (e.g., forward relative to a direction of conveyor movement). It is noted that in other embodiments, the holding portion 44 may extend upward and outward in a plane perpendicular to the direction of travel, or upward, outward and rearward. In the illustrated embodiment, the orientation of the holding portion 44 assists in the loading and unloading operations and is described further below. Additionally, the holding portion 44 may be shaped in such a manner that the linked chain 32 supported thereon is spread or held such that the loops of links are in an open position. This allows for an unloading stick to be easily inserted into the opened loop supported by the holding portions. For example, the holding portion may have a base portion that is wider than a top portion that opens the chain loop, e.g., the holding portion may have a pyramidal shaped cross section where the top portion separates two adjacent links and spreads them apart by contact through to the base portion. Such holding portions and their functionality of opening a loop hanging thereon are well known in the art.

In preferred form, the link support members 40 are pivotably attached or coupled at an upper end thereof to a respective conveyor 20, 22. For example, the downwardly extending section 42 of each link support member 40 is pivotably attached to the bracket 56, which is attached to the conveyor chain. This pivotal attachment allows the link support member 40 to pivot outwardly about the upper end of the downwardly extending section 42. The outward pivotal motion of the link support member assists in the loading and unloading process, and is described in more detail below with reference to FIGS. 9-28C.

The holding portion 44 functions to hold, suspend therefrom or carry a portion of a respective linked chain of links 32. As illustrated in FIGS. 2 and 4, the downwardly extending sections 42 of the link support members 40 on the lower conveyor 22 are shorter than the downwardly extending sections 42 of the link support members 40 of the upper conveyor 20 such that the holding portions 44 of both sets 34, 36 are at the same elevation. This is best illustrated in FIGS. 2 and 4. This allows for consistent operation at the shared loading station 12 and the shared unloading station 14; i.e., the loading and unloading stations do not have to account for differently elevated link support members 40.

It is noted that the elevation of the holding portions 44 may be different in alternative embodiments, wherein downwardly extending sections 42 of all link support members 40 are the same length such that the holding portions of the different sets 34, 36 are at different elevations with respect to each other.

At the loading station, the chain of food product links 32 is output from the linker 16 through a horn 46. The link support members 40 advance along the path of conveyor movement such that the link support members 40 support the chain 36 at regular intervals. The motion of the conveyor may be continuous or may be an indexed movement in which the conveyor advances incrementally. The horn 46 may be a stationary and positioned such that it crosses the path of the link support members 40. Alternatively, the horn 46 may be a rotating horn (as illustrated in FIGS. 2 and 4) such that the linked chain 32 is loaded by rotating the horn 46. The loading process is repeated while the conveyor moves until the entire casing has been filled and ejected from the linker 16 and the linked chain 32 is supported on a given set of link support members in a generally helical configuration. For example, as illustrated in FIGS. 2, 4 and 5, the linked chain 32 has been loaded onto set 36 of the lower conveyor 22.

The conveyor then moves the linked chain 32 immediately downstream a short distance to the unloading station 14. According to one embodiment, while one linked chain is being loaded at the loading station, another previously loaded linked chain is simultaneously being unloaded at the unloading station 14. Since in preferred form, the purpose of the conveyor system 10 is to efficiently convey the linked chain from a linker into position to be unloaded and then inserted into a separate processing oven, the distance from one end of the conveyor to an opposite end is typically about 10-15 feet, for example, about 12 feet. However, it is noted that in other embodiments, each conveyor 20, 22 may be configured to convey the linked chain through another processing station (such as a processing oven for cooking, smoking, etc.) in between the loading station 12 and the unloading station 14. The distance between the loading station 12 and the unloading station 14 may be increased depending on the dimensions and configuration of such a processing station.

At the unloading station, a stick 48 (e.g., as illustrated in FIG. 2), rod, bar or suitable holding structure is fed through the generally helical linked chain 32 in the unloading position B. It is understood that the term stick as used herein can be any structure that is used to carry the linked chain in the removal of the linked chain from the link support members. Once the stick 48 is inserted into the looped linked chain 32, the given conveyor is stopped and the stick is lifted upwardly relative to the link support members 40 such that linked chain is lifted off of the set of link support members 40. The stick 48 is then transferred directly to a processing station, e.g., a processing oven to cook or smoke the food product, or transferred into position to be received into a processing station. The movement of the conveyor may be stopped to insert the stick 48 into the linked chain. The stick 48 may be manually inserted into the linked chain or in preferred form, automatically inserted into the linked chain 32 and removed. In some embodiments, rather than being inserted into the looped chain, the looped linked chain 32 moves about a stationary stick 48 as the conveyor advances. It is understood that many other unloading mechanisms may be provided to unload the linked chain.

In preferred embodiments as described below with reference to FIGS. 8-14B, each link support member 40 is specially designed such that upon an outward pivoting of the link support member 40, the loop of the linked chain 32 is "opened" to allow for easier stick insertion. Such outward pivoting motion may be accomplished through the use of a cam, bar or other mechanism that causes several of the link support members 40 of a given set, and preferably, the entire set of link support members to pivot outwardly relative to the conveyor. The link support members and the pivoting mechanisms in these embodiments generally define a loop forming or loop opening apparatus for unloading.

Each conveyor 20, 22 is independently driven by motors 50, 52 while at the same time, the operation of the motors is coordinated to ensure that the sets 34, 36 of link support members do not collide or overlap each other. In one form, a separate master controller (see FIG. 9, for example) is coupled to both drive motors 50, 52 which coordinates the movement of one conveyor 20 relative to the other conveyor 22 to maintain a separation or gap 84 between sets 34, 36 of link support members. This gap 84 is illustrated in FIG. 4; however, it is noted that the illustration of FIG. 4, the gap 84 is not necessarily accurately reflected. Furthermore, in some embodiment, the gap 84 varies at different portions of the conveyor path depending on the process the respective conveyors perform. That is, in embodiments where the loading and unloading operations occur at generally the same time, the gap 84 is typically greater than that shown in FIG. 4. The gap 84 of FIG. 4 is indicated as such to better illustrate the different link support member lengths. In one form, gap 84 provides that while one set of link support members is at the loading station 12, the other set of link support members is at the unloading station 14.

In other embodiments, it is desired that the linker operate as continuously as possible. As such, the gap 84 is to be minimized to ensure that the sets 34, 36 of link support members 110 do not collide with each about the system. For example, the gap 84 is set such that as soon as possible after a loaded linked chain 32 has been loaded and left the loading station 12 towards the unloading station 14, the linker 16 produces the next linked chain which is loaded on another conveyor. Thus, the gap 84 is minimized at the loading station. Ideally, the linker would continuously output linked chains; however, any stoppage in a given conveyor would result in the collision of the link support members 110 unless the other conveyor is also stopped. Thus, the gap 84 is maintained to be minimal and to ensure that sets of the link support members do not collide. In these embodiments, depending on the length of the conveyor path and the length of the linked chains, additional sets of link support members may be coupled to each conveyor 20, 22 with a minimum gap 84 formed in between sets of link supports members to provide an adequate number of non-overlapping sets of link support members such that the linker may more continuously output and load linked chains 32.

In another form, rather than having a controller or automated control to coordinate operation of the multiple conveyors, the conveyors are simply monitored by an operator to maintain the separation or gap 84 between sets 34, 36. The operator may simply stop one conveyor to allow the other conveyor to advance relative to the other conveyor.

This independent but coordinated conveyor movement allows for independent operation of the loading and unloading processes at the loading station 12 and the unloading station 14. That is, while one linked chain is being loaded onto a given conveyor at the loading station 12, another chain is advancing to the unloading station 14 and/or is waiting on the other conveyor in a stationary position for unloading at the unloading station 14 and/or is being unloaded from the unloading station 14 and/or is being conveyed back to the loading station 12. Thus, in a broad sense, the loading operation of a given conveyor is not limited or affected by interruptions in movement of the other conveyor, e.g., interruptions in conveyor movement during unloading or any other stoppages of the conveyor. Similarly, while one linked chain is being unloaded from a given conveyor at the unloading station 14, another chain is advancing toward the unloading station 14 and/or being loaded onto the other conveyor at the loading station 12 and/or is stopped to "tie off" the casing, for example. Thus, the unloading operation of a given conveyor is not limited or affected by interruptions in movement of the other conveyor, e.g., interruptions in conveyor movement during loading or any other stoppages of the conveyor.

In some embodiments, since the linker 16 does not have to wait during a stoppage in the conveyor chain of a previously loaded linked chain and since the linker does not have to wait for a loaded linked chain to be unloaded then return back to the loading station 12 to load the next linked chain (because the linker 16 can load the next chain on the other conveyor during the conveying and/or unloading), the allowable time for the unloading process is increased without an increase in the production cycle time. That is, from the point of view of the linker 16, the linker does not have to wait for a given chain to be unloaded and conveyed back to the linker 16 to begin discharging the next linked chain for loading, the linker 16 only has to wait until the next set of link support members on the other conveyor is in position for loading. Ideally, another set of link support members 40 is in position to receive the next chain once the previously loaded chain departs the loading station 12. In some embodiments, the linker waits until the previously loaded linked chain is at the beginning of unloading a linked chain. Thus, from the linker's perspective, this eliminates the time for unloading from the production cycle, increasing the linker machine efficiency. Thus, in some embodiments, the time to unload a given linked chain from a given conveyor can be increased up to the time to load a given chain onto a given conveyor. Since the allowable time for unloading is increased, the unloading process can be automated, as in preferred embodiments.

Furthermore, any interruption in conveyor movement due to the unloading process and/or the conveying process does not result in the interruption of conveyor movement at the loading station. In contrast, if a single conveyor were used, a stoppage (even if for only a few seconds) to unload a loaded and conveyed linked chain would result in the entire conveyor stopping; thus, stopping a loading process on another set of link supports on the same conveyor from being simultaneously performed. Advantageously, since the set 34 of link support members being loaded at the loading station 12 is on another independently driven conveyor 20 than the set 36 on conveyor 22 being unloaded, the loading operation is not hindered by the unloading process and/or the conveying process. Thus, the linker 16 may operate more continuously, i.e., the linker 16 is not required to stop during the middle of creating a linked chain. Additionally, the interval in between loading is reduced in comparison to a single conveyor system since the linker can being loading the next linked chain shortly after the previously loaded linked chain leaves the loading station. That is, the linker 16 only has to wait until the next set 36 of link support members 40 is positioned at the loading station 12, which ideally occurs as soon as possible after the previously loaded linked chain departs the loading station. Alternatively, a set of link support members may be waiting at the loading station to be loaded until the previously loaded linked chains is conveyed a minimum distance from the loading station, then the loading operation and conveyor movement is resumed. Thus, the invention results in improved efficiency at the linker 16. In preferred form, this results in approximately a 10-35% increase in system production output in comparison to that of a single conveyor system without an increase in labor costs.

Furthermore, efficiency at the unloading station 14 is improved since the unloading process is independent of the loading and/or conveying processes. That is, any stoppages of conveyor movement at the loading station 12 and/or in conveying loaded linked chains to the unloading station 14 do not result in an interruption of conveyor movement at the unloading station 14. For example, an operator may have to stop movement of a given conveyor 20, 22 at the loading station 12 in order to "tie off" the end of the casing of the linked chain 32. It is noted that a very experienced operator may be able to tie off the casing while the loaded and linked chain 32 is being conveyed toward the unloading station. Although such an interruption in conveyor movement may only last a few seconds, in a single conveyor system, this stoppage would limit the movement of the conveyor at the unloading station, possibly limiting the conveyor operation if conveyor movement is needed at the unloading station. On the other hand, according to several embodiments of the invention, the operator may stop the movement of the conveyor 20 at or proximate to the loading station to tie off the casing independent of the movement of the conveyor 22 at the unloading station 14. Again, such delays although short would result in an inefficiency over time.

As stated above, in order to coordinate the independently driven conveyors, the operation of the drive motors 50, 52 may be controlled by a separate controller (see controller 53 of FIG. 9, for example) coupled to both motors 50, 52. The operation of the conveyors 20, 22 is independent but should be coordinated in some way in order to ensure that the sets 34, 36 of link support members do not collide with each other. That is, there should be a distance or gap 84 maintained between the sets 34, 36 of link support members. In one embodiment, when one conveyor is loading, the other conveyor is conveying a previously loaded linked chain toward the unloading station 14 and/or is unloading the previously loaded linked chain and/or conveying an unloaded set of link support members back to the loading station 12. As described above, in some embodiments, it is desired that the separation or gap 84 between sets of the link support members be minimized to ensure as near to continuous operation of the linker 16 while at the same time providing enough gap 84 to avoid overlapping or colliding successive sets 34, 36 of link support members 110. Thus, the gap 84 should not allow a moving conveyor to catch up with a stopped conveyor.

In preferred embodiments, the gap 84 between sets of link support members 34, 36 is variable at different points of the conveyor path, such that as soon as possible after a linked chain 32 has been loaded onto a given set 36 of link support members at the loading station 12, the next set 34 of link support members is in position at the loading station 12 to load the next linked chain. In these embodiments, the time to convey a given linked chain to the unloading station 14, unload the linked chain and then convey the set of link support members back into position to receive the next linked chain at the loading station 12 is set to be no more than the time it takes to load a given linked chain 32 onto a given set of link support members. This will ensure that a set of link support members is in position to receive the next linked chain from the linker 16 as soon as the linker 16 is able to produce another linked chain; therefore, providing near continuous linker operation. However, the gap 84 must still be maintained such that the unloaded set of link support members does not collide with a set of link support members being loaded at the linker 16, i.e., the set of link support members approaching the loading station 12 after unloading may have to be stopped as it approaches the loading station 12 to avoid a collision. Again, since the loading process on a given conveyor is not affected by interruptions in movement of the other conveyor (e.g., due to unloading or maintaining a gap 84), the linker operation is not interrupted while producing a linked chain and another set of link support members is in position to receive the next linked chain to be output from the linker 16. Thus, preferably, the linker 16 operates near continuously while independently of the other processes occurring on the conveyor path (e.g., conveying, unloading) providing for improved efficiency.

In one embodiment, one or more proximity switches are located at various locations about the conveyor movement path that detect the presence of the sets of the link support members and assist the controller 53 in maintaining the desired gap 84. For example, proximity switches may be located at one or more of the beginning and end of the loading and unloading stations, and/or at one or more locations in between the loading station and the unloading station, each proximity switch coupled to the controller 53. In preferred form, a single proximity switch is positioned at the beginning of the loading station. The one or more switches would detect the beginning and/or end of a particular set of link support members. Furthermore, the proximity switches may count the number of pitches or chain links 54 the conveyor chain has moved from a given position. Knowing the position of the beginning and/or the end of a given set of link support members, the controller 53, can send the appropriate control signals to the appropriate motor 50, 52 and to the linker 16. For example, knowing when a given set of link support members has left the loading station, the controller sends a loading control signal to another set of link support members on another conveyor waiting to be loaded such that after a predetermined number of conveyor chain links have passed the proximity switch (or after a specified time, the controller 53 knowing the velocity of the conveyor leaving the loading station 12), the loading control signal starting the movement of the other conveyor and the operation of the linker 16.

Again, the loading operation is not interrupted by the conveying and/or unloading of the previously loaded linked chain. Such proximity switches and the use are well known in the art.

Alternatively, the drive motors 50, 52 are not coupled together at a controller; however, an operator prevents the sets of link support members on the conveyors from overlapping each other. The operator would be able to temporarily stop one conveyor and to allow a conveyor to move ahead in order to maintain a minimum separation, for example, by using controls on a control panel.

In one embodiment, a master controller is coupled to the drive motors 50, 52, the linker 16 and the automated structure that unloads the linked chain. The automated system sends a control signal to the linker 16 and the drive motors 50, 52 that it has unloaded a given linked chain, which allows the drive motors to properly control the respective conveyors 20, 22.

Next referring to FIGS. 8-14B, another embodiment of a conveyor system in accordance with the present invention is presented. As illustrated in FIG. 8, the linker 16 is located such that the horn 46 outputs the linked chain 32 at the end of the conveyor system 100 about sprocket 24. Note that in the conveyor system 100 of FIGS. 8-14B, the loading station 12 and unloading station 14 are at opposite ends as the conveyor system 10 of FIGS. 1-5. It is further noted that the unloading station 14 is illustrated at position B of the conveyor, although it may alternatively be located at position C.

Operation of the conveyor system 100 is described with reference to FIGS. 9-14B. The conveyor system 100 of FIGS. 8-14B operates similarly to the conveyor system 10 of FIGS. 1-7 in that the system includes the upper conveyor 20 and the lower conveyor 22 that are independently driven but coordinated in order to more efficiently load, convey and unload linked chains 32 of food product, which results in an increase in system production in comparison to single conveyor system as described above. However, the system 100 of FIGS. 8-11 illustrates a preferred design of a link support member 40 (suspension device) and further details of a preferred loading and unloading mechanism. The conveyor system 100 includes a support frame structure 152 for supporting conveyor frame 68. Additionally, each conveyor 20, 22 is likewise controlled by controller 53, which is coupled to independent drive motors 50, 52. The controller 53 includes control functionality (e.g., implemented in software) to coordinate the movement of the two conveyors. For example, the controller 53 controls the movement based upon inputs received from the linker 16, the drive motors 50, 52 and one or more proximity switches located at one or more desired locations of the system for detecting the position of the sets 34, 36 of link supports members. For example, as described above, the controller sends the appropriate control signals to start and stop each conveyor 20, 22 and to maintain a desired minimum separation 84 between consecutive sets of link support members (e.g., sets 34, 36) on different conveyors. The controller 53 may also send control signals to the linker to start and stop its operation. Similarly, the controller 53 may control the operation of an automated unloading process.

As illustrated in the left portions or loading ends of FIG. 9 (enlarged in FIG. 13A) and in FIG. 10 (enlarged in FIG. 14A), the loading station 12 (i.e., the loading end of the conveyor system 100) is positioned to receive a linked chain output from the horn 46, such that the product is loaded onto the link support members 110 of a set 34 of link support members. In order to present the link support member 110 to easily receive the linked chain, a loading cam 102 located at the loading station 12 mechanically engages each link support member 110 as it rounds the corner of the conveyor to pivot it laterally outward about its upper end with respect to the direction of movement of the conveyor (e.g., pivoted outward at an angle of about 25 degrees as illustrated at point D). Again, the linked chain is loaded as a series of connected loops about the set of link support members 110, each link support member 110 holding a specified number of links (e.g., loops 80 and 82 of FIGS. 6-7).

Once loaded, the upper conveyor 20 then conveys the linked chain 32 a specified distance to the unloading station 14 where the linked product is to be removed from the link support members 110. However, according to several embodiments of the invention, while the linked chain 32 is being loaded onto set 34, a previously loaded and conveyed linked chain is being conveyed to the unloading station 14 and/or being unloaded at the unloading station 14. In preferred form, for removal, mechanical engagement with an unloading member 104 (see FIGS. 11 and 14B), e.g., a cam, bar or other mechanisms at the unloading station 14 causes the set 36 of link support members 110 (e.g., of conveyor 22) to pivot laterally outward about their upper ends with respect to the direction of movement of the conveyor.

It is noted that the terms "outward" and "inward" as used in connection with the pivoting motion of the link support members (suspension devices), are generally relative to the conveyor system. For example, outward pivoting refers to the pivoting motion of the link support member away from the conveyor system, while inward pivoting generally refers to the pivoting motion of the link support member towards the conveyor system.

Figure 11:
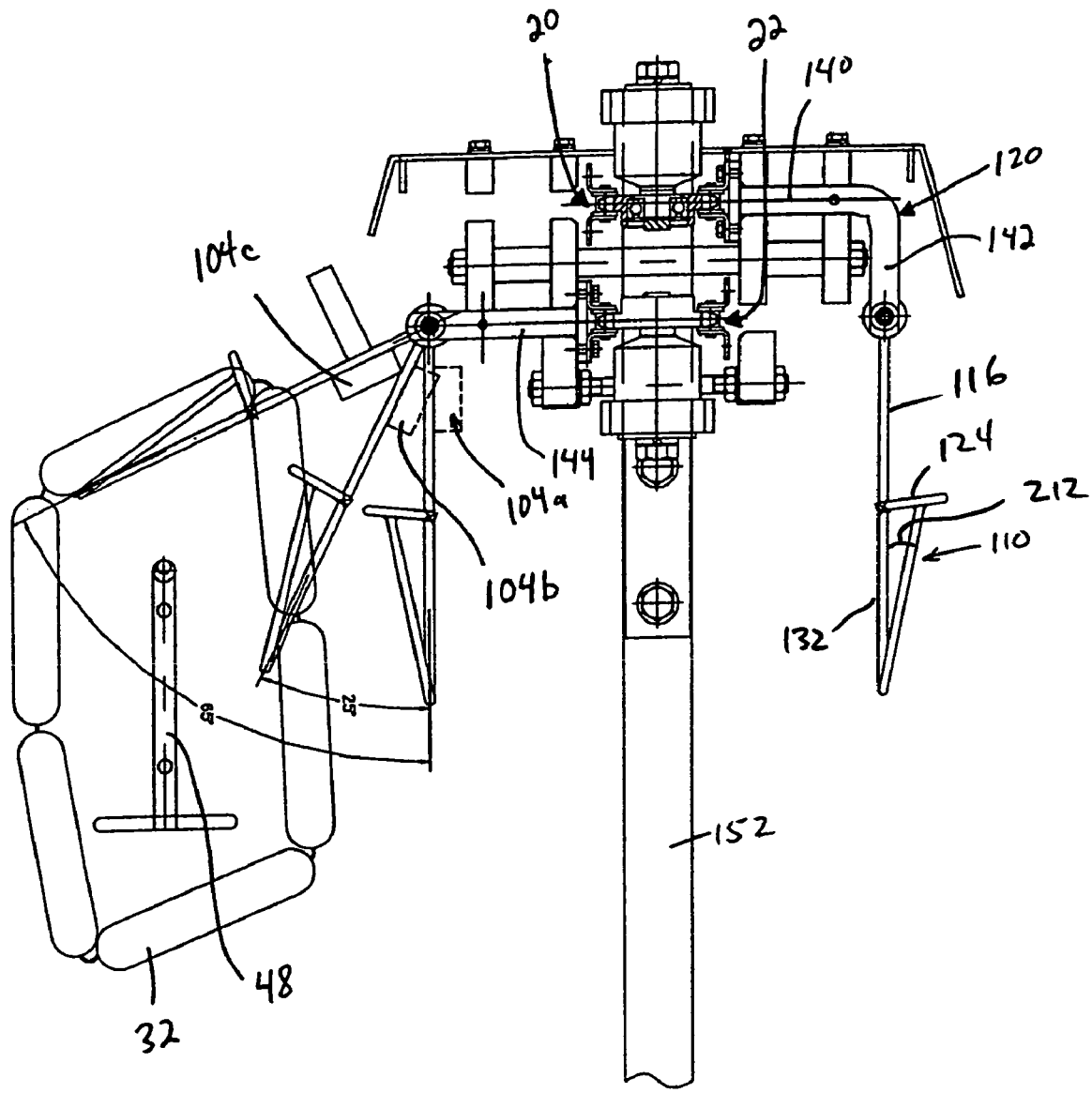
FIG. 11 is an end side elevational view taken along line 11-11 of FIG. 9 illustrating the orientation of the link support members and the linked food product thereon at the unloading process.
Figure 14A:
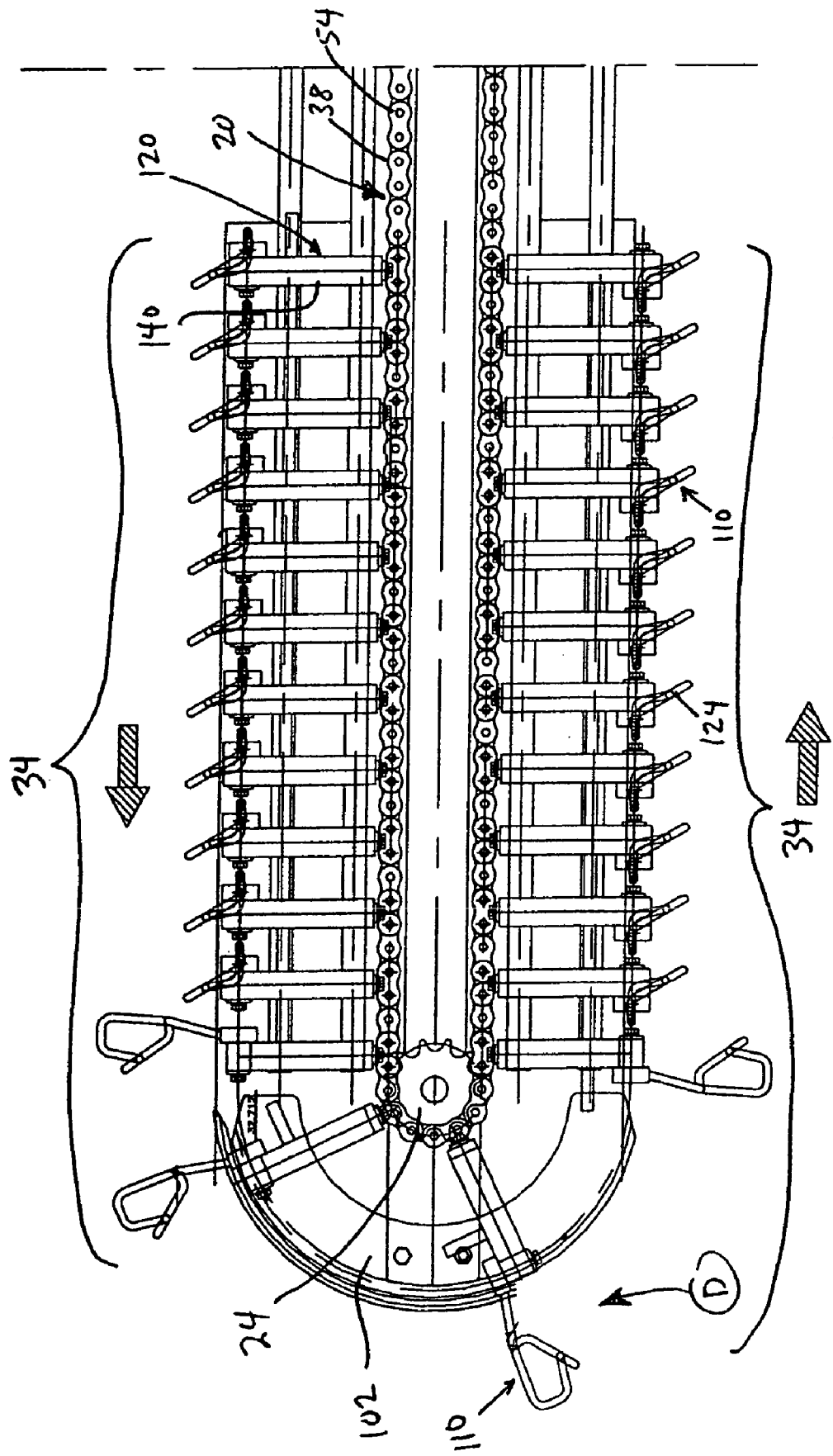
FIGS. 14A and 14B are enlarged plan views of the conveyor system of FIG. 10 illustrating the loading end and the unloading end, respectively, of the conveyor system.
Figure 14B:
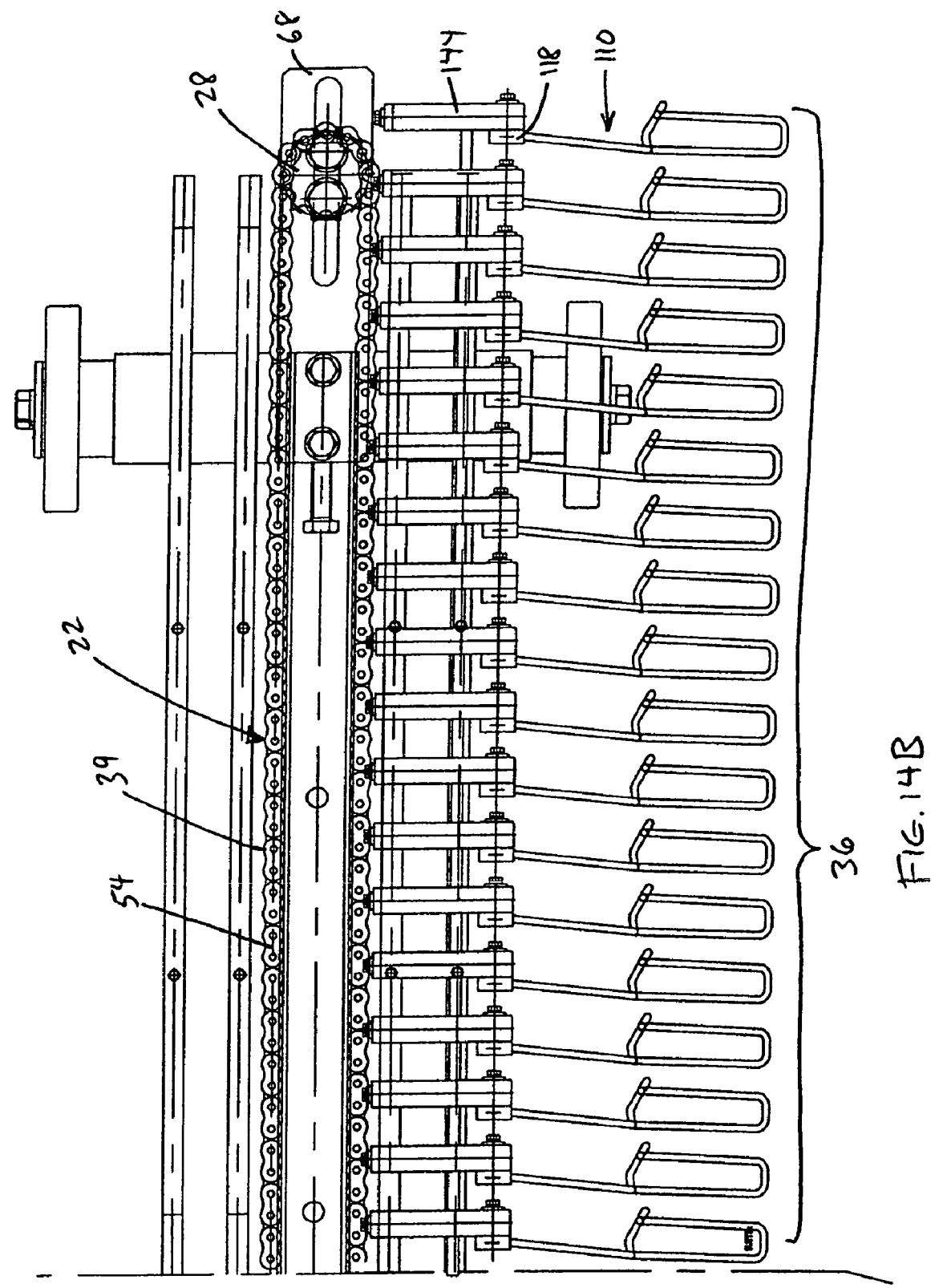

One embodiment of the unloading member 104 is illustrated in the views of FIG. 11 and FIG. 14B. For example, the unloading member 104 is an elongated bar extending about the length of the unloading station 14. Initially, the unloading member 104 bends laterally outward slightly and then runs alongside the conveyors but laterally displaced. Thus, as a given set of link support members is conveyed toward the unloading station 14, each link support member 110 engages the outwardly extending unloading member 104 (the loading station end of which is illustrated in position 104a in FIG. 11), which through mechanical engagement and the link support members 110 being pivotally coupled to the conveyor, the link support members 110 pivot laterally outward (an intermediate position illustrated as 104b in FIG. 11) until all of the link support members 110 of the given set are in an unloading position (shown as 104c in FIG. 11 and in FIG. 14B). Thus, the unloading member 104 is a continuous bar that extends or bends laterally outwardly from position 104a to 104c and then extends at a fixed lateral position from the conveyor to remains at position 104c through the unloading station 14. It is noted that the unloading member 104 may include more than one member or bar in order to accomplish the transition from position 104a to position 104c, such as illustrated in the embodiments of FIGS. 17-26H.

In an alternative embodiment, the unloading member 104, extends across the unloading station 14 in position 104a of FIG. 11, and through an appropriate actuation (e.g., a pneumatic cylinder or manual actuation), is caused to move laterally outward (e.g., moving to position 104b and finally to position 104c) such that the entire set of link support members are pivoted to an unloading position (see also FIG. 14B). However, it is noted that an unloading member 104 is not required in all embodiments in order to unload a linked chain. Several alternative embodiments are illustrated in FIGS. 17-26H.

As the link support members 110 of set 36 pivot laterally outward and upward about a pivot axis 122 (seen in FIG. 12, e.g., at an upper end of the link support member), a lower portion (e.g., a U-shaped section 114 as described below) of the link support member 110 also moves outward and upward and functions to "open-up" the looped chain 32, while at the same time the stick 48 or other holding device is inserted into the looped chain having been opened (illustrated in FIG. 11). Thus, the link support member 110 and the structure to cause the pivoting generally comprise a loop forming or loop opening apparatus. The lateral outward and upward pivoting of the set 36 of link support members 110 about the pivot axis 122 can be seen in the right side of FIG. 9 and more clearly in the enlarged view of FIG. 13B (e.g., the link support members 110 appear shorter) and in FIG. 10 and more clearly in the enlarged view of FIG. 14B (e.g., the link support members 110 are visible in the plan view). In preferred form, in the unloading position, the link support members 110 are pivoted outward at about 65 degrees relative to a vertical axis; however, such pivot angle may vary depending on the specific implementation.

In operation, once the entire set 36 of link support members 110 is pivoted outward about the pivot axis 122, the conveyor 22 is stopped and the stick 48 is lifted vertically upward; thus, lifting the looped food product off of the link support members 110. The loaded stick 48 is then moved, carried or rotated away to insert the looped and linked chain of food product into a separate food processing station (or moved into position to be received by a food processing station) to be cooked or otherwise processed. The movement of the conveyor 22 is then resumed such that as the link support members 110 begin to round the corner at the end sprocket 28, the unloading member 104 is shaped to cause the link support members 110 to pivot back to their normal vertically disposed orientation. Alternatively, the unloading member 104 is caused to retract back to the initial position (e.g., position 104a), then the conveyor movement is continued. The set 36 of link support members then "races" around the conveyor track and returns to the loading station 12 to load another linked chain 32.

Alternatively, once the set 36 of link support members is pivoted outward and the stick 48 is inserted into the opened loop, the conveyor 22 is stopped and the link support members 110 are caused to pivot inwardly back to the their normal vertically disposed orientation relative to the stick, which is held vertically stationary (or alternatively lifted upward as the link support members 110 drop). Thus, the downward motion of the link support members 110 relative to the stationary stick 48 or upward movement of the stick causes the stick 48 to "lift" the loops off of the descending link support members. The stick, which is now loaded with the looped and linked chain of food product, is then moved into the separate food processing station or into position to be received by a food processing station. It is noted that the stick insertion and other stick 48 motions (e.g., lifting, moving to the separate processing station) may be automatically performed by a robot (e.g., and controlled in part by controller 53) or manually performed by an operator. In this alternative form, the unloading member 104 that caused the link support members 110 of a given set 34, 36 to pivot outward is made to retract or move downward; thus, causing the link support members to pivot back inwardly. The unloading member 104 and the link support members 110 retract either through the shape of the member 104 bending back to the position 104a or through an actuating device that causes the unloading member 104 and the link support members 110 to drop to position 104a. Again, once unloaded, the movement of the conveyor 22 is then resumed and the set 36 of link support members then "races" around the conveyor track and returns to the loading station 14 to load another linked chain of food product.

Figure 12:
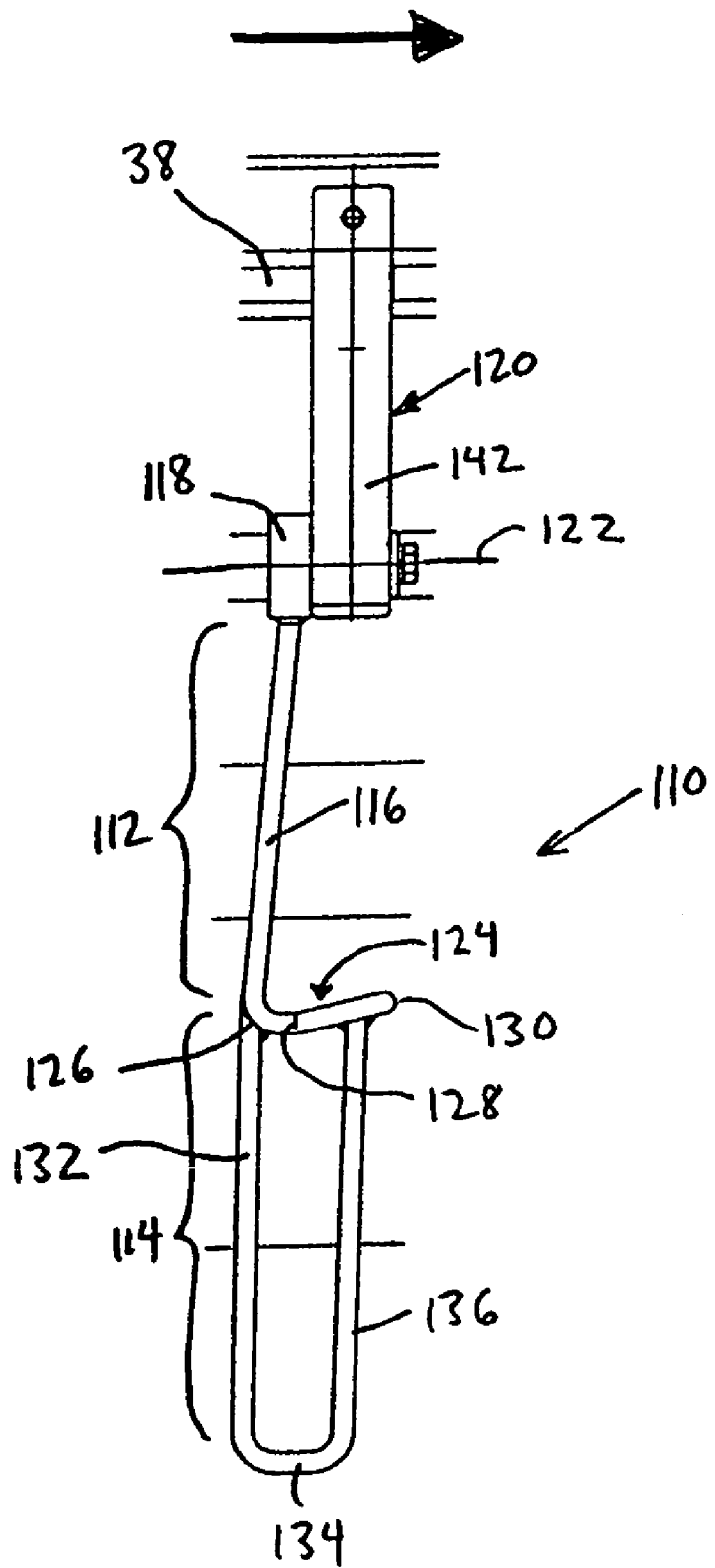
FIG. 12 is a side view of the preferred link support member (suspension device) of FIGS. 9-14B.
Figure 15A:
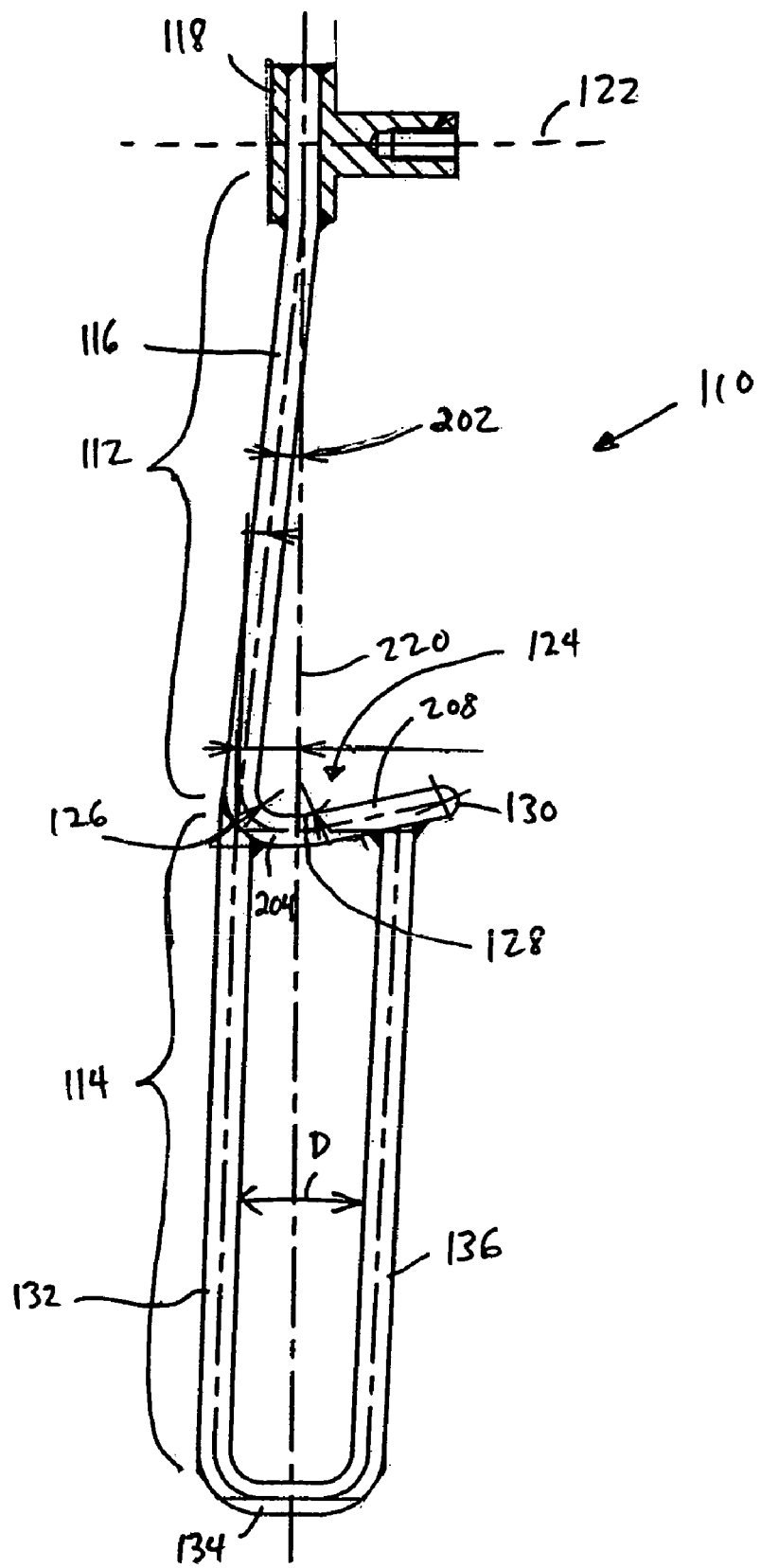
FIG. 15A is an enlarged side view of the link support member of FIG. 12 in a normal non-pivoted orientation.
Figure 15B:
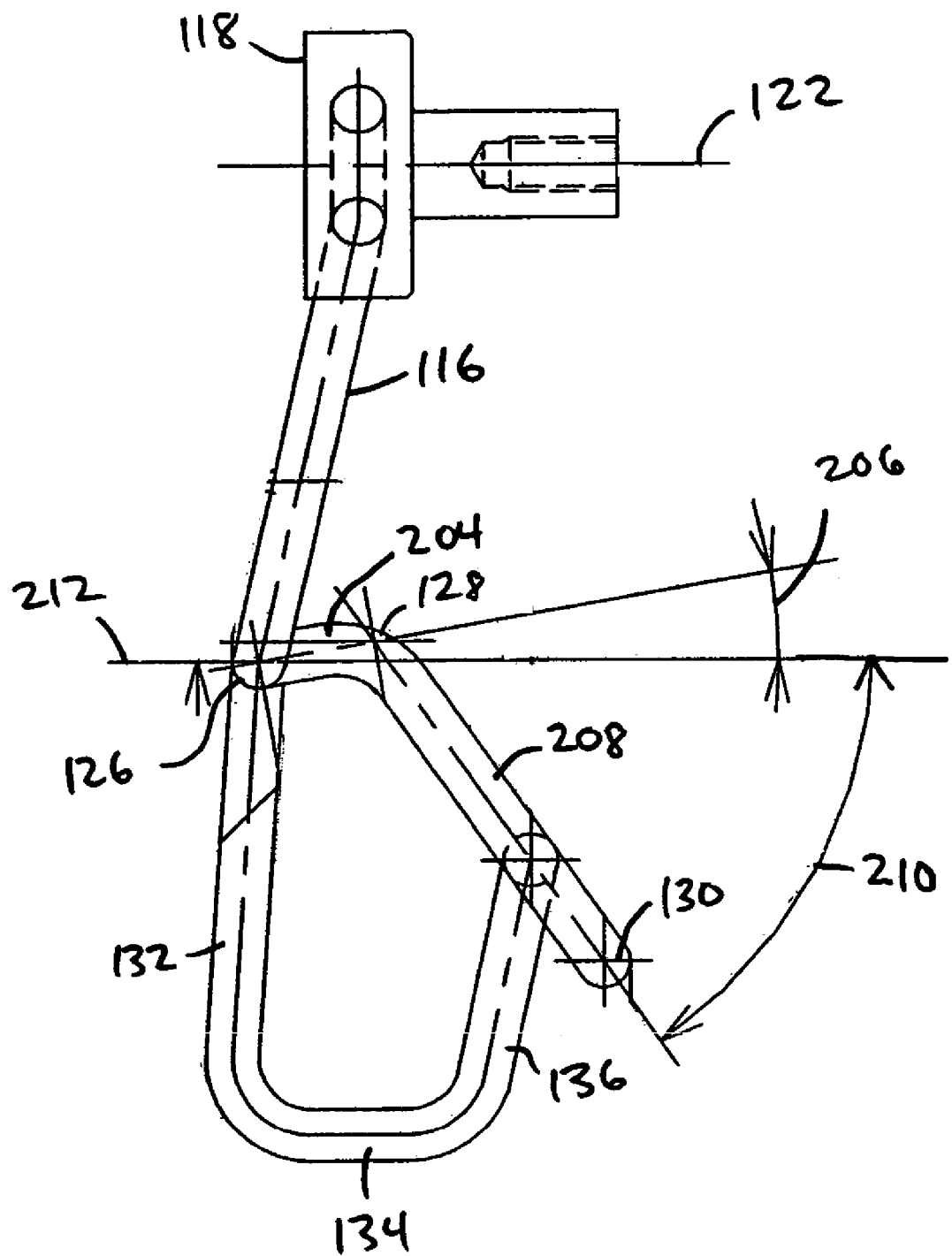
FIG. 15B is a top view of the link support member of FIG. 12 in a pivoted orientation of approximately 25 degrees from vertical.

A preferred link support member 110 (referred to generically as a suspension device 110) of the conveyor system 100 of FIGS. 8-14B is illustrated in the side elevational view of FIG. 12. Additional views of the link support member 110 are illustrated in FIGS. 15A-15B. For example, FIG. 15A is an enlarged side view in a normal, non-pivoted orientation and FIG. 15B is a top plan view of the link support member 110 in a pivoted orientation of approximately 25 degrees from the vertical.

The link support member 110 includes a link support section 112 (also referred to as the link support portion 112) and a U-shaped lower section 114 (also referred to as the lower portion 114). The link support section 112 includes a downwardly extending section 116 extending vertically from an upper end to the U-shaped lower section 114. The upper end is attached to a movable support 118, which is pivotally attached to the bracket 120. Bracket 120 is rigidly fixed to one of the links of the respective conveyor chain. Thus, support 118 rotates to allow the link support member 110 to pivot laterally inward and outward, i.e., the link support member 110 pivots about a pivot axis 122 which is parallel to the direction of movement of the conveyor chain. Thus, in a general sense, the downwardly extending section 116 is pivotally coupled to the conveyor chain such that the section 116 can pivot about the pivot axis 122. The downwardly extending section 116 extends downward at a rearward angle 202 (as seen best in FIG. 15A) relative to vertical. In the illustrated embodiment, the downwardly extending section 116 is oriented at an angle 202 of between 0 and 10 degrees to vertical. At another portion of the downwardly extending section 116 is the holding portion 124. The holding portion 124 comprises a first segment 204 that extends forward (in the direction of conveyor movement) and laterally inward at an angle 206 (as seen in FIG. 15B) from an inner end 126, and a second segment 208 that extends at a second angle laterally outward and upward to an outer end 130. The first segment 204 bends into the second segment 208 at point 128. The lateral angle of the second segment 208 is illustrated in FIG. 15B as angle 210. It is noted that in preferred form, the pivot axis 122 is parallel to the direction of movement of the conveyor; however, it is understood that in other embodiments, the moveable support 118 and bracket 120 may be configured such that the pivot axis is not parallel to the direction of conveyor movement. However, due to the unloading techniques of several embodiments, the pivot axis 122 is non-perpendicular to a direction of movement of the conveyor.

The U-shaped lower section 114 includes a leg 132 (also referred to as a first lower downward extending portion 132) which is contiguous with (or rigidly attached to) the downwardly extending section 116 and extends from the inner end 126 of the holding portion 124 vertically downward a distance approximately equal to the length of the downwardly extending section 112. It is noted that depending on the embodiment, leg 132 may extend other distances vertically downward. This distance is typically a function of the length of a given link of the linked chain. At its lower end, the leg 132 bends into a bottom leg 134 (also referred to as a bottom lower portion 134) of the U-shaped section 114, which extends in the horizontal plane in the direction of the movement of the conveyor. In some embodiments, the bottom leg 134 also extends at an angle laterally outward from the conveyor while extending horizontally in the direction of movement. The bottom leg 134 then bends upward into another leg 136 (also referred to as a second lower downward extending portion 136) of the U-shaped section 114. Leg 136 extends substantially vertically at a laterally outward angle 212 (as seen in FIG. 11) and meets with the holding portion 124 proximate to its end 130. As illustrated, the U-shaped section 114 resembles an elongated letter "U" extending from the inner end 126 at the downwardly extending section 116 to proximate the end 130 of the holding portion 124. It is noted that the leg 132 extends in alignment with the downwardly extending section 116, such as seen in the view of FIG. 11; however, it is noted that leg 132 extends downward at a slightly different angle than that of section 116 from the view of FIG. 12.

The specific configuration of the link support member 110 adds to the efficient design of the conveyor system 100 and is especially useful in the automated unloading of linked chain 32. That is, the unloading may be efficiently performed by pivoting the link support members 110 laterally outward to open the loops in the suspended linked chain for stick insertion, then lifting the stick 48 and the links of food product off of the link support member 110. Alternatively, after being pivoted outward, the link support members 110 may be pivoted back to their normal orientation in a vertical plane while the stick 48 is maintained at a fixed vertical position or alternatively moved vertically upward such that the stick "lifts" the food product off of the set of link support members. In either case, the orientation of the holding portion 124 allows for adequate hanging or suspending functionality while facilitating removal by not interfering with removal of the linked food product. That is, the holding portion 124 is oriented and structured to not resist lifting of the linked food product from the link support member 110.

Figure 16:
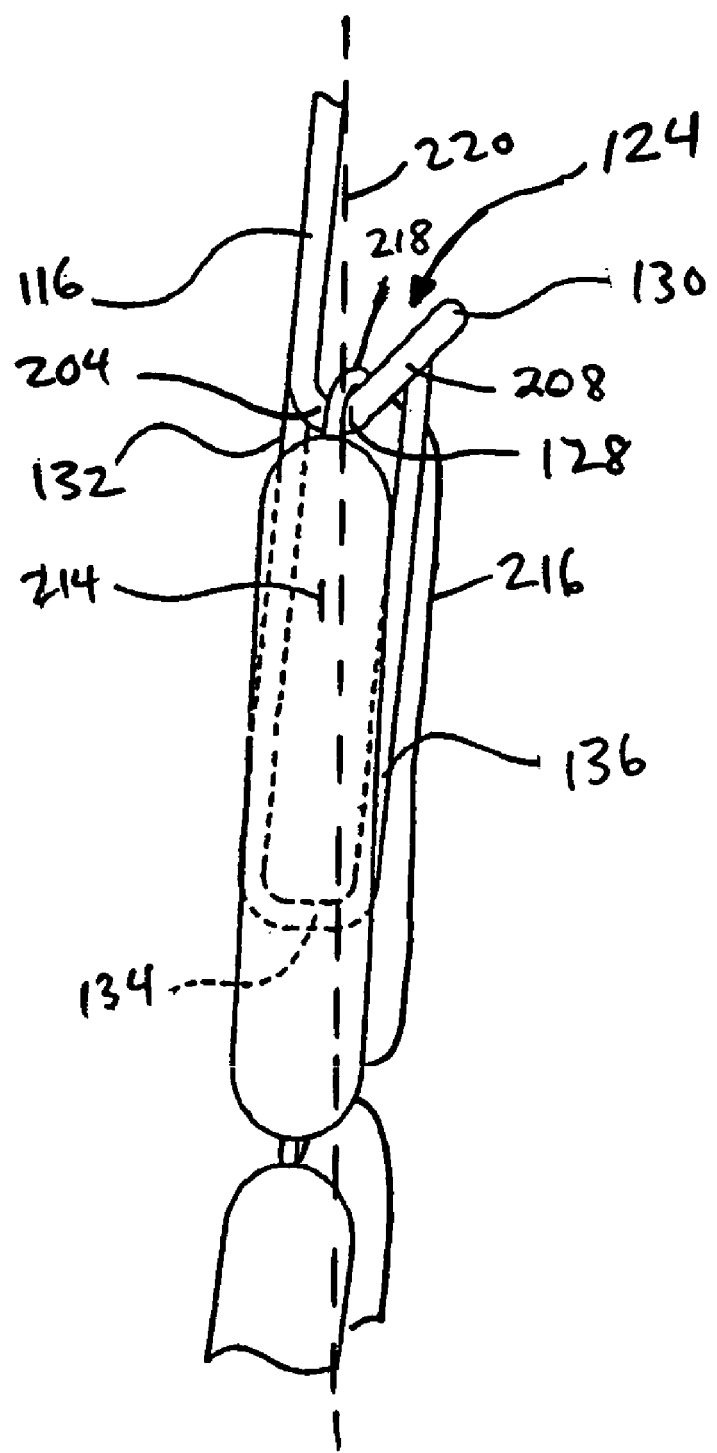
FIG. 16 is a side view of the link support member of FIG. 12 suspending a portion of a chain of linked food products therefrom.

As seen in FIG. 16, the chain of link food product is suspended from the holding portion 124. That is, the chain of links is suspended proximate to the junction of the first segment 204 and the second segment 208 near point 128. Links 214 and 216 are suspended from the holding portion 124, the connector piece 218 linking the two links 214 and 216 stretching over the holding portion 124. As seen in FIG. 15A, the link support member 110 is preferably designed such that the chain of linked food products rests along a central axis 220 extending downward from the support 118, such that the weight of the chain is centered directly under the support 118. The rearward angle 202 of section 116 allows the chain to rest about axis 220 near point 128. Furthermore, the fact that leg 136 extends laterally outward from the bottom leg 134 moving toward the holding portion 124 assists to hold the links in position when conveying the chain of linked food products to minimize side-to-side movement of the links. Thus, link 214 rests against the bottom leg 134 and leg 136 to minimize movement of the links on the link support member 110, both in conveying and when the link support member 110 is pivoted outwardly. In other words, the structure of the legs 132, 134 and 136 assists to cradle and support the link 214 to stabilize the chain in operation.

Additionally, the elongated U-shaped section 114 of each link support member 110 functions to lift the outer links of the chain of food product links as the link support member 110 pivots laterally outward in order to "open up" the loop for stick insertion. That is, the leg 132 and the bottom leg 134 of the U-shaped section 114 engage the outer links (e.g., link 214) to open the loop, as shown in FIG. 11. Additionally, the legs 132 and 136 act to guide the linked product so that it will not roll or fall off of the bottom 134 in the raised or "open" position of FIG. 11. The distance D (seen in FIG. 15A) between the legs 132 and 136 is typically based on the dimensions of the linked chain that is to be used.

Figure 13A:
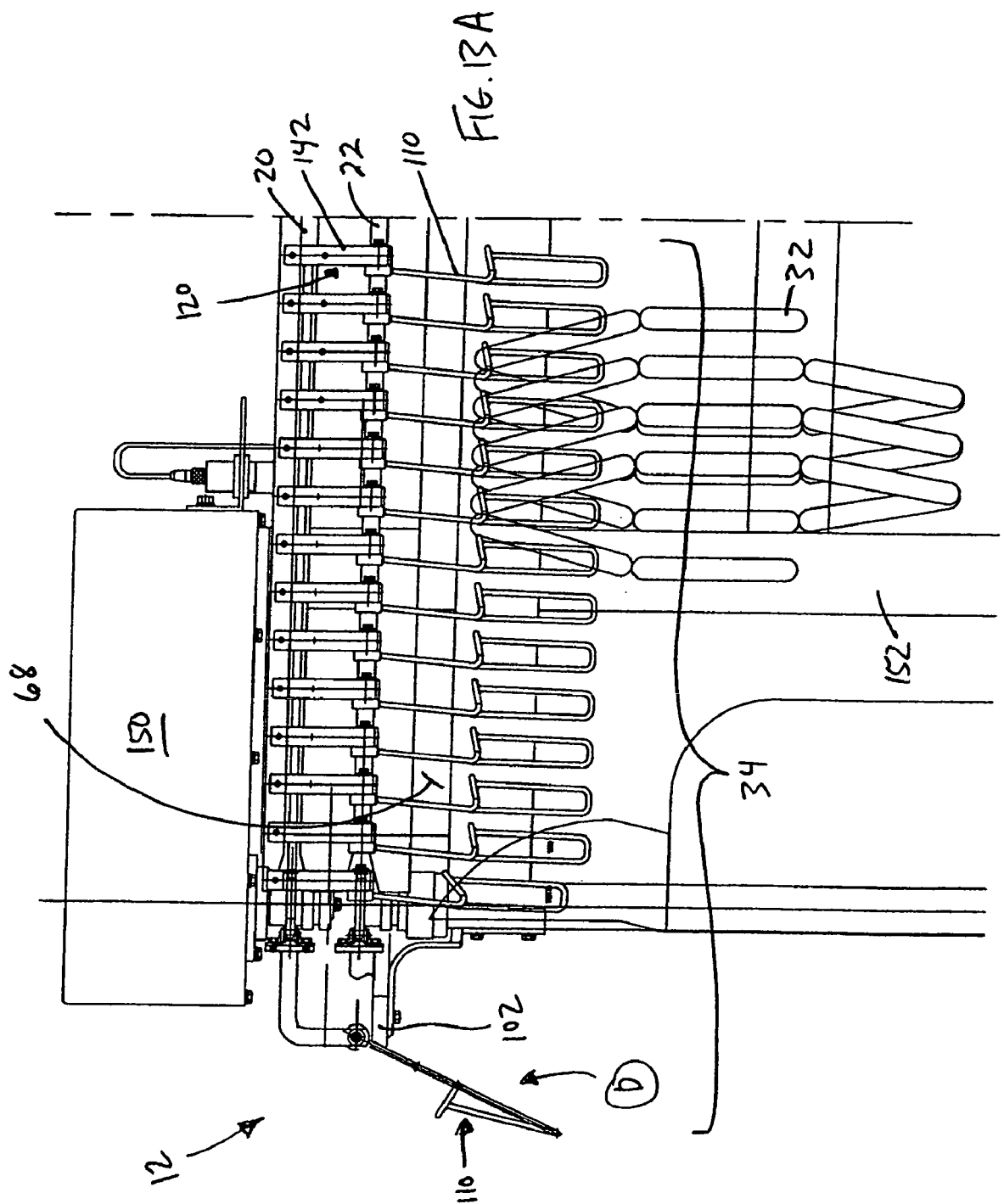
FIGS. 13A and 13B are enlarged side elevational views of the conveyor system of FIG. 9 illustrating a loading end and an unloading end, respectively, of the conveyor system.

Various views of the preferred link support member 110 in operation are illustrated in FIGS. 13A-14B. For example, FIGS. 13B and 14B illustrate the link support members 110 pivoted laterally outward at approximately 65 degrees for unloading. As described above, the dimensions and angles of the components of the link support member 110 are designed to adequately support the linked chain and minimize removal resistance when unloading at the unloading angle, in this case, at 65 degrees. FIGS. 13A and 14A illustrate the link support members 110 pivoted laterally outward at about 25 degrees for loading. Again, the dimensions and angles of the components of the link support member 110 are designed to easily receive the linked chain and suspend the links therefrom at the loading angle, in this case, at 25 degrees. It is noted that in FIG. 14A, a top view is shown of many of the link supports of set 34 in their normally vertically disposed orientation; thus, illustrating the orientation of the holding portion 124. It is also noted that the loop forming or loop opening structures and techniques described herein are not required to be used in a multi-conveyor system and may be used in a single conveyor system as well as a multi-conveyor system.

Again, as with the conveyor system 10 of FIGS. 1-5, since the linker 16 can load one set 34 of link support members while another set of link support members is simultaneously being unloaded, the unloading time is eliminated from the production cycle at the linker. Thus, in some embodiments, the allowable time for unloading can also be increased, in comparison to a single conveyor system with a single set of link supports, which must wait for the completion of unloading to produce the next linked chain. Additionally, the allowable unloading time is also increased in comparison to a single conveyor system having multiple sets of link supports or continuous link supports in which operation of the linker and loading operation is interrupted by conveyor stoppages during the unloading operation. Thus, in preferred embodiments, the allowable unloading time increase allows the unloading process may be automated. The design of the unloading mechanism is such that the unloading member 104 opens the linked chain for unloading. Once opened, the conveyor typically stops and the stick 48 is inserted by a robot or other automated structure into the opened chain (or alternatively, the opened chain is conveyed about the stationary stick). At this point, either through raising the stick 48 and/or lowering the link support members 110, the linked chain is lifted off of the link support members. Again, due to the design of the link support members 110, resistance to such vertical lifting motion is minimized, while at the same time the link support member is designed to adequately hold and support the linked chain and minimize the likelihood that the links will fall out of the link support members 110. Again, the robot or other automated structure then transfers the loaded stick into a processing oven as is known in the art.

It is also noted that as described above, although the unloading time may be increased, in some embodiments, the unloading time is minimized, which will minimize the time length of conveyor stoppages. Minimizing the time length of conveyor stoppages leads to minimizing the separation or gap 84 that is to be maintained to avoid colliding sets of link support members, which will allow the linker to operate more continuously. Additionally, as described above, the gap 84 is to be minimized between the end of loading a given set of link support members and the beginning of loading the next linked chain onto the next set of link support members at the loading station 12. Thus, in such embodiments, the time duration of loading a given linked chain 32 onto a given set of link support members is at least as long as the time duration to convey a given linked chain 32 to the unloading station 14, unload the linked chain and then convey the set of link support members back into position to receive the next linked chain 32 at the loading station 12. This will ensure that a set of link support members is in position to receive the next linked chain from the linker 16 as soon as the linker 16 is able to produce another linked chain; therefore, providing near continuous linker operation.

Figure 13B:
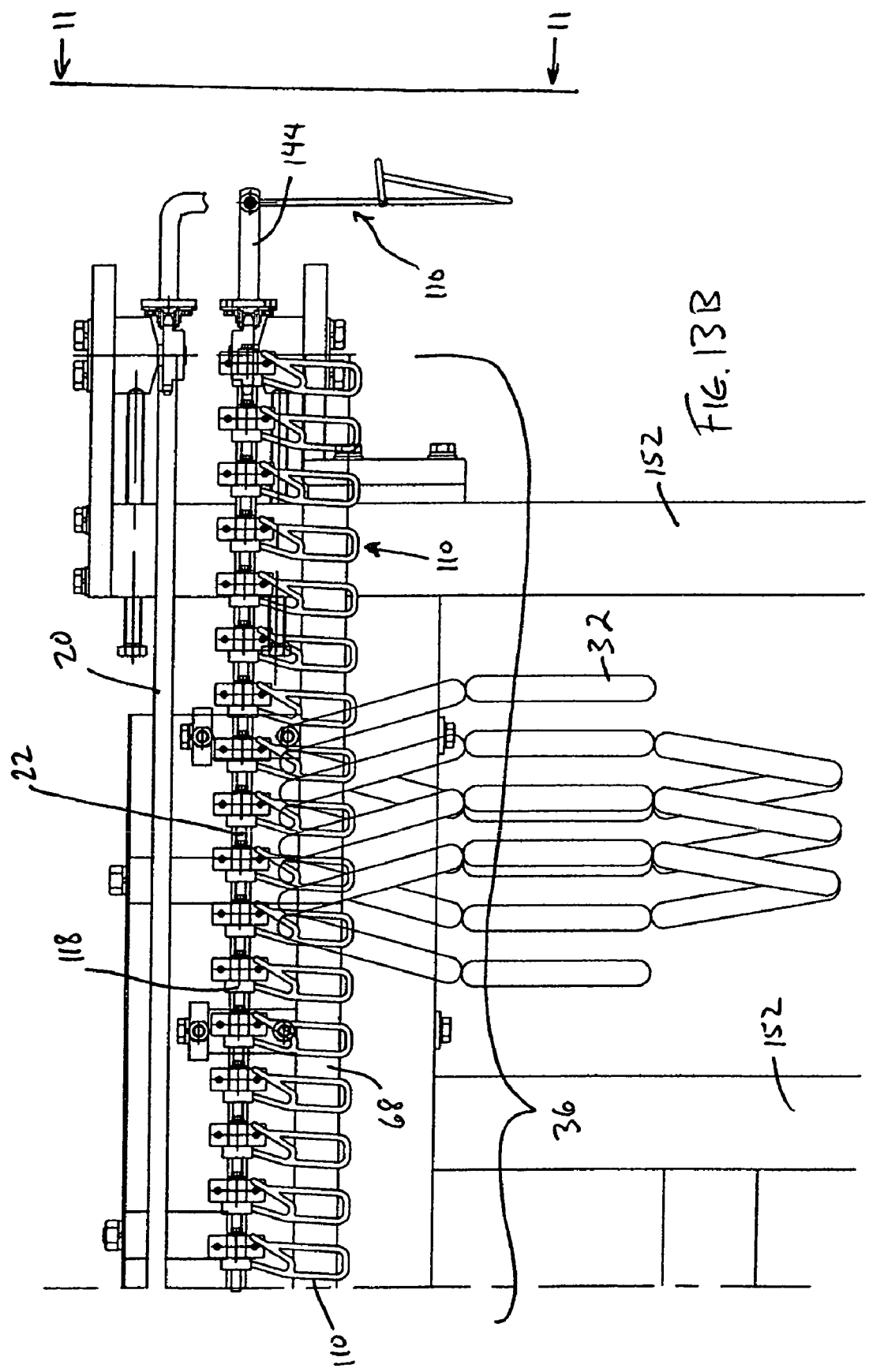

Also illustrated in FIG. 12 as well as the enlarged views of FIGS. 13A and 14A is the bracket 120 that couples the link support member 110 to the upper conveyor 20. In the conveyor system of FIGS. 8-14B, the link support members 110 are all designed the same. That is, the downwardly extending sections 116 of the link support members 110 coupled to both the upper conveyor 20 and the lower conveyor 22 are the same length. However, in order that the holding portions 124 remain at the same elevation to best cooperate with the linker at the loading station 12 and the stick insertion technique at the unloading station 14 (which is preferably automated), bracket 120 couples to the upper conveyor 20 at its upper end and couples to the link support member 110 at its lower end. For example, bracket 120 includes two legs 140, 142. Leg 140 is affixed to the conveyor chain at one end and extends horizontally outward from the conveyor chain a specified distance, then bends approximately 90 degrees into leg 142 which extends generally vertically downward such that the support 118 is rotatably received into a lower end of leg 142. The length of leg 142 accounts for the difference in elevation between the upper and lower conveyors 20, 22.

In comparison, as can be seen in FIGS. 13B and 14B, the link support members 110 of set 36 are coupled to the lower conveyor 22 with bracket 144. Bracket 144 is affixed to the lower conveyor chain 39 at one end and extends horizontally outward from the chain such that it receives support 118 at its outer end. It is noted that bracket 144 extends horizontally outward approximately the same distance as leg 140 of bracket 120. Thus, the brackets 120 and 140 allow the link support members 110 to be vertically positioned at the same elevation, i.e., a different link support member is not required for the upper and lower conveyors 20, 22 as is illustrated in the conveyor system 10 of FIGS. 2-5.

Figure 17:
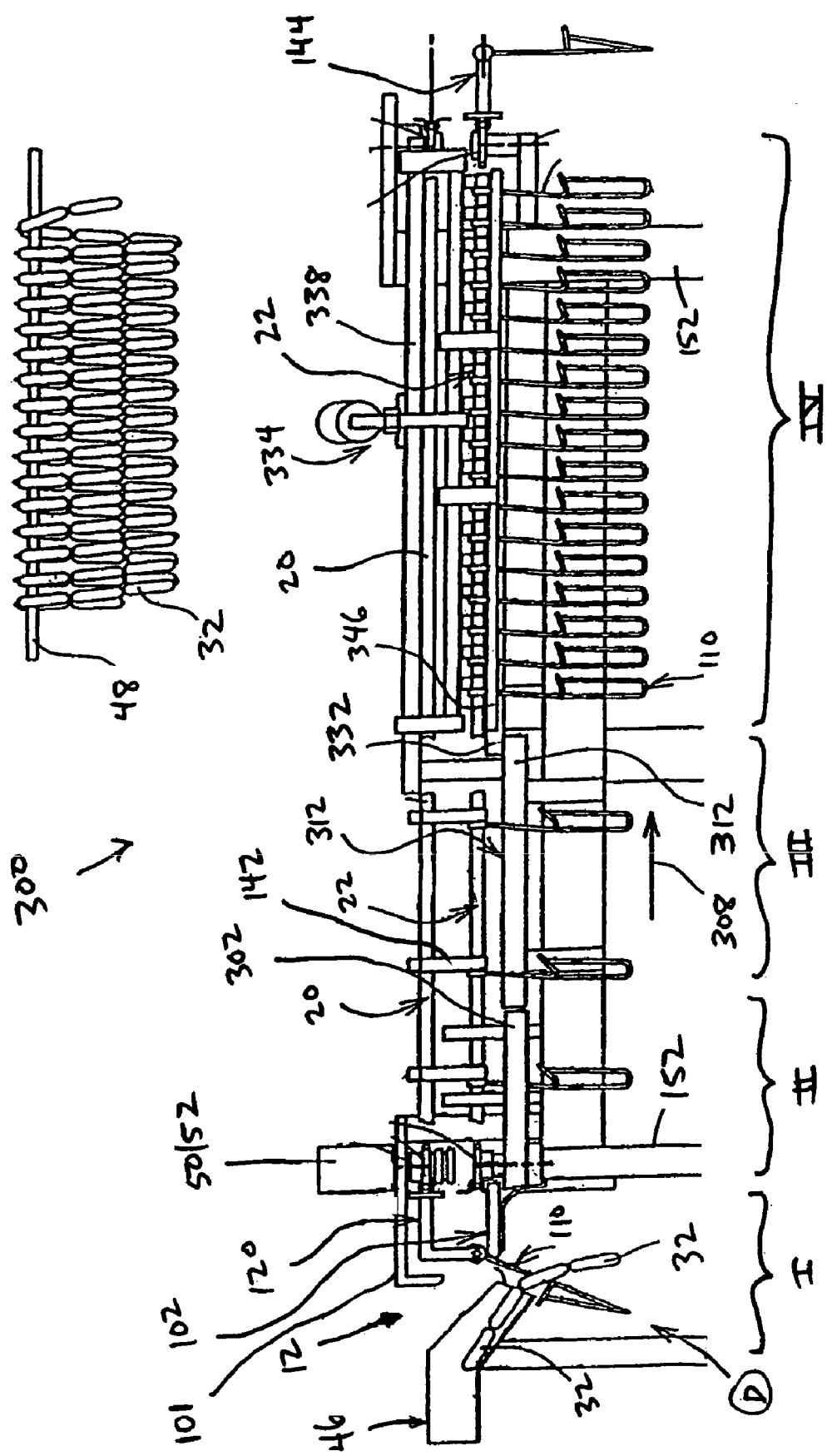
FIG. 17 is a side elevational view of one embodiment of the conveyor system of FIGS. 8-14B illustrating a preferred mechanism including various members useful to convey and unload the linked food product chain in accordance with another embodiment of the invention, the link support members illustrated in a non-pivoted orientation at an unloading station.
Figure 19A:
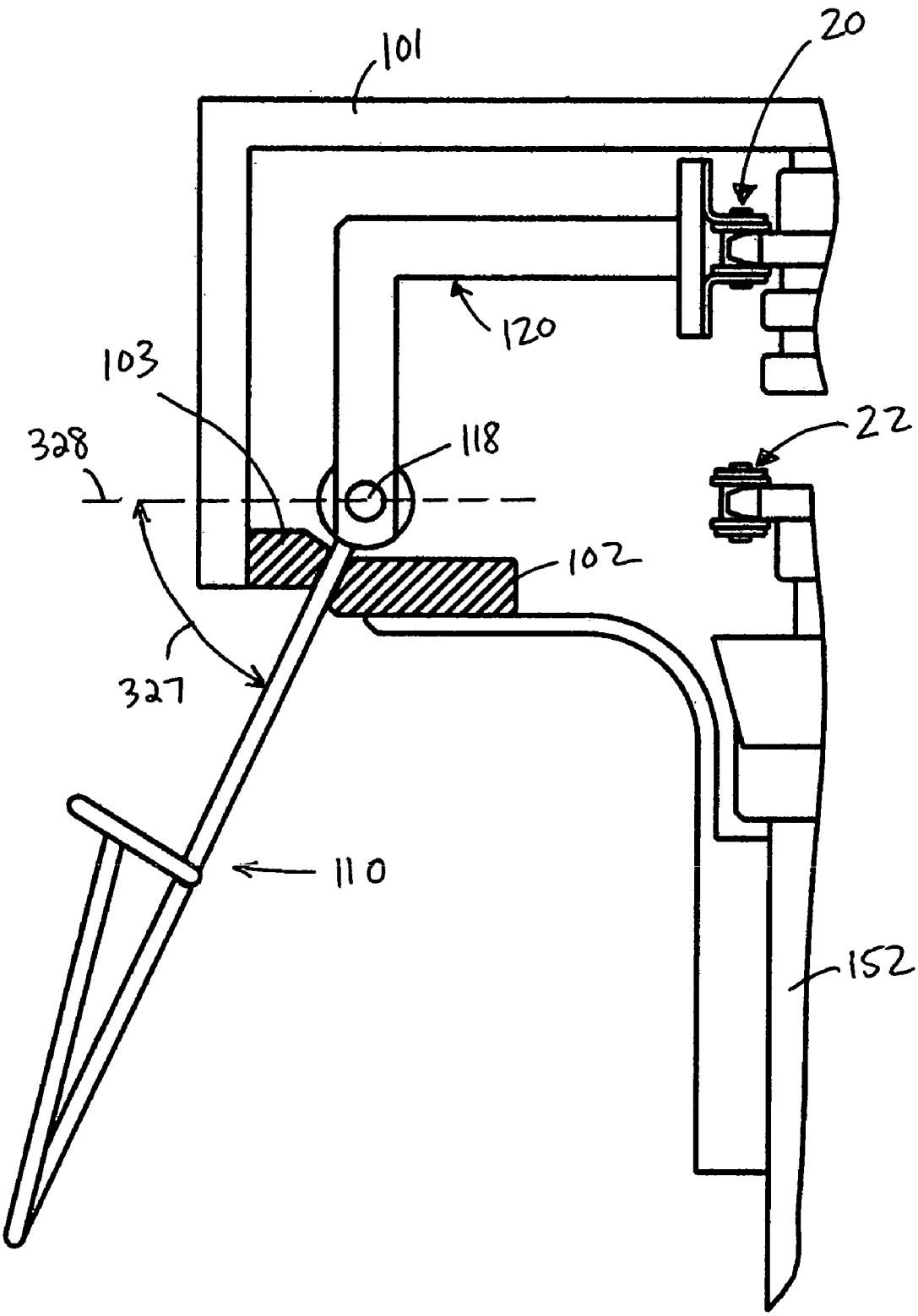
FIG. 19A is an enlarged side elevational view of one embodiment of the loading station of the conveyor system of FIG. 18 illustrating the orientation of the link support member during a loading stage.
Figure 19B:
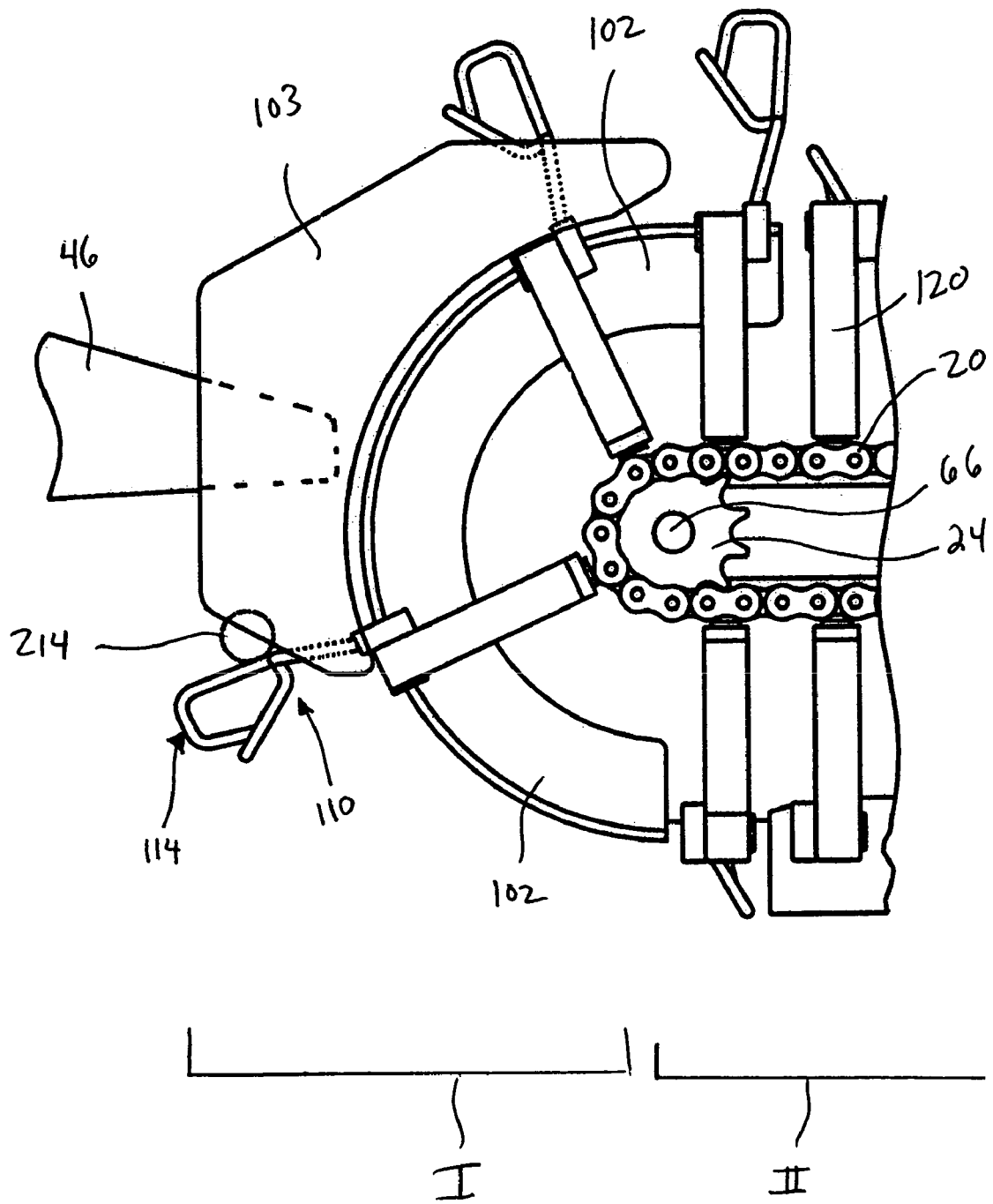
FIG. 19B is an enlarged plan view of the loading station of the conveyor system of FIG. 19B illustrating the orientation of the link support member.
Figure 19C:
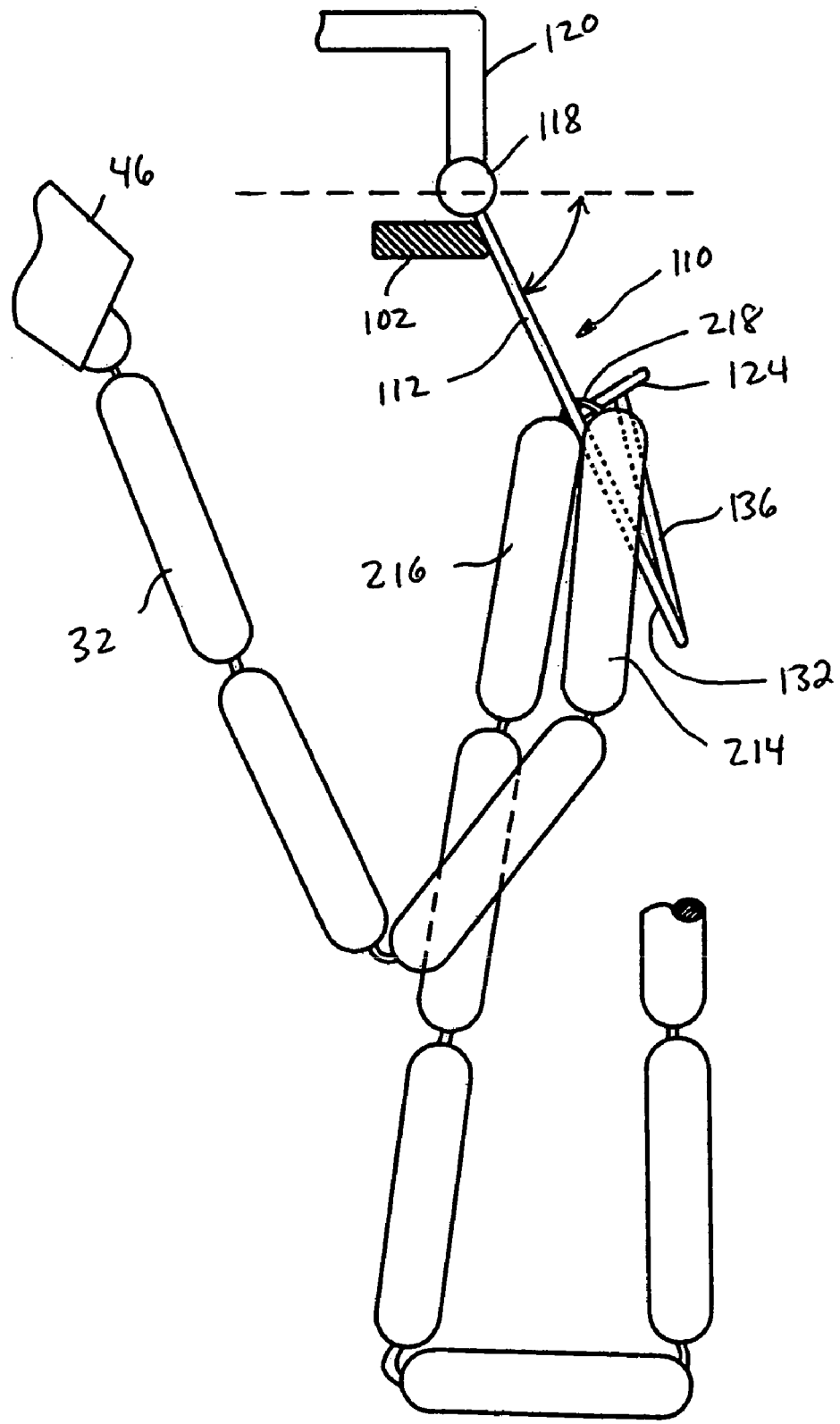
FIG. 19C is a side elevational view of a link support member in a loading orientation including the linked chain as suspended from the link support member.

Referring next to FIGS. 17-26H, variations of the conveyor system of FIGS. 8-14B is illustrated in which various members are used to assist in conveying and unloading a linked chain from a set of link support members according to one embodiment of the invention. FIG. 17 is a side elevational view of a conveyor system 300 with the link support members 110 illustrated in a non-pivoted orientation at an unloading station and FIG. 18 is a plan view of the conveyor system 300 with the link support members 110 illustrated in a pivoted orientation at the unloading station. Reference will be made to FIGS. 17 and 18 and various ones of FIGS. 19A-26H in the following description. The conveyor system 300 has many of the same components as the conveyor systems described herein; thus, the same reference numbers will be used for similar components already described above. It is noted that the conveyors 20 and 22 are illustrated as broken; however, these conveyors extend continuously about both ends of the conveyor system 300. It is also noted that the drive motors 50 and 52 are illustrated as a single motor block 50/52.

In the embodiments of FIGS. 17-26H, there are four stages of operation: a loading stage I; a conveying stage II, a positioning for unloading stage III; and an unloading stage IV. The loading stage I occurs at the loading station 12, similar to that described above where the link support member 110 is pivoted laterally outward and upward at angle 327 relative to a horizontal plane 328 (e.g., at 25 degrees upward, or 65 degrees from the horizontal plane 328) by the loading cam 102 to receive the linked chain 32, and is best illustrated in FIGS. 19A-19C. It is noted that in this embodiment, a bracket 101 extends over the support brackets 120 and 144 and rigidly attaches to an outer loading cam 103 (see FIGS. 19A and 19B) which functions to keep the link support member 110 from lifting off of the loading cam 102 due to centrifugal force as the link support members 110 travel about the loading station 12. FIG. 19C illustrates the linked chain 32 as it is suspended by the connector piece 218 from the holding portion 124 of the link support member 110 during loading.

Stage II involves the conveying of the linked chain, which in preferred form, involves the swinging of the outer link 214 to align it with the lower portion 114 of the link support member 110. In this embodiment, a first member 302 is rigidly coupled to the support frame structure 152, for example, by supports 304 and 306. Other views of the first member 302 are shown in FIG. 18 and the enlarged view of FIG. 20A and the side elevational view of FIG. 20B. In preferred form, the first member 302 takes the form of a bar that is angled laterally inward along the direction of conveyor movement (shown as arrow 308). For example, the first member 302 extends at an angle of $\theta_1$ relative to the path of the conveyor. As the link support member 110 clears loading cam 102, it swings inward and downward (in the direction of arrow 303 of FIG. 20B) at an angle 305 beyond the vertical plane 320 due to the force of gravity and engages an inward surface 310 of the member 302. Specifically, the downwardly extending section 116 contacts surface 310. As the link support member 110 moves in the direction of conveyor movement, the angling of the member 302 causes the link support member 110 to pivot upwardly and further inwardly. This serves to prevent the link support members 110 from swinging freely as it is conveyed since there is a force holding the link support members at the inward angle 305. Member 302 allows the outer link 214 to disengage the lower portion 114 such that the outer link 214 can swing freely forwardly toward the lower portion 114 so that it is aligned (laterally) with the lower portion (although it does not contact the lower portion 114 at this point). FIG. 20C illustrates the disengaging and aligning of the outer link 214 due to the first member 302 as viewed laterally from the side of the conveyor. In the left illustration of FIG. 20C, prior to contacting the member 302, the outer link 214 contacts the rearward side of the lower portion 114 (e.g., the rearward side of leg 132). The right illustration of FIG. 20C shows that due to the inward pivoting motion caused by the member 302, the outer link 214 has disengaged from the rearward side of the lower portion 114 and has fallen forwardly to align with the lower portion 114 although it is not contacting the lower portion 114 (i.e., it aligns between legs 132 and 136 of the lower portion 114. As illustrated best in FIG. 20A, link support member 110 is guided along the inward surface 310 of the member 302 (a cross section of the downwardly extending section 116 is illustrated in FIG. 20A) such that the inward surface 310 of member 302 causes the link support member 110 to pivot inwardly beyond the vertical plane 320 (as illustrated in FIG. 20B).

It is noted that in many embodiments, the first member 302 is not required and may be omitted altogether. However, without the first member 302, when the link support member clears the loading cam 102, the link support member 110 will swing inwardly due to gravity and then oscillate swinging inwardly and outwardly centered about the vertical plane 320. During this swinging motion, the outer link 214 will disengage from the rearward side of the lower portion and swing forwardly to align with the lower portion 114 (as illustrated in FIG. 20C). Any oscillating movement should be sufficiently settled before the link support member 110 reaches the second member 312, which is described below.

Stage III involves positioning the link support members 110 for unloading in stage IV. A second member 312 is rigidly coupled to the support frame structure 152, for example, by supports 314 and 316. Other views of the second member 312 are shown in FIG. 18 and the enlarged view of FIG. 20A. In preferred form, the second member 312 takes the form of a bar that is angled laterally outward along the direction of conveyor movement (shown as arrow 308). In this embodiment, the second member 312 extends at an angle of $\theta_2$ relative to the path of the conveyor. As the link support member 110 clears the first member 302, it swings outward due to gravity and engages an outward facing surface 318 of the member 312. Specifically, the downwardly extending section 116 contacts surface 318. As the link support member 110 moves in the direction of conveyor movement, the laterally outward angling of the second member 312 causes the link support member 110 to pivot outwardly and upwardly. The further along the link support member 110 proceeds along member 312, the further outward it is caused to pivot about a pivot axis. This outward and upward pivot serves in part to guide the link support members 110 by preventing them from swinging freely during the conveyor movement. The outward and upward pivoting also serves to prepare the linked chain 32 for unloading at the unloading station 14. For example, as described throughout this specification, the outward pivoting motion serves to "open loops" in the links or to "form loops" in the links suspended from each link support member, making it easier for stick insertion and unloading.

Figure 20A:
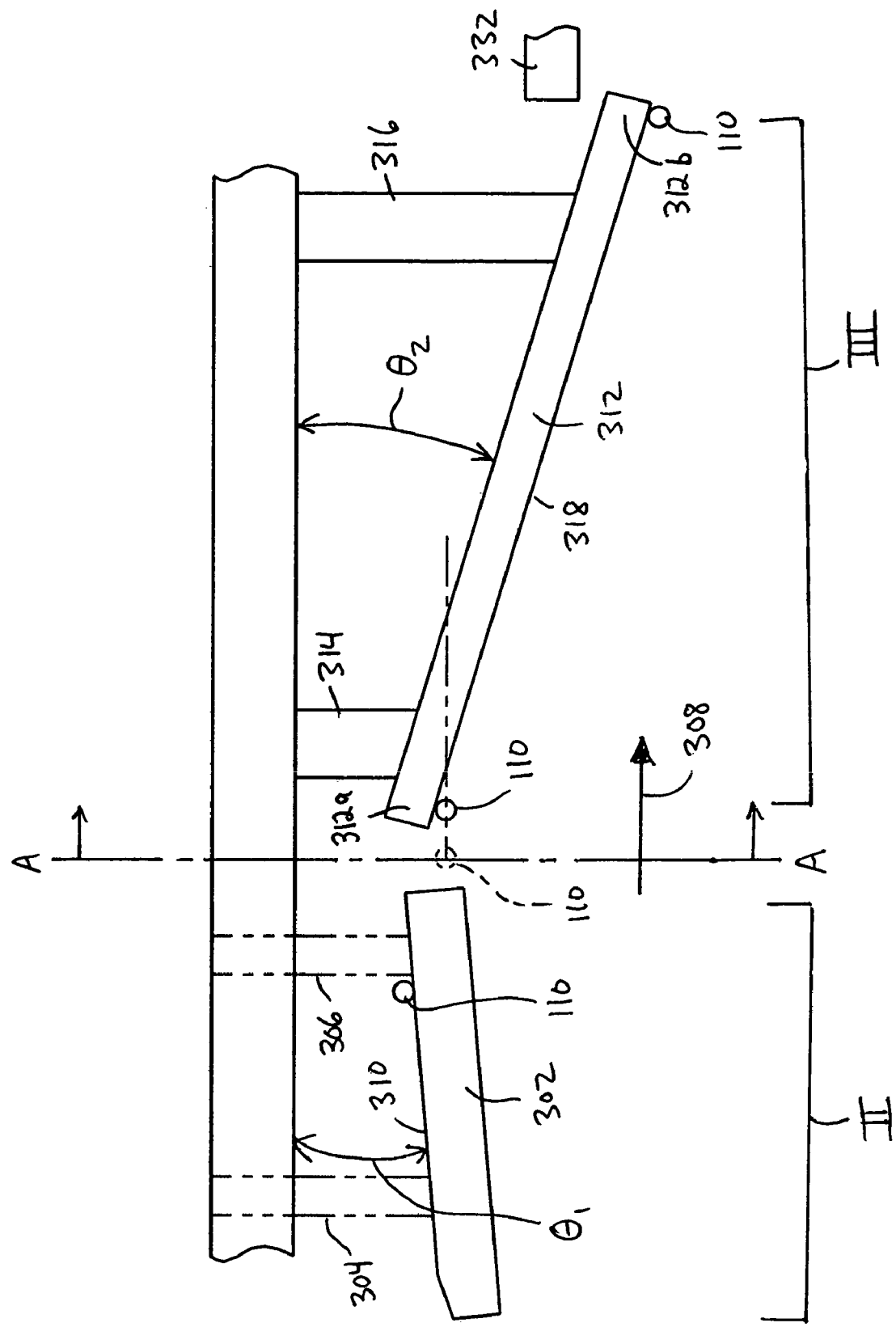
FIG. 20A is an enlarged plan view of a portion of conveyor system of FIG. 17 illustrating the orientation of members for conveying and positioning the link support members for an unloading stage.
Figure 20B:
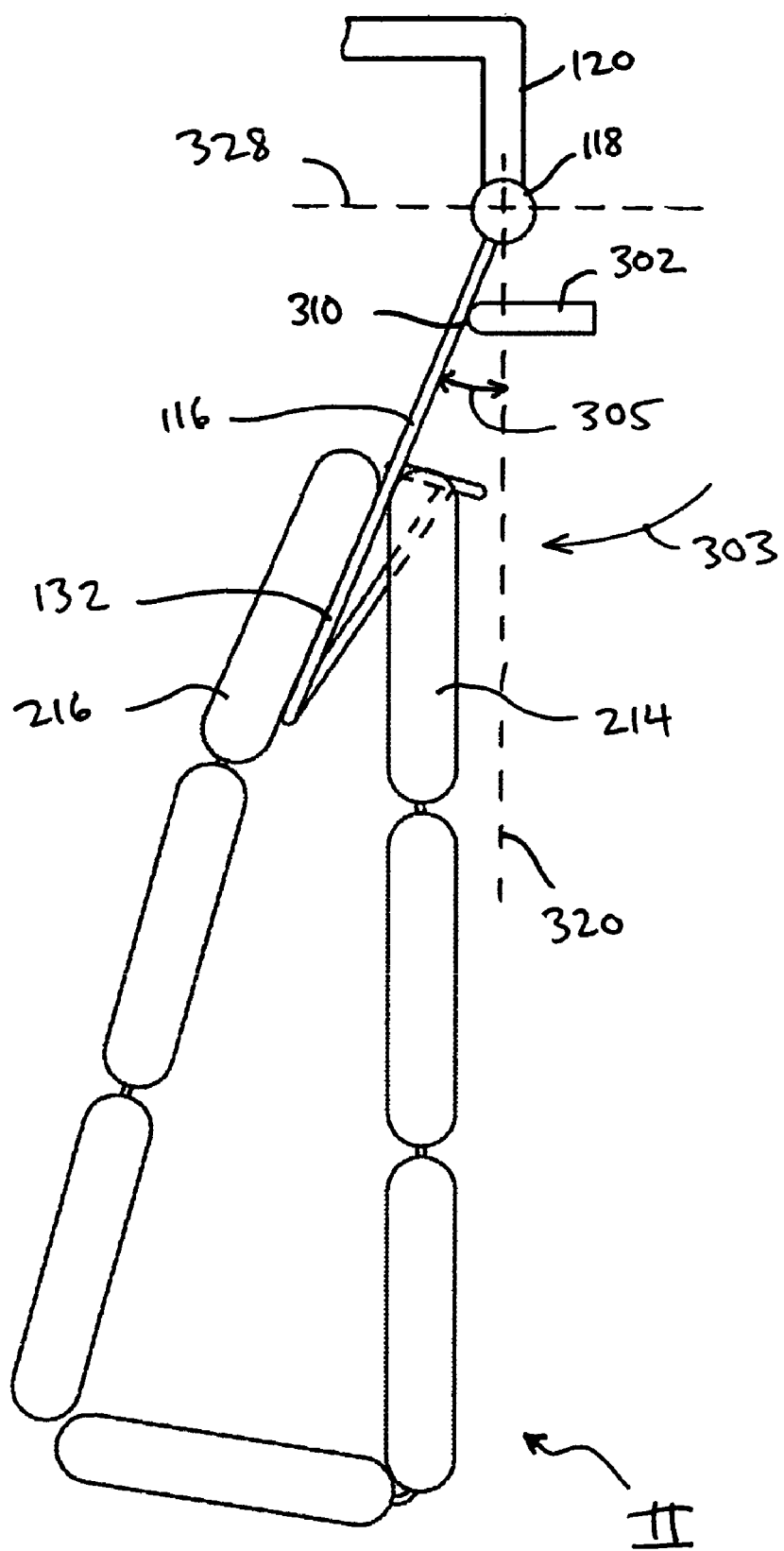
FIG. 20B is an end side elevational view of the orientation of the link support member as it engages a first member that pivots the link support member inwardly during a conveying stage to align the outer links in accordance with one embodiment.
Figure 20C:
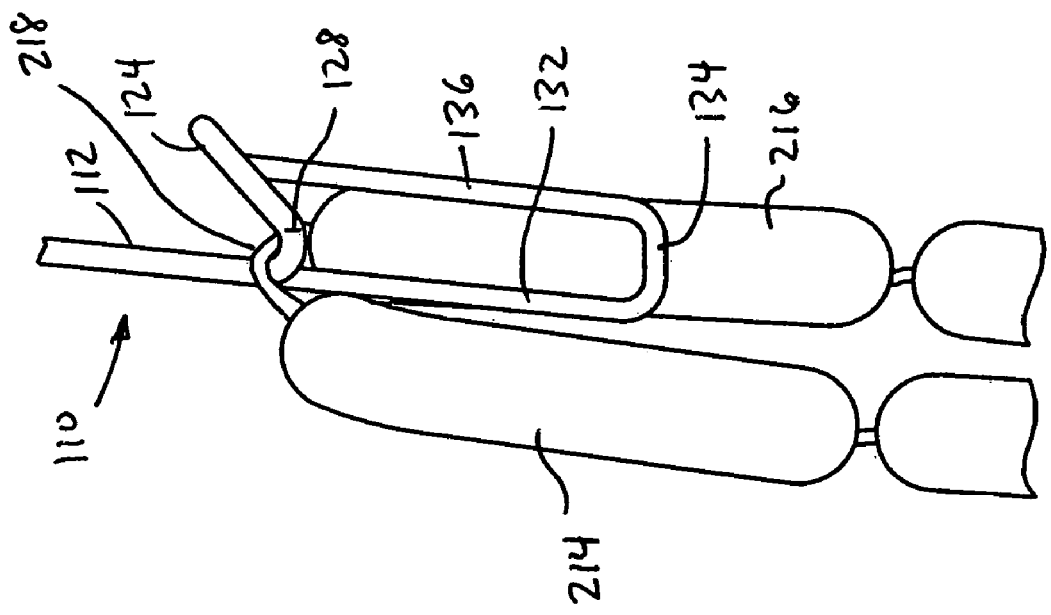
FIG. 20C is a side elevational view to show the disengaging and aligning of the outer link with a lower portion of the link support member provided by the first member of FIGS. 20A and 20B during the conveying stage.
Figure 20D:
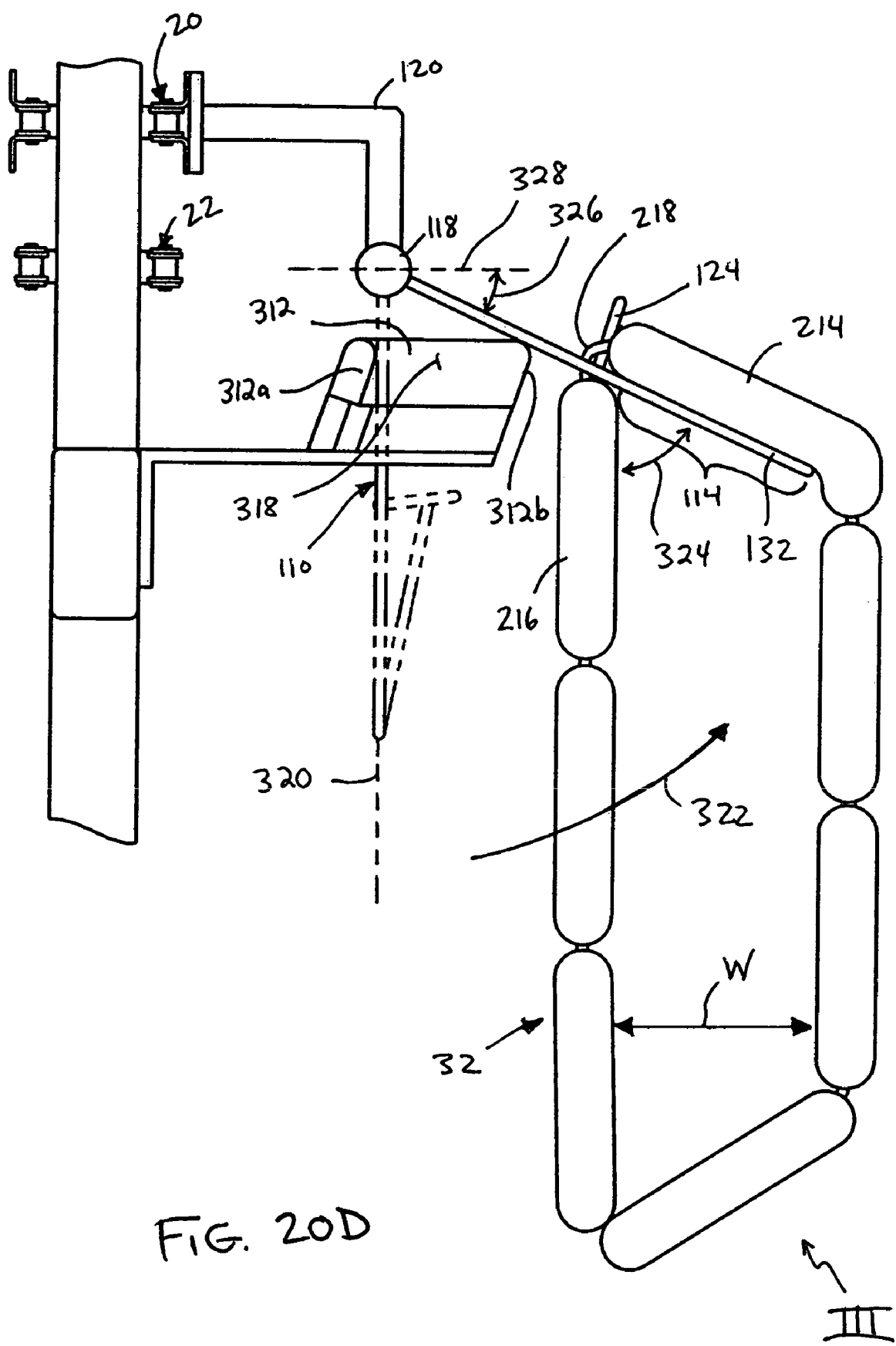
FIG. 20D is an end side elevational view as seen at line A-A of FIG. 20A to illustrate a proximate end and a distal end of a member illustrated in FIG. 20A and used in positioning the link support members for unloading according to one embodiment.

Referring next to FIG. 20D, an end side elevational view is shown as seen at line A-A of FIG. 20A to illustrate a proximate end 312a and a distal end 312b of the second member 312 of FIG. 20A and corresponding link support member positions. At the proximate end 312a of member 312, the link support member 110 is generally vertically disposed. For example, as illustrated in dashed lines, the link support member 110 is generally aligned with a vertical plane 320. As the link support member 110 is guided along the outward surface 318, it is pivoted laterally outward in the direction of arrow 322 to its orientation at the distal end 312b. At the distal end, the member 110 is pivoted outward such that the lower section 114 of the link support member 110 engages a portion of the outer link 214 of the portion of the suspended linked chain 32, lifting the outer link 214, relative to the inner link 216, which freely hanging substantially vertically. As described above, this pivoting action opens a loop in the portion of the linked chain suspended from the link support member 110. As illustrated, the open loop has a width W for easy stick insertion. The outer link 214 and the inner link 216 have an angular spread shown as angle 324. At this outer pivot position, the link support member 110 is at an angle 326 below a horizontal plane 328. In preferred form, the second member 312 positions the link support members 110 to an unloading orientation. It is noted that the degree to which the outer link 214 bends about the end of the leg 132 depends on the rigidity of the linked food product itself. Thus, the bending of the outer link 214 illustrated in FIG. 20D (and also in FIGS. 22A and 25) is one example; however, it is understood that a given outer link 214 be more or less rigid, e.g., the link may bend very little or not bend at all over the end of leg 132. Additionally, the length of the lower portion 114 (i.e., the length of legs 132 and 136) may be configured to support the outer link 214 through the full length of the link to minimize any bending (such as illustrated in FIG. 11).

Stage IV involves the unloading process. In this embodiment, once the link support members 110 clear the second member 312, they fall inward slightly and engage an outer surface of a third member 332. As seen in FIG. 21, a top view is shown of the link support members held in an outwardly pivoted position during the unloading stage by the third member 332 according to one embodiment. In one embodiment, the third member 332 is held in position by an actuating mechanism. For example, the third member 332 is coupled to an actuating mechanism that is coupled to the support frame structure 152, i.e., the third member is coupled to the support frame structure. Generally, the third member 332 takes the form of a bar that extends in parallel to the path of the conveyor. Once all link support members 110 are supported in an outward pivoted orientation on the third member, in one embodiment, the conveyor movement is stopped to complete the unloading process. At this point, a stick 48 or other unloading holding device is inserted into the opened loops formed in the linked chain. Alternatively, the stick 48 may be positioned such that as the link support members 110 travel along the third member 332, they travel about the stick 48.

Figure 22A:
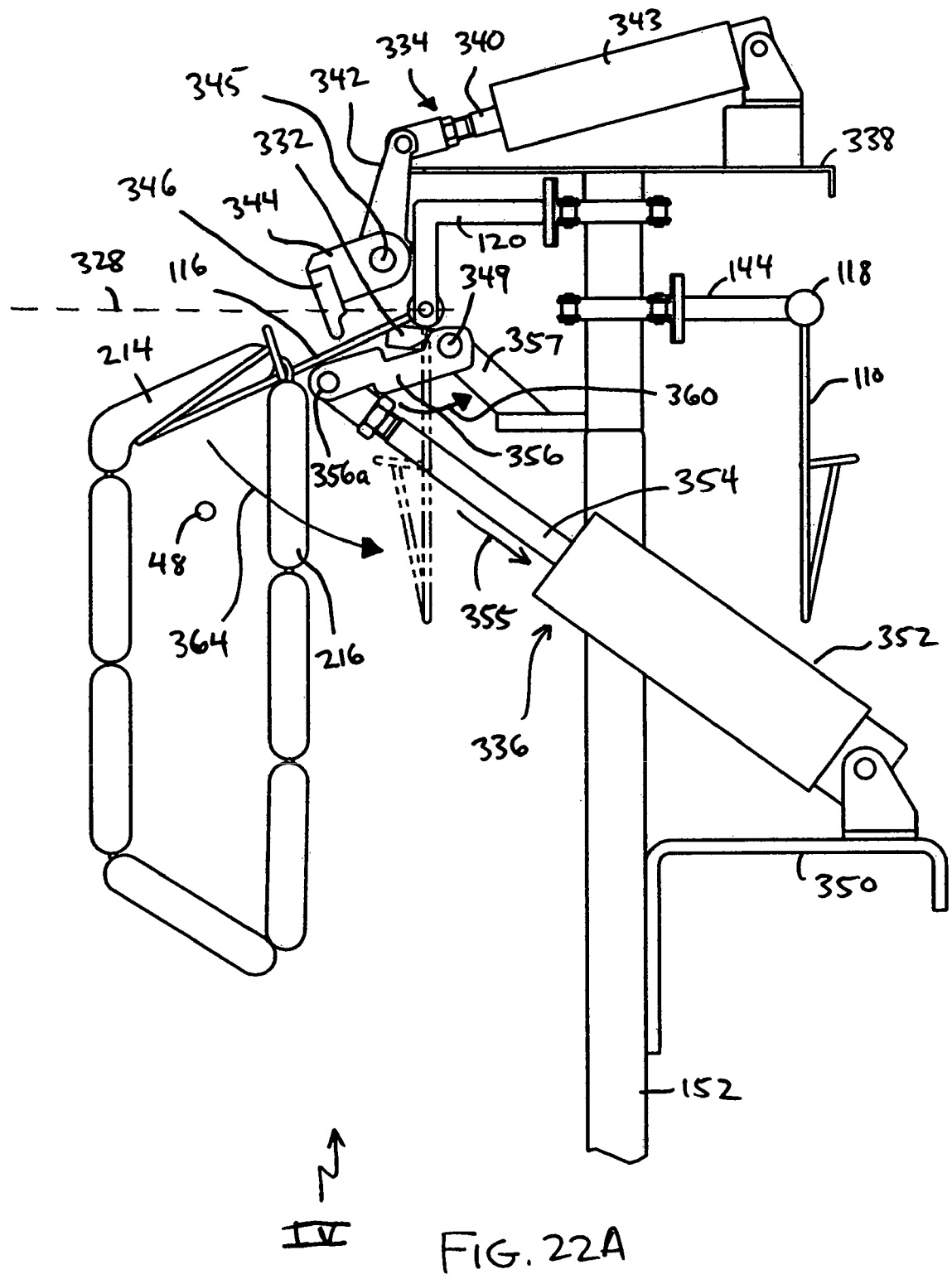
FIG. 22A is an end side elevational view seen from the unloading end of the conveyor system illustrating the orientation of a given link support member and the linked food product thereon during the unloading stage according to one embodiment.
Figure 22B:
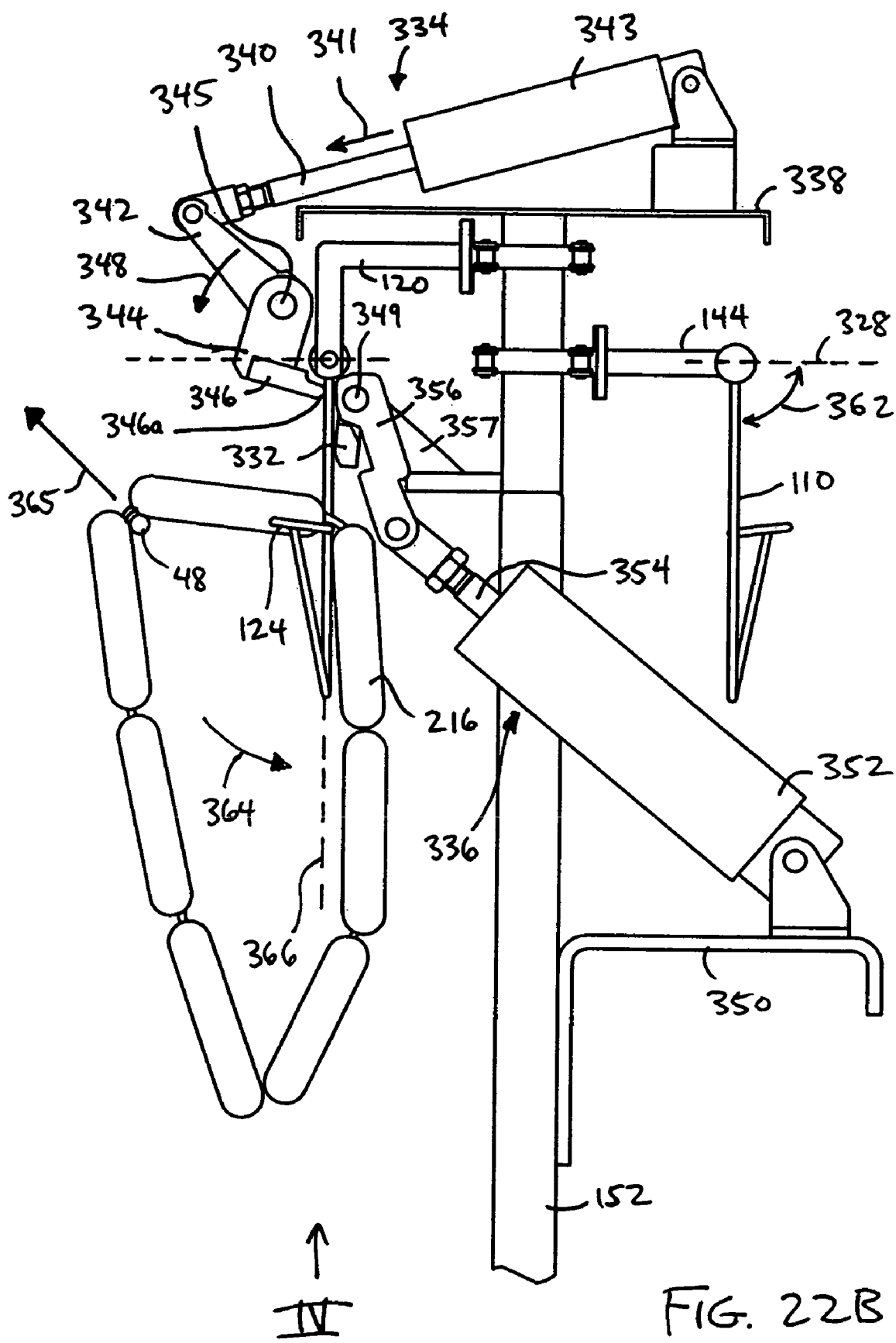
FIG. 22B is an end side elevational view seen from the unloading end of the conveyor system illustrating the orientation of a given link support member and the linked food product as the link support member is lowered to a normal, vertically disposed position to unload the chain.

Next, the third member 332 is lowered, which causes the link support members to pivot back towards a normal vertically disposed position. FIG. 22A is an end side elevational view seen from the unloading end of the conveyor system 300 illustrating the orientation of the link support member 110 and the linked food product during the actual unloading operation according to one embodiment. A lower pneumatic cylinder 336 is provided to actuate the third member 332 from the full outward pivoted position to a substantially vertically disposed position. An upper pneumatic cylinder 334 is provided to hold the link support members 110 against the third member 332 during the downward actuation and to prevent the link support members from being lifted off of the third member 332 when the linked chain is unloaded from the link support members. FIG. 22B is an end side elevational view seen from the unloading end of the conveyor system illustrating the orientation of the link support member 110 as it is lowered to a normal, vertically disposed position to unload the link chain.

The upper pneumatic cylinder 334 (which may be generically referred to as an actuator 334) is coupled to a support plate 338 and includes a body 343 and a shaft 340. In one embodiment, an actuating device used during the pivoting of the link support members includes the pneumatic cylinder 334, axle 345, brackets 342 and 344 and bar 346. Bracket 342 is pivotally coupled at one end to a portion of the shaft 340. At another end, bracket 342 is rigidly coupled to axle 345. Bracket 344 is also rigidly coupled to axle 345, but not coupled directly to bracket 342. This can be seen in FIG. 23. Bar 346 is rigidly coupled to bracket 344. During unloading, in coordination with the operation of the lower pneumatic cylinder 336 (as described below), the shaft 340 extends from the body 343 in the direction of arrow 341 (see FIG. 22B), causing bracket 342 to pivot in the direction of arrow 348 (see FIG. 22B), which rotates axle 345 about axle supports 347, which causes bracket 344 to rotate with bracket 342 and the axle 345 in the direction of arrow 348. This pushes a rounded end 346a of bar 346 against downwardly extending section 116 of the link support member 110.

The lower pneumatic cylinder 336 (which may be generically referred to as an actuator 336) is coupled to a support plate 350 and includes a body 352 and a shaft 354. In one embodiment, an actuating device used in the downward and inward pivoting of the link support members includes the pneumatic cylinder 336, bracket 356, support 357 and the third member 332. The third member 332 is rigidly coupled to an axle 349 which is fitted pivotally into the support 357 which is rigidly attached to the support frame structure 152. The bracket 356 is fixed at one end to the axle 349. The non-fixed end 356a of the bracket 356 is pivotally coupled to a distal end of the shaft 354 of the actuator 336. During the lowering of the link support members 110 during the unloading operation, the lower pneumatic cylinder 336 begins operation by retracting the shaft 354. The shaft 354 retracts in the direction of arrow 355 into the body 352, causing the bracket 356 to pivot in the direction of arrow 360, which causes the axle 349 to rotate with the third member 332 so that the third member 332 moves inward and downwardly in order to allow the link support members 110 to pivot laterally inward or drop back towards a normal vertically disposed orientation (illustrated in FIG. 22B as in line with plane 366). While the link support members 110 and the shaft 354 are lowered, the operation of the upper pneumatic cylinder 334 is coordinated such that as shaft 354 retracts, shaft 340 extends in order to cause bar 346 to push the downwardly extending section 116 of the link support members 110. In several embodiments, the bar 346 can assist the lower pneumatic cylinder 336 in the lowering motion of the link support member. For example, in one embodiment, the movement of the bar 346 acts to push the link support members against the third member 332 as it descends. In other embodiments, the bar 346 does not necessarily push the link support members as they descend. For example, if the downward motion of one or more link support members 110 is delayed (e.g., by resistance due to the stick 48 lifting up on the link support members as they are lowered), the bar 346 will force the link support members in their downward and inward motion. Furthermore, the motion of the bar can be configured such that the bar 346 presses the link support members against the third member 332 or loosely holds them against the third member 332. That is, the distance between the bar 346 and the third member 332 may be greater that the diameter of the downwardly extending section 116 of the link support members 110. Again, the link support members 110 pivot about a pivot axis (e.g., pivot axis 122, not illustrated in FIGS. 22A-22B, but preferably located at the top end of the section 116) in a direction indicated by arrow 364.

As further illustrated in the transition from the orientation of FIG. 22A to that of FIG. 22B, the stick 48 is raised during the downward and inward pivoting motion in order to lift the linked chain off of the link support members 110. For example, the stick 48 is lifted upward and outward at a diagonal in the direction of arrow 365. The removed stick 48 carrying a linked chain 32 is illustrated in FIG. 17. Furthermore, it is noted that the bar 346 is useful to hold the link support members 110 downward against the upward force generated by the stick 48 as it lifts the linked chain 32 off of the link support members 110. In preferred form, the normally vertically disposed orientation is at an angle 362 (as seen in FIG. 22B) relative to the horizontal plane 328, e.g., preferably at a 90 degree angle.

Figure 23:
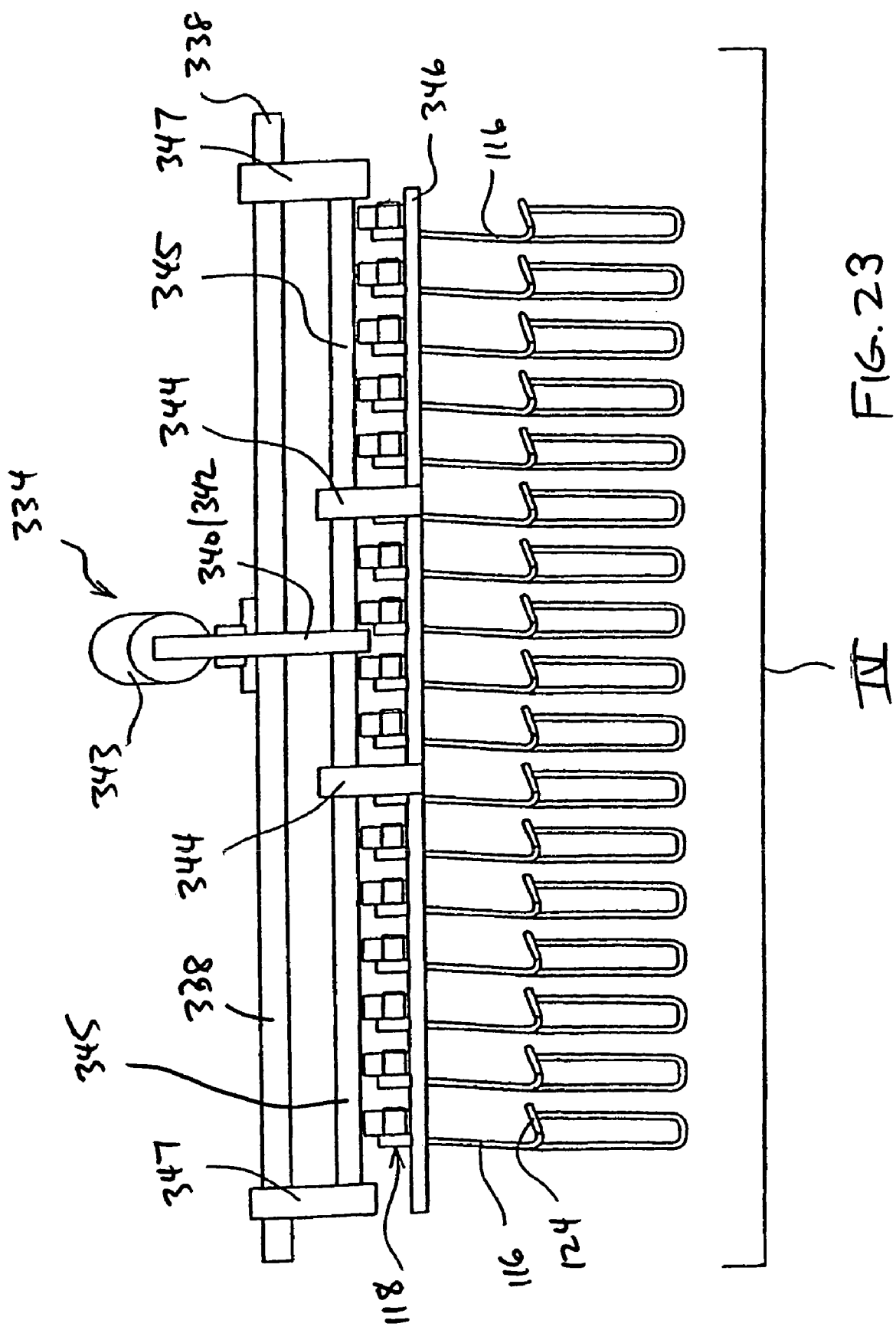
FIG. 23 is a side elevational view of the link support members at an unloading position once the chain of linked food product has been removed from the link support members.

FIG. 23 is a side elevational view of the link support members 110 at the unloading stage IV once the linked chain has been unloaded. At this point, the upper pneumatic cylinder 334 and the lower pneumatic cylinder 336 are operated to raise the third member 332 back to the orientation of FIG. 22A for unloading of the next set of link support members 110. Then, the conveyor movement is started and the link support members travel about the end of the conveyor towards the loading station 12. Having been raised, as the link support members 110 are conveyed back to the loading station, they fall back to their normal vertically disposed orientation due to gravity as they are conveyed off of the end of the third member 332.

Figure 24A:
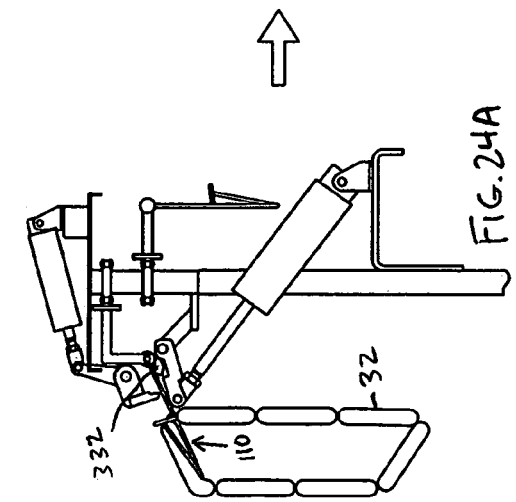
FIGS. 24A-24F are several end side elevational views as seen from the unloading end of the conveyor system illustrating one embodiment of a sequence for unloading the linked chain from the link support members during the unloading stage.
Figure 24B:
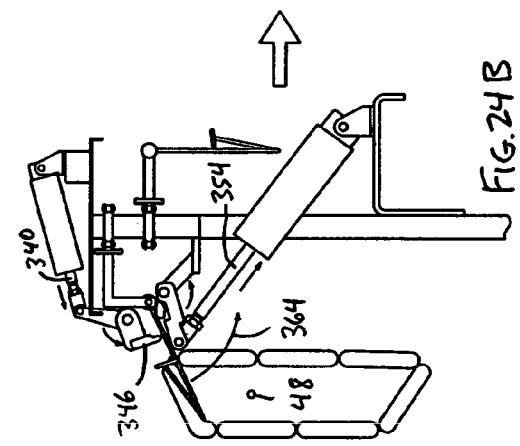
Figure 24C:
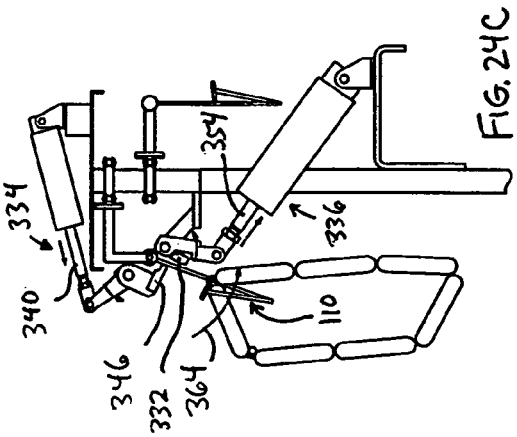
Figure 24D:
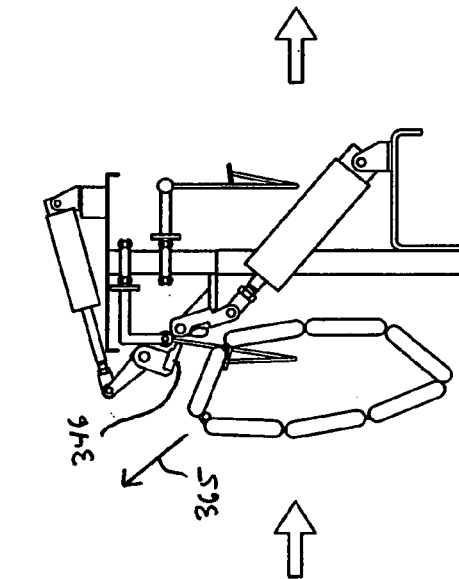
Figure 24E:
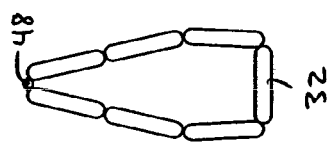
Figure 24F:
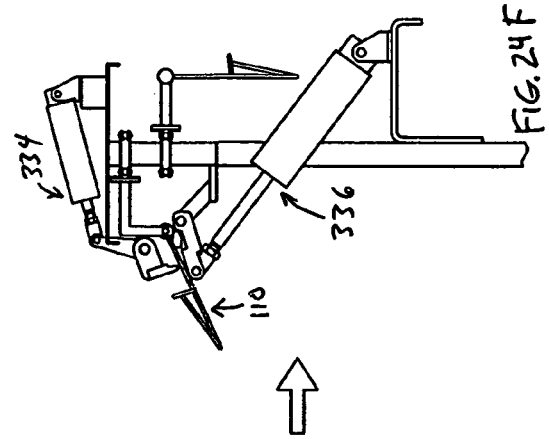

Referring next to FIGS. 24A-24F, several side elevational views are shown as seen from the unloading end of the conveyor system illustrating one embodiment of a sequence for unloading the chain of linked food products from the link support members. FIG. 24A illustrates the linked chain 32 in the unloading position held in an open loop orientation by the third member 332. FIG. 24B illustrates the lower actuator 336 and the upper actuator 334 which, just after the stick 48 (or similar removing tool or bar) has been completely inserted into the open loop, begin to be actuated in coordination such that while shaft 354 retracts, shaft 340 extends. FIG. 24C illustrates that the retraction of shaft 354 causes the third member 332 to pivot allowing the link support member to pivot laterally downward and inward in the direction of arrow 364. Meanwhile, the extension of shaft 340 causes the bar 346 to push or hold the link support member 110 against the third member 332 in the event there is any resistance of the link support member to the downward pivoting motion. Alternatively, instead of holding the link support members 110 against the third member 332, the bar 346 prevents the link support members 110 from lifting too far off of the link support members 110 due to any upward forces on the link support members 110. In FIG. 24C, the stick 48 has engaged the opened loop (which could cause some resistance to the link support member swinging downward). In FIG. 24D, the stick 48 is lifted after the link support member 110 has pivoted downward and inward back towards a vertically disposed position. In this embodiment, the stick 48 is lifted upwards and laterally outward or away from the conveyor system along a diagonal as illustrated by arrow 365. It is noted that in some embodiments, for example, the stick 48 may be lifted while the link support members 110 pivot downward and inward. Again, the bar 346 holds the link support members 110 in position to resist any upwards force on the link support members as the stick removes the linked chain. FIG. 24E illustrates the linked chain 32 completely removed from the link support members 110 with the link support members in a substantially vertically disposed orientation. It is noted that in some embodiments, the link support members 110 do not pivot all the way to a vertically disposed orientation. For example, unloading may be complete prior to the vertically disposed orientation. Next, the operation of the upper actuator 334 and the lower actuator 336 is reversed to raise the link support members 110 and the third member 332 as seen in FIG. 24F. The link support members 110 are then conveyed off of the third member and the third member 332 is in position for the next set of linked support members 110. It is understood that the sequence of FIGS. 24A-24F provides one example of an unloading sequence and that this sequence may be multiply varied in other embodiments of the invention.

Figure 25:
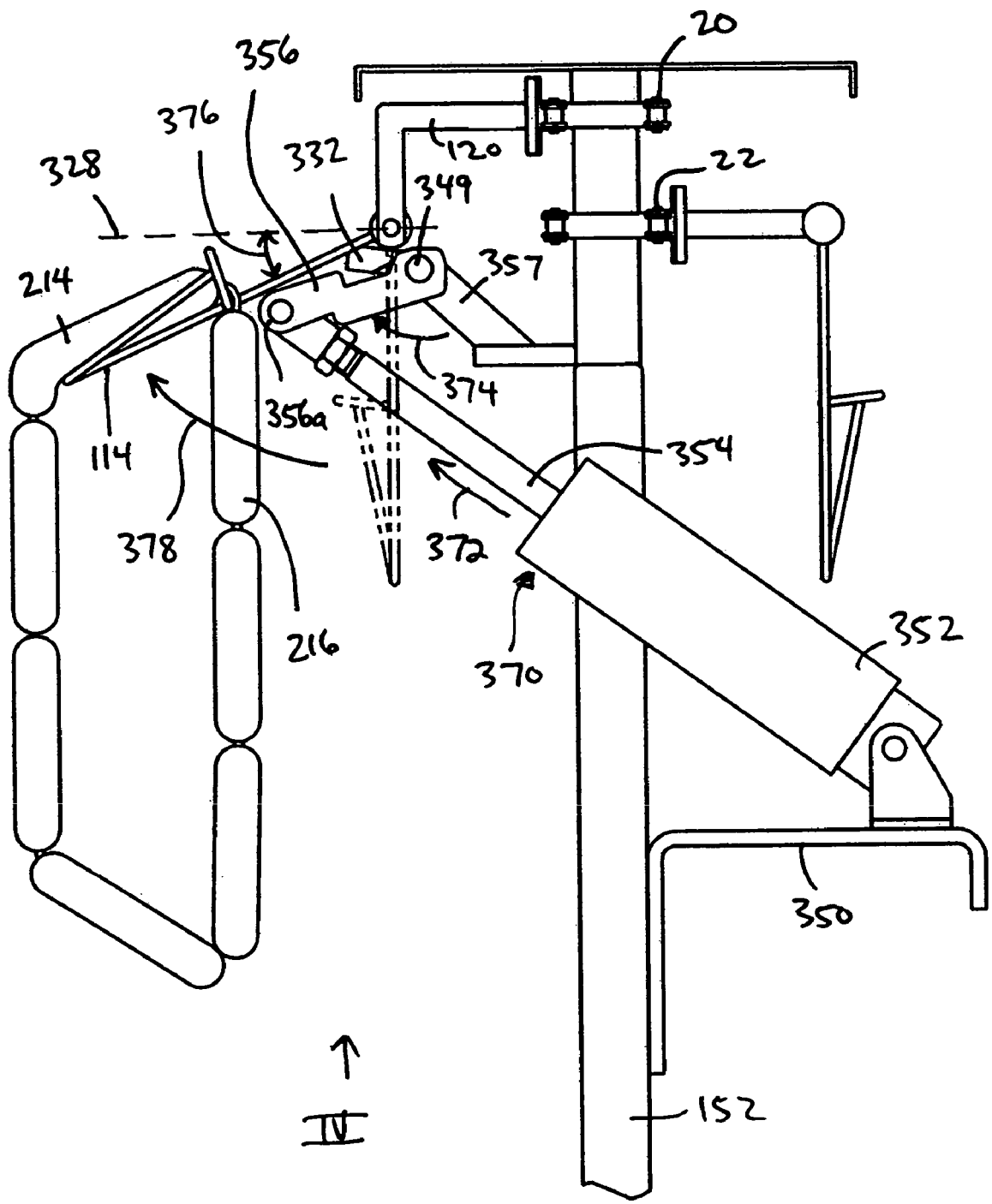
FIG. 25 is an end side elevational view as seen from the unloading end of the conveyor system of an alternative unloading stage using an alternative actuation device to pivot the link support members 110 according to another embodiment of the invention.

Referring next to FIG. 25, an end side elevational view is shown as seen from the unloading end of the conveyor system of an alternative unloading process using an alternative actuation device to pivot the link support members 110 according to another embodiment of the invention. In this embodiment, the first member 302 and the second member 312 are not used. For example, the set of link support members is conveyed to an unloading station 14 of the conveyor system. The conveyor movement is stopped and a pneumatic cylinder 370 (which can be generically defined as an actuator 370) is operated to raise the set of link support members 110 into an outwardly pivoted unloading orientation, thereby opening loops in the linked chain for unloading.

For example, shaft 354 extends out of the body 352 in the direction arrow 372, which pushes the non-fixed end 356a of bracket 356 in the direction of arrow 374 about the axle 349. The axle 349, which is fixed to another end of bracket 356 and is fitted pivotally into the support 357 mounted to the support frame structure 152, is pivoted together with the bracket 356, the axle 349 being rigidly attached to the third member 332. The rotation of the axle 349 causes the third member 332 to push against the section 116 of the link support member 110 to cause the link support members 110 to pivot laterally outward and upward about their upper ends in the direction of arrow 378. As described above, the outward pivotal movement allows the lower section 114 of the link support member 110 to engage an outer link 214 and open a loop in the chain suspended from the given link support member 110. At this point, the stick is inserted into the opened loop, the link support member 110 is caused to pivot back to its normal vertically disposed position (by reversing the actuation of the pneumatic cylinder 370) and then the stick is lifted to remove the linked chain. It is understood that there may be many variations of this unloading technique, such as described throughout this specification, and many other variations not specifically describe herein. For example, an actuator may be provided to prevent the link support members 110 from lifting off of the third member 332 as the stick lifts the linked chain off of the link support members 110. For example, a device similar to the upper actuator 334 including the axle 345, brackets 342 and 344 and bar 346 such as described in FIGS. 22A-24F may be used for this purpose.

Thus, generally the embodiments described herein provide a method for forming open loops (or opening loops) in a chain of linked food products which in a broad sense can be defined to include the steps of (1) suspending a portion of the chain of linked food product from a link support portion of a link support member (which is generically defined as a suspension device) pivotally coupled to a conveyor, the suspension device having a lower portion downwardly extending from the link support portion and (2) pivoting the link support portion about a pivot axis such that the lower portion engages a portion of a respective link of the chain to open a respective loop in the chain for unloading.

Figure 29:
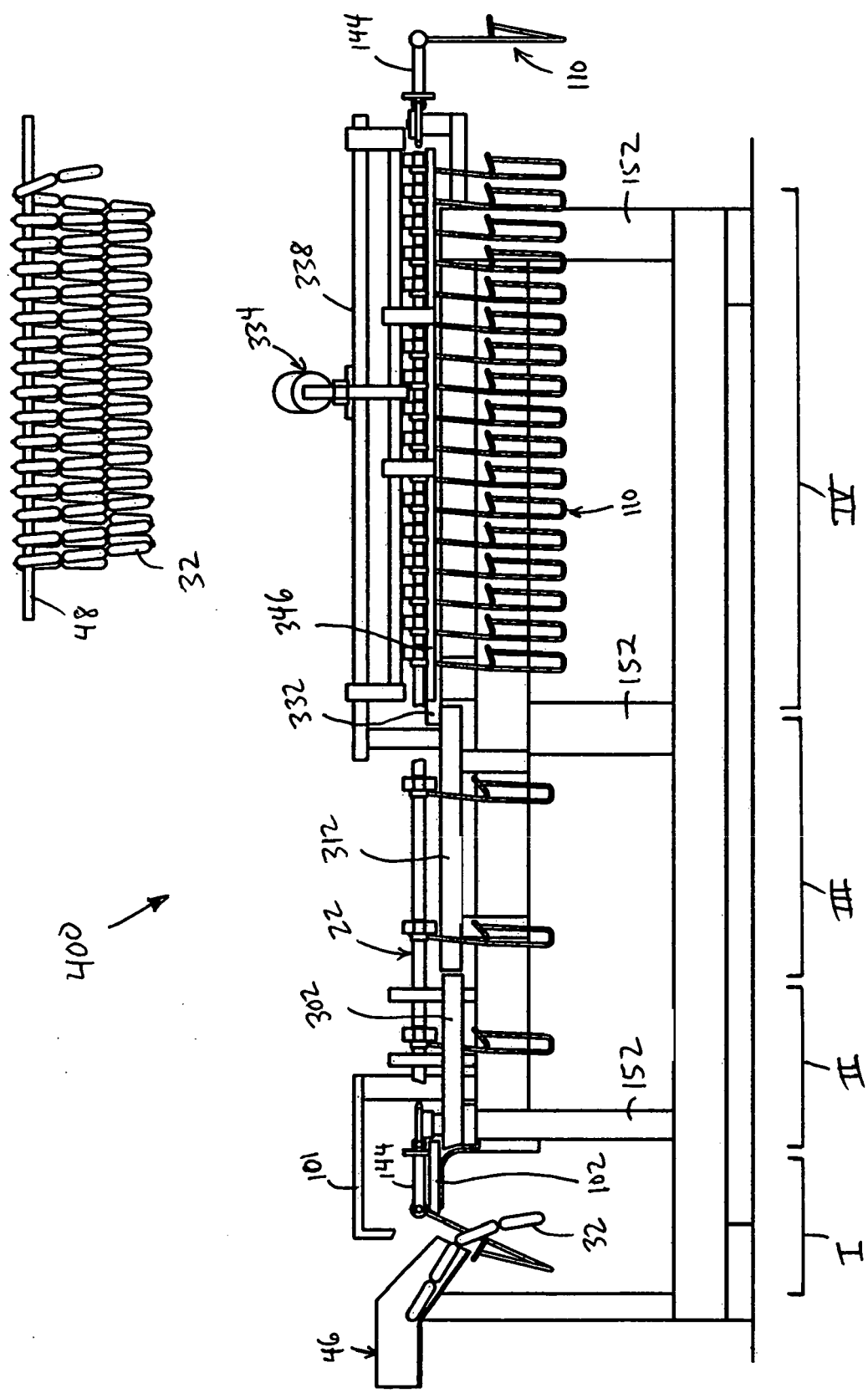
FIG. 29 is a side elevational view of a variation of the conveyor system of FIGS. 17-26H including a single conveyor.

Furthermore, it is understood that although the conveying and unloading techniques described herein are primarily in the context of multiple conveyors in which it is desired to operate each conveyor relative to the other conveyor in order to improve efficiency, in many embodiments, the conveying, loop forming and unloading techniques described herein may be easily implemented by one of ordinary skill in the art in single conveyor systems. For example, as illustrated in FIG. 29, a side elevational view is shown of a conveyor system 400 as a variation of the conveyor system 300 including only one conveyor, e.g., conveyor 22. The conveyor system 400 has many of the same components as the conveyor systems described herein; thus, the same reference numbers will be used for similar components already described above. It is noted that the conveyor 22 is illustrated as broken; however, this conveyor extends continuously about both ends of the conveyor system 400. It is also noted that a drive motor (similar to one of drive motors 50 and 52) is present, but not illustrated as in earlier embodiments.

Referring next to FIGS. 26A-26H, several simplified plan views are shown of the conveyor system of FIGS. 17-24F illustrating the loading, conveying and unloading processes according to one embodiment of the invention. FIG. 26A shows set 380 of link support members 110 ready for loading at the loading station. In FIG. 26B, each link support member is pivoted outwardly to receive portions of the linked chain output from a linker or other device that provides the linked chain to the loading station. FIG. 26C illustrates several link support members held at a slight inward pivot position behind the first member 302 and some of the link support members pivoting outwardly through engagement with the second member 312. FIG. 26D illustrates the increasing outward pivoting of the link support members due to the angular orientation of the second member 312. FIG. 26E shows set 380 held in an outward pivotal unloading position by the third member 332 while set 382 is ready for loading. The stick is inserted into the opened loops of the linked chain. FIG. 26F illustrates that the third member 332 has been caused to drop allowing the link support members to pivot back to a normal vertically disposed orientation, the linked chain lifted off of the set 380 by the raising of the stick 48 and the lowering of the link support members through their inward and downward pivotal movement. Also, set 382 is beginning to load. FIG. 26G shows the set 380 returning about the conveyor path toward the loading station. FIG. 26H shows set 380 ready for loading and set 382 conveying about the first member 302 and the second member 312.

Figure 27:
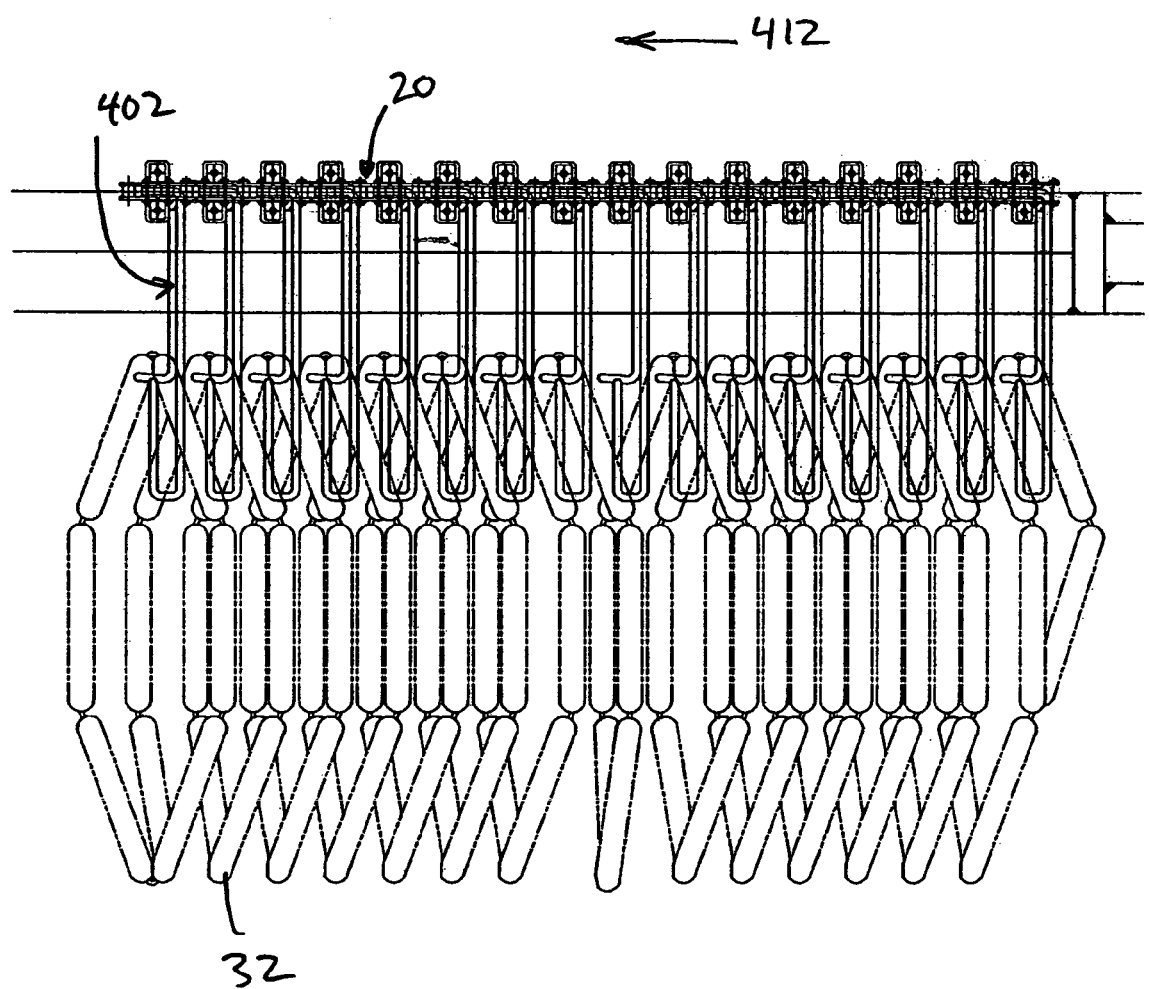
FIG. 27 is a side elevational view of a portion of a conveyor system including link support members (also referred to as suspension devices) according to another embodiment of the invention.
Figure 28B:
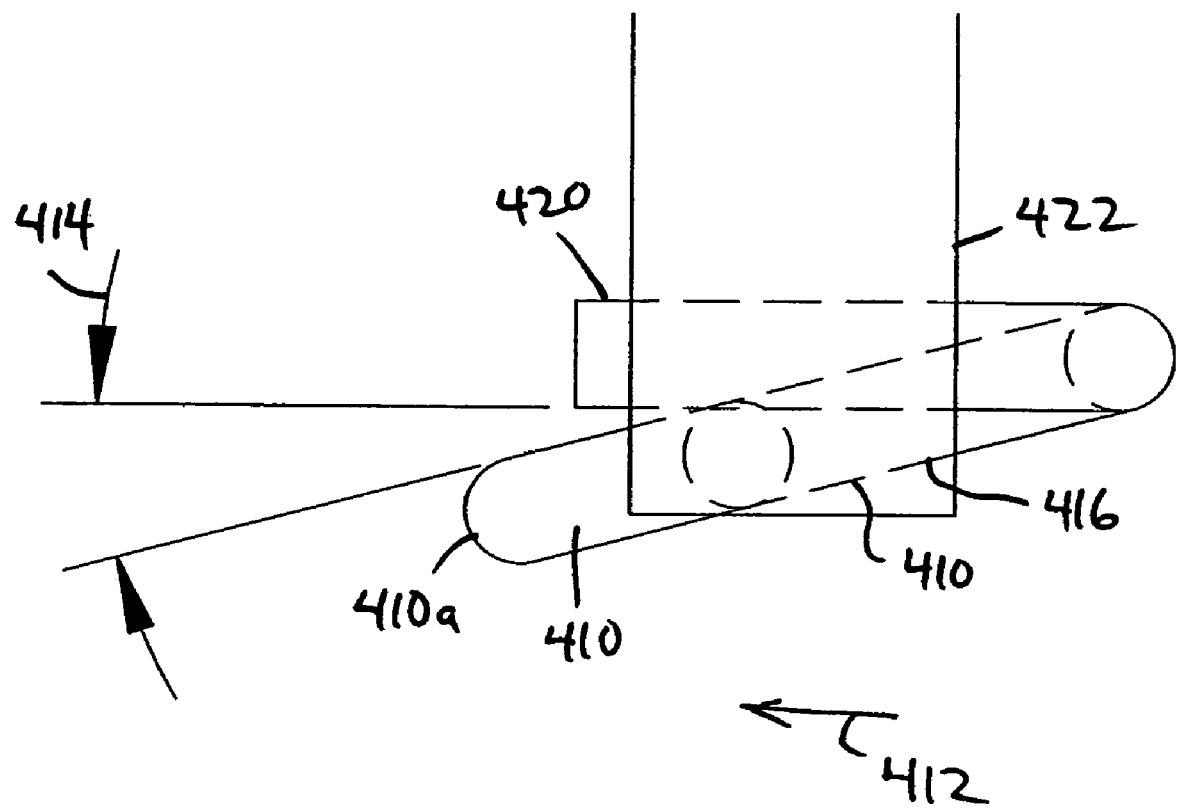

FIG. 27 is a side elevational view of a portion of a conveyor system including link support members 402 (also referred to as suspension devices 402) according to another embodiment of the invention. FIGS. 28A and 28B are a side view and a top view, respectively, of the link support member 402, while FIG. 28C is an end view of the link support member 402 in both a normal vertically disposed position and pivoted position for unloading.

The link support members 402 serve to suspend the linked chain 32 similar to the embodiments described above. Each link support member 402 is pivotally coupled to the conveyor 20 and pivots about the pivot axis 122. In this embodiment, the link support portion 112 and the lower portion 114 are configured slightly differently than that of the link support member of FIG. 12, for example.

The link support portion 112 includes a first downward extending portion 404 and a second downward extending portion 406 that are coupled together. The first downward extending portion 404 is pivotally coupled to a support bracket 422 which is coupled to the conveyor. For example, as shown in FIG. 28A, the upper end of the downward extending portion 404 bends into arm 420 which extends through a hole extending through support bracket 422 and is pivotal within the support bracket 422. Thus, the central axis of the arm 420 is the pivot axis 122.

The first downward extending portion 404 of the link support portion 112 also extends vertically downwardly into and is contiguous with a leg 408 (also referred to a first lower downward extending portion 408) of the lower section 114. The second downward extending portion 406 extends in parallel to the first downward extending portion 404 and bends into the holding portion 410 which is used to suspend a portion of the linked chain 32 therefrom. The holding portion 410 extends forwardly from the second portion 406 in the direction of conveyor movement (indicated by arrow 412) while extending laterally outward at angle 414 (as seen in FIG. 28B) from the direction of conveyor movement 412.

The leg 408 bends into bottom leg 416 (also referred to as a lower bottom portion 416) which extends in the direction of conveyor movement 412 and laterally outward at the angle 414 (similar the holding portion 410). For example, as shown in FIG. 28B, the bottom leg 416 and the holding portion 410 are shown in dashed lines directly below the support bracket 422. Note that both the holding portion 410 and the bottom leg 416 extend forward and laterally outward at the angle 414 (seen as relative to the arm 420). The leg 416 then bends into leg 418 (also referred to as a second lower downward extending portion 418) which extends vertically upward from leg 416 to attach to the holding portion 410 proximate to its end 410a.

Similar to the embodiments described above, advantageously, the link support member 402 is pivotal about the pivot axis 122 to a variety of orientations, for example, between a vertically disposed orientation (shown as 430A in FIG. 28C) and pivoted orientations (shown as 430B, 430C and 430D in FIG. 28C). This pivoting motion in the direction of arrow 432 of the link support member assists in the loading and unloading of the linked chain 32 to and from the link support members 402, as well as the conveying process. For example, orientation 430B may be used during the loading of the linked chain, orientation 430D may be used in the conveying of the linked chain (such as by using the first member 302 as described above), and orientation 430E may be used in the unloading of the linked chain in order to open up the loop for stick insertion. Accordingly, the link support member 402 may be used in some embodiments in place of the link support members described thus far, such as link support members 110. The structures described herein to cause the pivoting motions (such as, various members and actuating devices) may also be used with the link support member 402. While the link support member 402 provides another example of a link support member that is pivoted to open loops in a linked chain suspended therefrom for unloading. Thus, the link support member 402 forms part of a loop forming apparatus according to several embodiments of the invention. In preferred form, the link support member 110 provides better performance, such as in the specific conveyor systems of FIGS. 8-26H and 29.

While the invention herein disclosed has been described by means of specific embodiments and applications thereof, numerous modifications and variations could be made thereto by those skilled in the art without departing from the scope of the invention set forth in the claims.

What is claimed is:

1. A suspension device for a chain of linked products comprising:
   a link support portion pivotally coupled to a conveyor, the link support portion configured to suspend a portion of the chain of linked products therefrom; and
   a lower portion downwardly extending from the link support portion, the lower portion configured to engage a portion of a respective link of the chain upon a pivoting motion of the link support portion about a pivot axis in order to open a respective loop suspended from the link support portion to an unloading orientation for unloading;
   wherein the lower portion comprises two downward extending portions spaced apart from each other and adapted to engage the portion of the respective link upon the pivoting motion; and
   wherein the lower portion further comprises a bottom portion coupling the two downward extending portions and adapted to engage the portion of the respective link upon the pivoting motion.

2. The device of claim 1 wherein the lower portion is configured to engage the portion of the respective link of the chain upon an outward pivoting motion of the link support portion about the pivot axis.

3. The device of claim 1 wherein the link support portion comprises:
   a downwardly extending portion pivotally coupled at an upper end to the conveyor; and
   a holding portion extending from a portion of the downwardly extending portion, the holding portion adapted to suspend the portion of the chain therefrom.

4. The device of claim 1 wherein the pivot axis is non-perpendicular to a direction of conveyor movement.

5. The device of claim 3 wherein the lower portion extends from the holding portion.

6. A suspension device for a chain of linked products comprising:
   a link support portion pivotally coupled to a conveyor, the link support portion configured to suspend a portion of the chain of linked products therefrom; and
   a lower portion downwardly extending from the link support portion, the lower portion configured to engage a portion of a respective link of the chain upon a pivoting motion of the link support portion about a pivot axis in order to open a respective loop suspended from the link support portion to an unloading orientation for unloading;
   wherein the link support portion comprises:
      a downwardly extending portion pivotally coupled at an upper end to the conveyor; and
      a holding portion extending from a portion of the downwardly extending portion, the holding portion adapted to suspend the portion of the chain therefrom,
   wherein at least a portion of the holding portion extends upward from the downwardly extending portion and extends forward relative to a direction of conveyor movement.

7. An apparatus for forming loops in a chain of linked products comprising:
   a conveyor;
   a set of suspension devices coupled to the conveyor;
   each suspension device comprising:
      a link support portion pivotally coupled to a conveyor, the link support portion being pivotal about a pivot axis, the link support portion configured to suspend therefrom a portion of the chain of linked products, wherein the chain is suspended from the set of suspension devices and conveyed by the conveyor; and
      a lower portion downwardly extending from the link support portion; and
   a member coupled to a conveyor support structure and configured to engage and laterally pivot the set of suspension devices about the pivot axis into an unloading orientation;
   the lower portion of each suspension device configured to engage a portion of a respective link of the chain upon the pivoting motion of the suspension device about the pivot axis in order to open a respective loop suspended from the link support portion for unloading;
   wherein the link support portion of each suspension device comprises:
      a downwardly extending portion pivotally coupled at an upper end to the conveyor; and
      a holding portion extending from a portion of the downwardly extending portion, the holding portion adapted to suspend the portion of the chain therefrom,
      wherein at least a portion of the holding portion of each suspension device extends upward from the downwardly extending portion and extends forward relative to a direction of conveyor movement.

8. An apparatus for forming loops in a chain of linked products comprising:
   a conveyor;
   a set of suspension devices coupled to the conveyor;
   each suspension device comprising:
      a link support portion pivotally coupled to a conveyor, the link support portion being pivotal about a pivot axis, the link support portion configured to suspend therefrom a portion of the chain of linked products, wherein the chain is suspended from the set of suspension devices and conveyed by the conveyor; and
      a lower portion downwardly extending from the link support portion; and a member coupled to a conveyor support structure and configured to engage and laterally pivot the set of suspension devices about the pivot axis into an unloading orientation;

the lower portion of each suspension device configured to engage a portion of a respective link of the chain upon the pivoting motion of the suspension device about the pivot axis in order to open a respective loop suspended from the link support portion for unloading;

wherein the lower portion of each suspension device comprises two downward extending portions spaced apart from each other and adapted to engage the portion of the respective link upon the pivoting motion; and wherein the lower portion of each suspension device further comprises a bottom portion coupling the two downward extending portions and adapted to engage the portion of the respective link upon the pivoting motion.

9. The apparatus of claim 8 wherein the lower portion of each suspension device is configured to engage the portion of the respective link of the chain upon an outward pivoting motion of the link support portion about the pivot axis.

10. The apparatus of claim 8 wherein the link support portion of each suspension device comprises:
    a downwardly extending portion pivotally coupled at an upper end to the conveyor; and
    a holding portion extending from a portion of the downwardly extending portion, the holding portion adapted to suspend the portion of the chain therefrom.

11. The device of claim 10 wherein the lower portion extends from the holding portion.

12. The apparatus of claim 8 further comprising an actuator coupled to the conveyor support structure, the actuator configured to move the member in order to cause the member to engage and laterally pivot the set of suspension devices about the pivot axis.

13. The apparatus of claim 12 wherein the member is substantially parallel to the direction of conveyor movement and is coupled to the actuator, the actuator for controlling the position of the member.

14. The apparatus of claim 8 wherein the member extends laterally outward along a portion of a path of conveyor movement at an angle relative to a direction of conveyor movement, such that as each suspension device is conveyed, it is further pivoted toward the unloading orientation.

15. The apparatus of claim 14 further comprising another member coupled to the conveyor support structure, the other member substantially parallel to the direction of conveyor movement and configured to retain the set of suspension devices in the unloading orientation after the suspension devices have passed the member.

16. The apparatus of claim 15 further comprising an actuator coupled to the other member, the actuator configured to cause the other member to move causing the set of suspension devices to pivot downwardly about the pivot axis.

17. The apparatus of claim 8 further comprising a stick configured to be received into each respective loop having been opened to the unloading orientation.

18. The apparatus of claim 17 wherein once the set of suspension devices are in the unloading orientation, the stick is configured to be raised to lift the chain off of the set of suspension devices.

19. The apparatus of claim 17 wherein, once the stick is received in the opened loops of the chain, the set of suspension devices is then configured to be pivoted downwardly about the pivot axis, the stick lifting the chain off of the set of suspension devices.

20. The apparatus of claim 19 wherein the stick is configured to be raised as the set of suspension devices is pivoted downwardly about the pivot axis in order to lift the chain off of the set of suspension devices.

21. The apparatus of claim 8 wherein the pivot axis is non-perpendicular to a direction of conveyor movement.

22. An apparatus for forming loops in a chain of linked products comprising:
    means for suspending a portion of the chain of linked product from a link support portion of a suspension device pivotally coupled to a conveyor, the suspension device having a lower portion downwardly extending from the link support portion, wherein the lower portion comprises two downward extending portions spaced apart from each other and a bottom portion coupling the two downward extending portions; and
    means for pivoting the link support portion about a pivot axis such that the two downward extending portions and the bottom portion of the lower portion engage a portion of a respective link of the chain to open a respective loop in the chain to an unloading orientation for unloading.

23. The apparatus of claim 22 wherein the link support portion comprises:
    a downwardly extending portion pivotally coupled at an upper end to the conveyor; and
    a holding portion extending from a portion of the downwardly extending portion, the holding portion adapted to suspend the portion of the chain therefrom;
    wherein the lower portion extends from the holding portion.

24. A method for forming loops in a chain of linked products comprising the steps of:
    suspending a portion of the chain of linked product from a link support portion of a suspension device pivotally coupled to a conveyor, the suspension device having a lower portion downwardly extending from the link support portion, wherein the lower portion comprises two downward extending portions spaced apart from each other and a bottom portion coupling the two downward extending portions; and
    pivoting the link support portion about a pivot axis such that the two downward extending portions and the bottom portion of the lower portion engage a portion of a respective link of the chain to open a respective loop in the chain to an unloading orientation for unloading.

25. The method of claim 24 wherein the pivoting step comprises:
    pivoting the link support portion in an outward direction about the pivot axis to open the respective loop in the chain for unloading.

26. The method of clam 24 wherein the pivoting step comprises:
    conveying the suspension device; and
    pivoting the link support portion about the pivot axis by mechanical engagement with a member coupled to a conveyor support structure as the link support portion is conveyed.

27. The method of claim 24 wherein the pivoting step comprises:
    pivoting the link support portion about the pivot axis by using an actuator coupled to the conveyor support structure to move a member coupled to the actuator, the member engaging the link support portion causing the pivoting.

28. The method of claim 24 further comprising:
    holding the suspension device in the unloading orientation.

29. The method of claim 24 further comprising:
   inserting a stick in the respective loop having been opened.
30. The method of claim 29 further comprising:
   raising the stick to lift the chain from the suspension device.
31. The method of claim 29 further comprising:
   downwardly pivoting the link support portion about the pivot axis such that the stick lifts the chain off of the suspension device.
32. The method of claim 29 further comprising:
   downwardly pivoting the link support portion about the pivot axis while raising the stick, such that the stick lifts the chain off of the suspension device.
33. The method of claim 24 wherein the pivoting step comprises:
   pivoting the link support portion about the pivot axis, the pivot axis being non-perpendicular to a direction of conveyor movement.
34. The method of claim 24 wherein the link support portion comprises:
   a downwardly extending portion pivotally coupled at an upper end to the conveyor; and
   a holding portion extending from a portion of the downwardly extending portion, the holding portion adapted to suspend the portion of the chain therefrom;
   wherein the lower portion extends from the holding portion.
35. A method for forming loops in a chain of linked products comprising the steps of:
   suspending a portion of the chain of linked product from a holding portion of a link support portion of a suspension device pivotally coupled to a conveyor, the suspension device having a lower portion downwardly extending from the link support portion, wherein the wherein the link support portion comprises a downwardly extending portion pivotally coupled at an upper end to the conveyor and the holding portion extending from a portion of the downwardly extending portion, wherein at least a portion of the holding portion extends upward from the downwardly extending portion and extends forward relative to a direction of conveyor movement; and
   pivoting the link support portion about a pivot axis such that the lower portion engages a portion of a respective link of the chain to open a respective loop in the chain to an unloading orientation for unloading.
36. An apparatus for forming loops in a chain of linked products comprising:
   means for suspending a portion of the chain of linked product from a holding portion of a link support portion of a suspension device pivotally coupled to a conveyor, the suspension device having a lower portion downwardly extending from the link support portion, wherein the wherein the link support portion comprises a downwardly extending portion pivotally coupled at an upper end to the conveyor and the holding portion extending from a portion of the downwardly extending portion, wherein at least a portion of the holding portion extends upward from the downwardly extending portion and extends forward relative to a direction of conveyor movement; and
   means for pivoting the link support portion about a pivot axis such that the lower portion engages a portion of a respective link of the chain to open a respective loop in the chain to an unloading orientation for unloading.

* * * * *